(12) United States Patent
Skipper et al.

(10) Patent No.: US 12,099,985 B2
(45) Date of Patent: Sep. 24, 2024

(54) GROUP DATA OBJECTS AND ASSOCIATED FUNCTIONALITY ENABLEMENT

(71) Applicant: Block, Inc., San Francisco, CA (US)

(72) Inventors: Demitra Skipper, San Francisco, CA (US); Jae Won Park, San Francisco, CA (US); Grant Gliner, San Francisco, CA (US); Rishi Ahuja, Brooklyn, NY (US); Christopher Walker, New York, NY (US)

(73) Assignee: Block, Inc., Oakland, CA (US)

( * ) Notice: Subject to any disclaimer, the term of this patent is extended or adjusted under 35 U.S.C. 154(b) by 120 days.

(21) Appl. No.: 17/973,009

(22) Filed: Oct. 25, 2022

(65) Prior Publication Data

US 2024/0185211 A1 Jun. 6, 2024

(51) Int. Cl.
*G06Q 20/22* (2012.01)
*G06Q 20/32* (2012.01)

(52) U.S. Cl.
CPC ......... *G06Q 20/229* (2020.05); *G06Q 20/326* (2020.05)

(58) Field of Classification Search
CPC .............. G06Q 20/229; G06Q 20/326; G06Q 20/3224
USPC .......................................................... 705/44
See application file for complete search history.

(56) References Cited

U.S. PATENT DOCUMENTS

| | | | | |
|---|---|---|---|---|
| 8,401,968 | B1 * | 3/2013 | Schattauer | G06Q 30/06 705/37 |
| 11,514,437 | B1 * | 11/2022 | Jarosch | G06Q 20/38215 |
| 11,588,802 | B2 * | 2/2023 | Way | H04L 63/08 |
| 2009/0112744 | A1 | 4/2009 | Park et al. | |
| 2009/0144193 | A1 * | 6/2009 | Giordano | G06Q 20/40 705/39 |
| 2011/0202874 | A1 | 8/2011 | Ramer et al. | |
| 2011/0208659 | A1 | 8/2011 | Easterly et al. | |
| 2012/0143753 | A1 * | 6/2012 | Gonzalez | G06Q 20/12 705/41 |
| 2012/0150731 | A1 * | 6/2012 | Isaacson | G06Q 30/06 705/39 |

(Continued)

FOREIGN PATENT DOCUMENTS

| | | |
|---|---|---|
| JP | 2023-041750 A | 3/2023 |
| WO | 2011/140301 A1 | 11/2011 |

OTHER PUBLICATIONS

"An empirical examination of continuance intention of mobile payment services," by Tao Zhou. Decision Support Systems 54, No. 2. 2013. pp. 1085-1091 (Year: 2013).*

(Continued)

*Primary Examiner* — Sara C Hamilton
(74) *Attorney, Agent, or Firm* — Lee & Hayes, P.C.

(57) ABSTRACT

Techniques described herein are directed to storing group data objects that associate accounts and generating user interfaces associated with those group data objects. User input data may be received that is associated with the group member accounts and a determination may be made that the user input data is associated with the group data object in question. Elements of the user interface may be altered based on the user input data, and a command may be sent to a device associated with the group data object, where the command may cause a payment application to be displayed in a foreground of the device and may cause display of the element as altered.

20 Claims, 22 Drawing Sheets

(56) References Cited

U.S. PATENT DOCUMENTS

| | | |
|---|---|---|
| 2012/0179531 A1 | 7/2012 | Kim |
| 2012/0290950 A1 | 11/2012 | Rapaport et al. |
| 2014/0129422 A1 | 5/2014 | Zhou et al. |
| 2015/0006426 A1 | 1/2015 | Sobhani et al. |
| 2016/0117651 A1* | 4/2016 | Davis ................ G06Q 20/3255 705/40 |
| 2016/0117665 A1* | 4/2016 | Davis ................ G06Q 20/223 705/39 |
| 2016/0117666 A1* | 4/2016 | Davis ................ G06Q 20/384 705/39 |
| 2016/0117670 A1* | 4/2016 | Davis ................ G06Q 20/3255 705/39 |
| 2021/0174435 A1* | 6/2021 | Reses ................ G06Q 40/03 |
| 2023/0045946 A1* | 2/2023 | Duane ................ G06Q 20/065 |
| 2023/0047509 A1* | 2/2023 | Dhodapkar .......... G06Q 20/229 |

OTHER PUBLICATIONS

Wilson et al. "How we design our hardware," retrieved from<https://wallet.build/how-we-design-our-hardware/> Oct. 27, 2022, 9 pages.
Search Strategy from Dialog, STIC, ProQuest, Oct. 22, 2022, 3 pages.

* cited by examiner

GROUP DATA OBJECTS AND ASSOCIATED FUNCTIONALITY ENABLEMENT

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
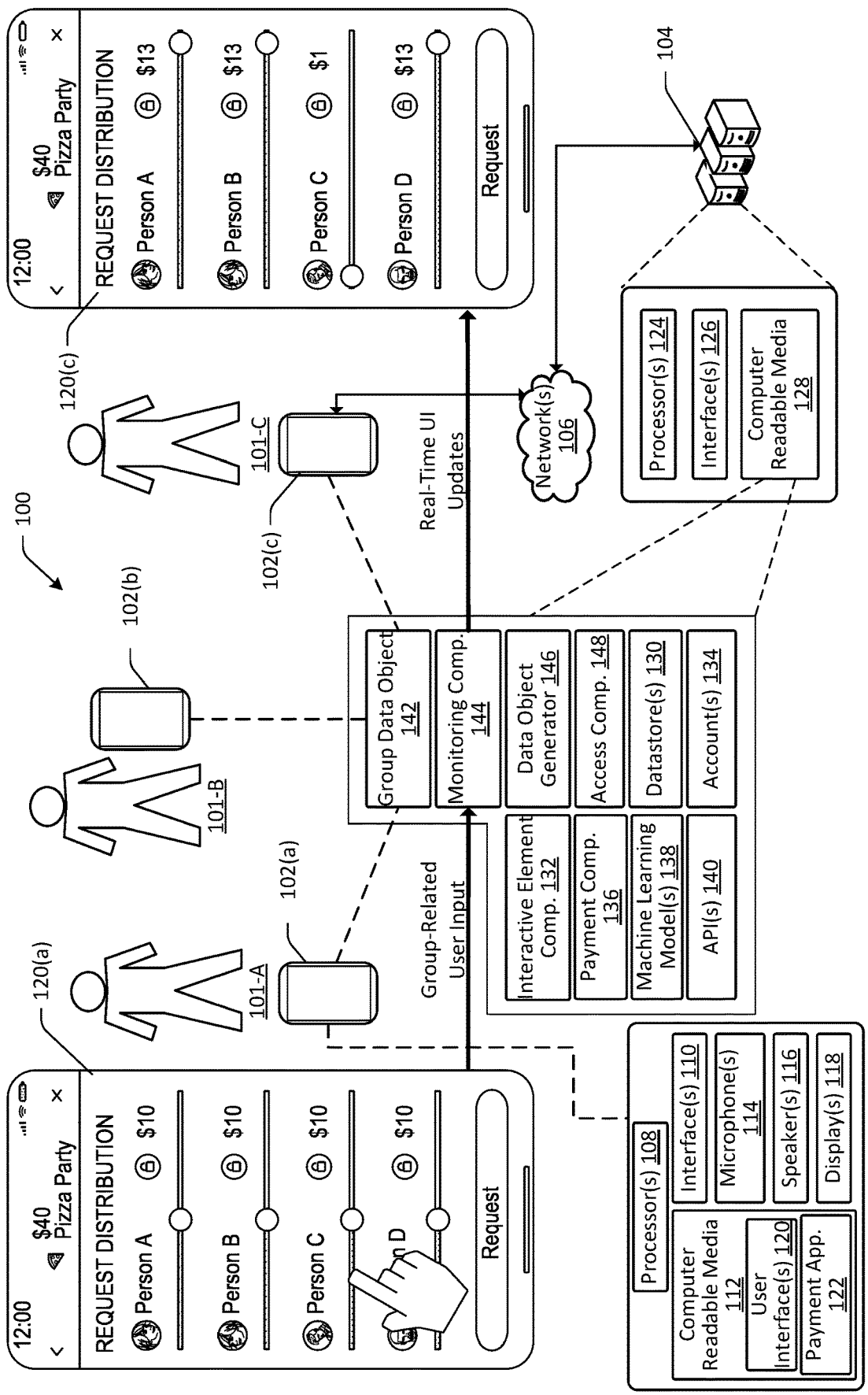
FIG. 1 is an example environment for group data objects and associated functionality enablement, according to an embodiment described herein.

Techniques described herein are directed to, among other things, group data objects and associated functionality enablement. Group data objects can act as primitives that operate within a service, such as a payment service, different than individual data objects. For example, group data objects can be associated with one or more user accounts such that user accounts included and associated with the group data objects have different access, permission, regulation, functionality, user interfaces, and/or the like than user accounts that are not associated with group data objects. In some examples, user account(s) associated with group data objects can be fluid such that new user accounts can be associated with group data objects and/or removed from group data objects in real-time or near-real-time, in some examples, responsive to triggering events. In some examples, the service can monitor interactions of user accounts associated with group data objects to provision or unlock particular functionality that is not otherwise available to user accounts that are not associated with group data objects.

In an example, techniques described herein may be utilized to determine when a group data object associated with multiple user accounts is to be generated. To do so, the payment service may utilize contextual data to determine when it may be beneficial to generate a group data object for associating user accounts as a group of users. This contextual data may include, for example, prior groups user(s) have created, prior transactions the user(s) have engaged in, users that have been invited to be associated with the group, current groups that the user(s) are involved with, group creation timing, group naming, geolocation of users, interests of users, calendars, upcoming events, text message data, email data, social media interactions, etc. Utilizing such contextual data, the payment service can automatically (e.g., with no user input) generate group data objects, as described herein. In some examples, such group data objects can be generated intelligently (e.g., using models or the like). That is, techniques described herein can utilize contextual data to automatically and/or intelligently generate group data objects.

Contextual data may also be utilized to determine when and how to group users, membership of groups, which purposes and functionality to associate with groups, etc. For example, the contextual data may include physical location data for user devices may be queried and/or received (e.g., from a location sensor or the like), and this physical location data may be utilized to determine if the users are proximate to each other. When user devices are near each other and all have an instance of a payment application residing thereon, such data may be utilized as a signal for determining whether to associate the user accounts with a group data object. Other signals may include, for example, transaction data indicating that the user accounts have engaged in one or more prior transactions with each other, data indicating social relationships as between users for the user accounts, data indicating a shared or common goal, data indicating a shared or common event of interest (e.g., an event is associated with the physical location where the user devices are disposed, an event associated with the user accounts, an event determined to be relevant to the user accounts, etc.), data indicating prior user account groupings, data indicating the users have similar interests, data determined from machine learning model output indicating a likelihood that that user accounts should be associated with a group data object, etc. In some examples, such data can be obtained from the payment service (e.g., first-party data) and/or from third-party services (e.g., third-party data) that are in communication with or are otherwise integrated with the payment service. For instance, social relationships, events, interests, or the like can be obtained from social networking services, calendar services, travel services, content generating and/or streaming services, and/or the like that are in communication with or integrated with the payment service.

In examples where some or all of the data described herein indicates desirability of generating a group data object, an actionable recommendation may be sent to the first user device and/or the second user devices to enable them to associate their respective user accounts with the group data object. As used herein, an actionable recommendation is data representing a recommendation that is provided with an input mechanism to cause an action to be performed. User input data may be received accepting the actionable recommendation, and in these examples the group data object may be generated. The group data object itself may include an identifier of the group of users, connections between the group data object and individual user accounts, functionalities enabled for the group of users and individual user accounts, transaction history associated with the group of users, etc. The group data object may be stored with other group data objects, which may be logically or physically separated from stored user accounts. In some examples, group data objects can be stored with user accounts but can be associated with an indicator or flag indicating that the group data object is a group data object instead of an individual data object (e.g., associated with an individual user account). In some examples, individual user accounts can be mapped to, or otherwise associated with, a group data object, thereby indicating that such user accounts are included in a "group" of users associated with the group data object.

In some examples, a sub-account may be generated and associated with the group data object. The sub-account may have funds that may be utilized by the group of users (or a portion of the group of users) and the sub-account may be enabled to receive funds from the individual user accounts. The sub-account may be accessible to user accounts of users in the group of users and may not be accessible to user accounts that are not in the group of users. Further, access and/or use of the funds associated with the sub-account can be differentiated among or between the user accounts of the users in the group. In some examples, any user account can add funds to the sub-account but withdrawing or spending funds associated with the sub-account may be subject to satisfaction of a condition (e.g., occurrence of an event, a consensus from each user account, or the like). In some examples, pooling of funds or other assets and/or membership in a group can unlock or enable functionality or features that are not otherwise available to user accounts that are not included in the group. Examples of such features or functionality include unlocking an incentive (e.g., discount, loyalty rewards, coupon, etc.), enabling buying power (e.g., for buying stocks, funds, cryptocurrency, etc.), providing an experience or enabling access to a service or experience and/or an improved or better service or experience, a vote or stake in a cause or event, or the like.

Once a group data object is generated, user input data may be received in association with the group data object. In examples, the user input data may be received from a user account associated with the group of users, and the payment service may determine whether the user input data is to be associated with the individual user account or the sub-account associated with the group data object. In some examples, the payment service may use contextual data to determine whether the user input data is directed to the individual user account or the sub-account associated with the group data object. In examples where the user input data is determined to be associated with the group of users, data associated with the group data object may be updated, in real-time, based at least in part on the user input data. The updated data may cause a user interface associated with the group data object to be updated to reflect changes caused by the user input data. Example user interface changes may include, for example, changes to a representation of the funds held in the sub-account, an activity feed associated with the group data object, changes to access controls associated with one or more user accounts of the group of users, display of incentives, etc. In examples, updates to the user interface may cause the payment application residing on the user devices associated with the group of users to enable and automatically display the user interface as updated. In other examples, a notification of the change may be sent to the user devices and that notification may be selectable to display the user interfaces as updated.

In examples, the real-time changes to user interfaces associated with the group of users may be made to indicate changes in formation and functionalities across user accounts associated with the group. For example, given input data that affects a first user account associated with a group data object may also affect a second user account. In this example, the real-time changes to the user interfaces may include an update to a user interface associated with the first user account separate from the group data object, an update to a user interface associated with the group data object, and an update to a user interface associated with the second user account separate from the group data object, depending on the type of input data that was received. In this way, the individual user accounts and the shared account associated with the group data object may be interconnected, and changes to one account, depending on the change, may affect other accounts and how details associated with those other accounts are represented in the user interfaces at issue.

In association with the operations described above, with the proliferation of digital platforms for sharing information and for performing transactions, there is a computer-centric problem of integrating functionality of disparate digital platforms in a secure manner. In conventional technologies, services are configured to perform operations on behalf of individual user accounts. That is, a user instructs an operation associated with a user account and the service provider performs the operation. However, user groups, as described herein, introduce a variety of security concerns in that the user group and operations performed in association therewith affect more than one user account. For example, when user groups are generated and a transaction is to be performed on behalf of a given user group, multiple user accounts are involved as well as other systems associated with the transaction at issue, including merchant-related systems, payment processing systems, and systems associated with the events described herein, such as cryptocurrency exchanges, investment-related systems, etc. The complex nature of such transactions and interactions across multiple digital platforms causes a security risk of sensitive information being utilized in a way that is unintended. An example of this may be that a group of users desires to enter into a transaction after certain conditions have been satisfied, such as an amount of raised funds satisfying a threshold amount of funds. Absent the computer-centric techniques described herein, the manual pooling of funds in an account, such as a bank account associated with a group of people, may allow for one or more of the people to enter into transactions or perform other operations that may not be authorized by all the people associated with the account. Additionally, in this manual example, transaction functionality cannot be enabled in a time-sensitive manner or in a manner where a transaction is automatically processed for the group when the described threshold(s) are met. To solve these and other computer-centric problems, the techniques and systems described herein utilize computer-centric solutions associated with a secure payment application and a payment service to determine when and how to enable functionality for a group data object.

Additionally, security of information to be shared (or not shared as the case may be) between parties is a problem faced by most if not all digital platforms. Even in the context of an interaction between just two users, determining what information is allowed to be shared and then sharing that information between user devices in a way that prevents or at least substantially hinders nefarious actors from intercepting data sent between user devices represents a security challenge. This technical problem of determining when and how to securely transfer data representing user information between devices becomes even more technically difficult to achieve when devices associated with a group data object are networked. One technical problem here relates to how data to be shared from one device is encrypted and then selectively sent to some or all of the devices associated with the rest of the group members in a manner that allows those devices to decrypt and utilize the data without allowing non-members to perform such decryption. The techniques described herein solve this technical problem by creating a group data object that can be utilized by the payment service as a unique entity that can encrypt data to be shared with group members and that can decrypt data sent by the group members. This encryption of data to be shared across various group members allows for presentation of relevant and secure information across multiple user devices associated with the group of users.

These security-related problems become more sensitive when the data to be shared and utilized among group members relates to payments. For example, determining when and how to make payments on behalf of the group of users and determining how those payments then impact individual accounts of group members presents a technical challenge that, without the techniques described herein, would utilize a large number of transactions to take place. For example, absent the techniques described herein associated with the generation of a group data object, a purchase made by a group of four users from a merchant would utilize four transactions to effectuate the purchase (e.g., a transaction from each user to the merchant, or a first transaction from one of the users for the entire purchase price to the merchant and then three reimbursement transactions from the other users to the first user). To the contrary, with techniques described herein, one transaction from a sub-account of the group data object is made to the merchant. This results in, among other technical benefits, reduced processing power and time by reducing the number of transactions, memory savings by not requiring maintenance of four transaction records, and a reduced attack surface for nefarious actors to interact with the transactions by reducing the number of transactions to potentially be attacked.

In addition to the above, the generation of a new group data object that includes its own sub-account and can be utilized by group members as its own standalone entity represents a marked departure from the typical "friend groups" available through social messaging or otherwise. Once this group data object is generated, association of that group data object with individual member accounts is performed intelligently (and in some cases automatically). For example, the techniques described herein may utilize attributes of a user account that is creating a group as well as attributes of the group itself (including inferred or selected group purposes) to identify other users that are likely to be associated with the group data object. In addition to intelligently determining which users may be group members, techniques described herein include the ability to automatically enable and disable certain functionality available to group data objects based on group purposes. This solves a number of technical problems. As a first example, by limiting the functionality to just what is needed for the group purpose, the limited screen area in which to view user interfaces for the group data object can be dynamically populated with user interface elements specific to the enabled functionality without unnecessarily including otherwise irrelevant functionality. As a second example, by limiting the rendering of elements of user interfaces to those elements associated with the selected subset of functionality, less memory (storage of data enabling functionality being less than storage of data associated with full functionality) and less processing power (limiting the processes that can be performed by limiting the functionality) is used.

Furthermore, existing technologies lack real-time update features for user interfaces. Here, the time-sensitive nature of displaying updated user interfaces when group members perform an action that impacts the group data object highlights the need for real-time update features to be implemented. Techniques described herein include such a real-time updating feature, which identifies when an action is taken in association with the group data object, determines on the fly how that action impacts attributes of the group data object, determines which user interface elements should be updated based on how the action impacts the group data object attributes, and then automatically updates the user interface elements accordingly in real time. In some examples, this process automatically causes an application residing on group member devices to enable and display the updated user interfaces. This is particularly important in the context of certain group purposes such as investing, cryptocurrency, and social purchasing. In the investing or cryptocurrency example, when certain thresholds are satisfied (such as a total amount of funds in a group sub-account reaching a threshold, shares trading at a particular price, cryptocurrency being associated with a particular value, etc.) transactions (e.g., buy or sell) may be made on behalf of the group. In the social purchasing example, when pooled funds reach a threshold amount the group data object may automatically purchase an item for the group and/or may apply an incentive prior to such a purchase. Each of these changes may be reflected in user interface element updates that are displayed in real-time on group member devices.

Additionally, in existing technologies, user groups are created, managed, and utilized via user input, techniques described herein enable the ability to utilize specifically-trained machine learning models to more accurately and more quickly perform a number of operations associated with group data objects. Specifically, the trained machine learning models may be utilized to generate group recommendations, set threshold values associated with group membership, group incentives, and group functionalities, determine access controls to apply across multiple group members, associate events with group data objects, determine user interface elements to update, determine functionalities to enable, etc. By utilizing machine learning in this way, user input data from group members may not be necessary to determine what actions should be taken on behalf of the group data object. This results in reduced processing power needed to receive, interpret, and act on user input data, as well as causing at least some actions associated with a group data object to be performed automatically.

Further, in some examples, user groups can be automatically created, either without or with very little user input. For example, techniques described herein can utilize location sensors and/or determined proximity, integrations with third-party applications or services (e.g., calendars, tickets, digital wallets, etc.), transaction activity, and/or the like to determine when to create a user group. In some examples, users can provide a single input to join a recommended group. In some examples, a user group can be created automatically, without user input (and a user can opt to leave the group). In this way, techniques described herein leverage contextual data for determine when to create a user group, which user accounts to include in the user group, and/or how to create a user group. This intelligence and/or automation offers improvements over existing technologies.

In some examples, a group data object as described herein may be associated with multiple transactions. By way of example, a group data object associated with a trip can involve various users paying for different things like hotel, car, etc. In existing techniques, users may repay the user who purchased the hotel via a first repayment transaction and the user who purchased the car via a second repayment transaction. When multiple transactions have been completed, the payment service described herein can determine how repayment is to be allocated to reduce the number of repayment transactions that are needed to ensure each group member who purchased an item is made whole. By way of continued example, a first user may pay $99 for a ride share, a second user may pay $60 for movie tickets, a third user may pay $120 for food, and the users may desire to pay for everything equally (e.g., $93 each). If each expense had been split, six peer-to-peer payments would have been utilized (two peer-to-peer payments to the first user, two peer-to-peer payments to the second user, two peer-to-peer payments to the third user, and so on). However, by utilizing techniques described here, the payment service can determine that the second user owes the first user $6 and the third user $27. In this way, the system can reduce the number of peer-to-peer payments exchanged via the service provider, thereby conserving computing resources and reducing network congestion.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for group data objects and associated functionality enablement, according to an embodiment described herein. The environment 100 of FIG. 1 may include user 101-A through 101-C associated with user devices 102(*a*)-(*c*) and a payment service 104, which can communicate via network(s) 106. A user 101-A through 101-C can be any user of a payment application 122 as described herein. Each of the devices can comprise one or more computing devices. Additional details associated with the user devices 102(*a*)-(*c*), the payment service 104, and the network(s) 106 are described below with reference to FIGS. 15-19.

The user devices 102(*a*)-(*c*) may include one or more components such as one or more processors 108, one or more network interfaces 110, computer-readable media (CRM) 112, one or more microphones 114, one or more speakers 116, and one or more displays 118. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces.

The CRM 112 may include one or more applications or other components. For example, the one or more applications or other components can include one or more user interface(s) 120 and a payment application 122. A user interface 120 can be included in the payment application 122 as an interstitial, widget, or pop-up display. The CRM 112 can include additional or alternative applications such as a content creation and/or streaming application, a messaging application, an email application, a forum application, a photo application, a calendar application, a ticketing application, a social networking application, or the like. In some examples, the applications can be provided by a same service provider (e.g., the payment service) or different service providers, such as the payment service and one or more third-party service providers.

The applications or other components may be configured to execute in the foreground and background of the devices 102(a)-(c). For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the device 102 and/or with payment service 104 associated with the payment application 122. The payment application 122, running in the background, may be caused to be displayed in the foreground in response to certain triggers, including when updates to the user interfaces 120 associated with a group data object 142 occurs. In some such examples, the payment application 122 can transition to the foreground to perform payment operations or can remain in the background and payment operations can be performed without the payment application 122 transitioning to the foreground. In other examples, the payment application 122 itself may be utilized to display interactive elements associated with group data objects as described herein. It should be understood that the user interfaces 120 described herein may include the payment application 122 and may include one or more other user interfaces as described herein. It should also be understood that the payment application 122 or the functionality associated therewith can be integrated into other applications, such as third-party applications.

The payment service 104, which can be associated with one or more computing devices, such as server computing devices, may include components such as one or more processors 124, one or more network interfaces 126, and/or CRM 128. The CRM 128 may include one or more components such as, for example, datastore(s) 130, an interactive element component 132, one or more accounts 134, a payment component 136, one or more machine learning models 138, one or more application programming interfaces (APIs) 140, group data objects 142, a monitoring component 144, a data object generator 146, and an access component 148. These components will be described below by way of example. The CRM 128 can include additional or alternative components and, in some examples, one or more components can be combined.

In at least one example, the payment service 104 can expose functionality and/or services via the one or more APIs 140, thereby enabling functionality and/or services described herein to be integrated into various functional components of the environment 100. The API(s) 140, which can be associated with the payment service 104, can expose functionality described herein and/or avail payment services to various functional components associated with the environment 100. At least one of the API(s) 140 can be a private API, thereby availing services and/or functionalities to functional components (e.g., applications, etc.) that are developed internally (e.g., by developers associated with the payment service). At least one of the API(s) 140 can be an open or public API, which is a publicly available API that provides third-party developers (e.g., merchant platforms described herein) with programmatic access to a proprietary software application or web service of the payment service. That is, the open or public API(s) can enable functionality and/or services of the payment service to be integrated into one or more applications. The API(s) 140 can include sets of options that govern how applications, or other functional components, can interact with one another.

In some examples, the payment service 104 can provide third-party entities with a software developer kit ("SDK") that may utilize functionality exposed by the API(s) 140. The SDK can include software development tools that allow a third-party developer (i.e., a developer that is separate from the payment service) to include functionality and/or avail services as descried herein. The SDK and/or the API(s) 140 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, customer preferences, subject matter preferences, transaction data, contacts data, social relationship data, user preferences, metadata tag data, and other information associated with participation in the transactions described herein. Additional details associated with data that can be stored in association with user profiles are provided below. The sub-accounts of group data objects 142 may also be stored in association with the datastore(s) 130.

Additionally, the payment service 104 may be configured to generate group data objects 142, monitor input associated with group data objects 142, and enable functionality associated with group data objects 142. For example, the data object generator 146 may utilize data associated with multiple user accounts 134, multiple user devices 102(a)-(c) associated with the user accounts 134, and data from multiple payment applications 122 residing on the user devices 102(a)-(c) to determine when certain attributes indicate that it may be beneficial to generate a group data object 142 to associate the user accounts 134 as a group of users 101-A through 101-C. For example, a first device 102(a) associated with a first user account 134 and second devices 102(b), 102(c) associated with second user accounts 134 may all have residing thereon an instance of the payment application 122 that is associated with the payment service 104. The payment application 122 may be utilized to perform a number of actions as described above and data indicating those interactions may be stored in the datastore(s) 130 as described above. Additional details on the generation of group data objects 142 is provided with respect to FIG. 4C.

Data associated with these actions as well as data associated with the user devices 102(a)-(c) themselves may be utilized to determine when certain user accounts 134 may be associated with a group data object 142. For example, physical location data for the user devices 102(a)-(c) may be queried and received, and this physical location data may be utilized by the data object generator 146 to determine if the users are proximate to each other. When user devices 102(a)-(c) are near each other and all have an instance of the payment application 122 residing thereon, such data may be utilized as a signal for determining whether to associate the user accounts 134 with a group data object 142. Other signals may include, for example, transaction data indicating that the user accounts 134 have engaged in one or more prior transactions with each other, data indicating social relationships as between users for the user accounts, data indicating that an event is associated with the physical location where the user devices 102(a)-(c) are disposed or an event associated with the user accounts 134, data indicating prior user account groupings, data indicating the users have similar interests, data determined from machine learning model 138 output indicating a likelihood that that user accounts should be associated with a group data object, etc.

In examples where some or all of the data described herein indicates desirability of generating a group data object 142, an actionable recommendation may be sent to the first user device 102(a) and the second user devices 102(b)-(c) to associate the user accounts with the group data object 142. User input data may be received accepting the actionable recommendation, and in these examples the group data object 142 may be generated. It should be understood that the factors that may be utilized by the data object generator 146 to determine whether to recommend generation of a group data object 142 may be dynamic. For example, feedback data may be received indicating whether prior grouping recommendations have been accepted. This feedback data may be utilized to update or otherwise train the models described herein, including the machine learning models 138, to more accurately determine what data types and factors, what factor weightings, etc. should be utilized to recommend groupings. In some examples, the groupings may be made based at least in part on user input. For example, a primary user 101-A may initiate a request to generate a group data object 142 and may indicate which user accounts 134 should be associated with the group data object 142. If the users 101-B, 101-C accept an invitation to generate the group data object 142, then the data object generator 146 may generate the group data object 142. In some examples, a group data object 142 can be formed without user input and user accounts can be associated with the group data object 142 without user input. In such examples, users can opt out of being associated with the group data object 142.

In still other examples, the user 101-A may provide user input data indicating a purpose for the to-be-formed group, and that purpose may inform which user accounts 142 may be candidates for inclusion in the group of users. In some examples, group data object 142 can be associated with a purpose without a user so selecting. That is, a purpose can be automatically associated with the group data object 142, for example, based on context associated with the group data object 142 and/or user accounts associated therewith. An example purpose may include pooling funds for example, for saving toward a group goal (e.g., savings goal), making a group purchase (e.g., a gift or an experience), fundraising, investing, lending, etc. Another example purpose may include splitting or otherwise sharing expenses. When such a purpose is associated with a group data object 142, the group data object 142 may be generated and may be associated with the selected purpose. In these examples, different functionality may be associated with some or each of the purposes. For example, a savings purpose may be associated with the ability to facilitate deposits of money into a sub-account of the group data object 142 and to allow one or more of the users 101-A through 101-C to conduct a transaction when a threshold fund amount is received in the sub-account. In the expense splitting example, the functionality may include the ability to allocate expenses on a per-member, per-item, or other basis, to receive deposits into the sub-account, and to facilitate transfer of funds to other members or to another account not associated with the group data object 142. Other functionality may be the ability to invest in certain assets, to start or participate in fundraising events, to associate the group data object 142 with an event, to pool funds for the purpose of distributing those funds back to one or more members of the ground, group lending, etc.

It should be understood that any time user input is utilized to perform an operation as described herein, an intelligent operation or automatic operation may be performed instead such that user input is not required but instead a set of rules, the use of models, etc. is utilized to cause the operation at issue to be performed.

The group data object itself may include an identifier of the group of users, connections between the group data object and individual user accounts, functionalities enabled for the group of users and individual user accounts, transaction history associated with the group of users, etc. Additionally, a sub-account may be generated and associated with the group data object. The sub-account may have funds that may be utilized by the group of users (or a portion of the group of users) and the sub-account may be enabled to receive funds from the individual user accounts 134.

In addition to the way group data objects 142 are described above as being generated, additional avenues for group data object generation are included herein. For example, user input data may be received indicating selection of a previous transaction from within an activity feed and user accounts may be added to a group data object 142 based on that selection of the previous transaction. Another methodology may include formation of group data objects 142 based at least in part on selecting a portion of a receipt that indicates other user accounts and/or transaction details attributable to other user accounts. Another methodology may include scanning or otherwise uploading a receipt, ticket, or other transaction-related document and adding user accounts from such documents. Another methodology may include identifying a multi-user payment that has been initiated, is in process, and/or has been concluded and recommending formation of a group data object 142 from that multi-user payment. In addition to the above methodologies for forming group data objects 142, recommendations for group data object formation may also be based at least in part on at least a portion of these methodologies. For example, transaction data associated with activity feeds, receipts, tickets, and/or other user-related data may be utilized to determine when to recommend group data object generation.

Once a group data object is generated, user input data may be received in association with the group data object and monitored by the monitoring component 144. In examples, the user input data may be received from a user account 134 associated with the group of users, and the payment service 104 may determine whether the user input data is to be associated with the individual user account or the sub-account associated with the group data object. For example, a given user 101-A may utilize the payment application 122 for actions associated with the user's personal user account 134 that is not to be associated with the group data object 142. An example of this may be when the user 101-A desires to make a personal purchase separate and apart from the group of users. In other examples, the user 101-A may desire to make a purchase on behalf of the group of users. In other scenarios, the user 101-A may provide user input data to the payment application 122 to engage in the transactions. To differentiate between input data for an individual account and the group data object 142, the payment service 104 may first associate the given payment application 122 for the user 101-A with the group data object 142. Then the payment service 104 may determine whether the user input data was received utilizing the payment application 122 while the group data object 142 was selected for use instead of the individual account. Such a determination may be made based at least in part on whether a user interface 120 associated with the group data object 142 was in a foreground of the user device 102(a) when the user input data was received, whether the group data object 142 was previously selected for use by the user 101-A, whether the transaction at issue was associated with the purpose or other data associated with the group data object 142, etc.

As shown specifically in FIG. 1 by way of example, the user input data may be received while the user interface 120(a) associated with the group data object 142 is displayed. The user input data here may indicate that a user has selected cost splitting functionality associated with the group data object 142. This group-related user input is determined by the monitoring component 144, and the monitoring component 144 may determine real-time user interface changes to be applied to the user interface 120(a) associated with the group data object 142. Here, the changes include reflecting how cost splitting associated with a group member, as selected by the user input data, has changed, as well as how that cost splitting change augments cost splitting associated with other members of the group. In this example, a decrease in the attributable amount to be split by a given group member may result in an increase in the attributable amount to be split by the other group members. The results of these cost splitting changes may be reflected in the updated user interface 120(c), which may be displayed on one or more of the devices 102(a)-102(c) associated with the group data object 142.

By so doing, user input data and/or automated processes as described herein may impact the group data object 142 and information associated with the group data object 142. When this occurs, the payment service 104 may determine when the user input data and/or automated processes affect user interfaces 120(a), 120(c) displayed to group member accounts. Elements of the user interfaces 120(a), 120(c) may be altered to reflect the changes made in response to the user input data and/or the automated processes. Using the example above, user input data decreasing a cost-splitting attribution to a given group member account may result in altering an element of the user interface associated with that group member account and the attribution associated with that account. As shown in the user interfaces 120(a), 120(c), the altering including changing the element for Person C from displaying a cost-splitting attribution of $10 to displaying a cost-splitting attribution of $1. In this example, altering of one element of the user interface 120(a), 120(c) may cause at least one other element to be altered, such as by an inverse relationship. Again using the example above, the user input data decreasing the cost-splitting attribution of Person C may cause the user interface elements associated with Person A, Person B, and Person D to be altered by an inverse relationship. Here, those user interface elements may be altered by changing the displayed cost-splitting attribution of those user accounts from $10 to $13 each.

In examples where the user input data is determined to be associated with the group of users, data associated with the group data object 142 may be updated, in real time, based at least in part on the user input data. The updated data may cause the user interface 120 associated with the group data object to be updated to reflect changes caused by the user input data. Example user interface changes may include, for example, changes to a representation of the funds held in the sub-account, changes to an activity feed associated with the group data object, changes to access controls associated with one or more user accounts 134 of the group of users, display of incentives, etc. In examples, updates to the user interface 120 may cause the payment application 122 residing on the user devices 102(a)-(c) associated with the group of users to enable and automatically display the user interface 120 as updated. In other examples, a notification of the change may be sent to the user devices 102(a)-(c) and that notification may be selectable to display the user interfaces 120 as updated.

In a specific example, funds may be deposited by one or more of the user accounts 134 into the sub-account of the group of users. The sub-account may be associated with a threshold amount of funds that, when satisfied, causes one or more functionalities associated with the group data object 142 to be enabled. Take, for example, a group of users that are seeking to raise enough funds to attend an event. A threshold amount of funds to pay for attendance to the event may be established and individual users 101-A through 101-C may deposit funds, engage in transactions, etc. to increase the amount of funds in the sub-account. Once the threshold amount of funds has been raised, certain functionality may be enabled. The functionality may include the ability for a group member to engage in a transaction on behalf of the group to purchase tickets to the event. Other example functionalities may include the ability to utilize an incentive associated with the event, an ability to perform scheduling-related tasks, an ability to invest the funds in the sub-account, etc. By so doing, the monitoring component 144 may monitor, in real time, input data associated with the group data object and may enable functionality when that input data indicates an attribute threshold, such as a given amount of funds in the sub-account, has been satisfied.

In addition to the real-time input data monitoring described herein, the payment service 104 may be configured to determine when to associate or recommend association of an event with a group data object. For example, a group data object 142 may have been generated as described herein, and then given attributes associated with the group data object 142, the individual user accounts 134, the user devices 102(a)-(c) at issue, etc. may indicate that the group of users may desire the group data object 142 to be associated with a given event. Just by way of example, at a given time, the user devices 102(a)-(c) associated with the group data object 142 may be determined to be located in the same environment. Additionally, messaging data, scheduling data, or other data may indicate an event that the group of users has indicated interest in and that the event is also associated with the environment in question. In these examples, event data may be generated indicating the event in question and an actionable recommendation may be sent to the user devices 102(a)-(c) to cause the event data to be associated with the group data object 142. In this example, functionality associated with the event data may be enabled for use by the users associated with the group data object 142 when the actionable recommendation is accepted and the event is associated with the group data object 142.

Additionally, after the initial generation of the group data object 142 and the initial association of user accounts with the group data object 142, user account membership to the group of users may be, in examples, fluid. For example, depending on user settings and attributes associated with the group of users (such as a purpose of the group or the data utilized to recommend formation of the group), users that desire to be included in the group may request to join or may automatically join the group of users. In other examples, members of the group may desire to be removed from association with the group. In these examples, one or more operations may be performed by the access component 148 to determine contribution allocations to associate with the incoming and outgoing user accounts. For example, records of user account contribution to the sub-account, gains and losses associated with the sub-account, and other data indicating a degree of contribution by a given user account 134 may be generated and stored in association with the group data object 142. This data may then be utilized when a user account 134 is added to or removed from the group of users to determine what portion of funds or other assets are to be apportioned to the user account 134 in question.

By utilizing the techniques described herein, group data objects 142 may be recommended and generated based on attributes of the user accounts 134 and user devices 102(a)-(c) described herein. Additionally, the group data object 142 may be associated with its own functionality, including functionality associated with a sub-account of the group of users that may have varying levels of access control such that certain user accounts 142 may perform transactions on behalf of the group of users. When certain attribute thresholds for the group of users are met, the payment service 104 as described herein may determine functionalities to enable and may cause those functionalities to be enabled for use in association with the group data object 142. Real-time changes to user interfaces 120 associated with the group of users may be made to indicate changes in information and functionalities available to the group members.

When the transactions as described above are performed, the payment component 136 may be configured to facilitate the transactions by withdrawing and depositing funds from a given account, such as the sub-account associated with a group, to one or more other accounts depending on the transaction at issue, or vice versa.

Group data objects 142 may be associated with various functionality in addition to the functionality described above. For example, various purposes and/or purpose types may be provided and may be associated with certain functionality, such as cost splitting functionality, fundraising functionality, recurring payment functionality, and pooling or other shared accounts functionality. A group data object 142 associated with a cost splitting purpose can enable group members to participate in a transaction via the group data object 142. In some examples, one or more individual group members can make a payment for a full amount of a transaction (e.g., "front" the payment) and can interact with a user interface to indicate amounts owed by other group members. The fronting group member(s) and/or service provider can collect funds from each of the group members as repayment based on the inputs provided via the user interface. In some examples, the service provider can make a payment for a full amount of a transaction (e.g., "front" the payment) and individual group members can indicate, via an interaction with a user interface, an amount owed by other group members. The service provider can collect funds from each of the group members as repayment based on the inputs provided via the user interface. In some examples, the user interface can be configured to update in real-time based on inputs from individual users. In some examples, the user interface can be referenced as a "split input user interface." Integration of merchant payments such as via physical payment instruments and digital payment instruments may also be included. With respect to the fundraising functionality, the functionality associated with the group data object 142 may allow for members to contribute to a sub-account of the group data object 142 for the purpose of collecting funds to be distributed to a recipient. This functionality may be modeled as a peer-to-peer payment from the sub-account to the recipient, and in examples the balance of the sub-account and/or the account of the recipient may be hidden with respect to each other. With respect to the recurring payment functionality, this functionality may also be implemented as a peer-to-peer or user-to-merchant payment. In this example, funds may be withdrawn from the sub-account of the group data object based on a scheduled payment and/or based on a trigger event occurring such as a certain day occurring, a certain time, a certain amount of funds being held in the sub-account, etc. With respect to the pooling accounts functionality, the sub-account may be utilized to receive funds from the members associated with the group data object and certain permissions may be maintained for utilizing these funds. Such permissions may include who can spend/withdraw, how much can be spent/withdrawn, and when such transactions may occur. In some examples, a trust-based model may be implemented where the system shares a digital wallet with user accounts that are predefined to be trusted while allowing for other access restrictions for other groups of users. By formatting the functionalities in this way, most processes can be implemented as peer-to-peer payments.

Additionally, in certain examples the group data objects 142 may be configured to persist beyond an individual action. In such examples, the group data object 142 may be stored and managed over time by the payment service 104. Data for each group data object may include a name, current members (e.g., user accounts associated with the group data object), previous members, member management details (e.g., permissions, controls, etc.), linked sub-account(s), a current purpose, previous purpose(s), historical activity associated with the group data object, and other data associated with group data objects, such as communications sent between group members, etc.

Furthermore, if group creation is bundled with activity, both enablement and creation of the group and enablement of the activity may be performed at the same time and separate components may not be necessary for both of these processes. And with respect to group activity, various types of group activity may be permitted. For example, participant permissions configurations and enforcement (e.g., invite other users, spend funds, etc.) may be implemented. Additionally, feed/history (which may be distinct from application-level activity feeds) that shows information directly relevant to a given user account may be implemented. For example, group data objects may have their own activity feeds such as deposits made to a sub-account of a given group data object, transactions entered into on behalf of the group data object, donations made by the group data object, addition or removal of members from the group data object, etc. The group data object activity feed may be viewable by user accounts associated with the group data object, and user interfaces showing the group data object activity feed may change dynamically as group-related activities are engaged in. Separate from this, group-related activity may also impact individual user accounts and thus a sub-feed associated with those individual user accounts may also be generated and may change as group-related activities are engaged in. For example, certain group-related activities may impact a given user account, such as when a withdrawal from the user account is made and deposited into a sub-account of a group data object. Additional examples may include the user account being added as a member to the group data object, the user account being associated with given access and/or use controls associated with the group data object, investment-related changes occurring for the group data object that impact specific investments associated with the given user account, etc. When these group-related activities occur, the sub-feed for a given individual user account may be updated dynamically and, in examples, in real time, to reflect these activities and how these activities impact the user account at issue.

In some examples, a group data object may be associated with multiple transactions. By way of example, a group data object associated with a trip can involve various users paying for different things like hotel, car, etc. In existing techniques, users may repay the user who purchased the hotel via a first repayment transaction and the user who purchased the car via a second repayment transaction. Here, individual transactions affecting a group of users can be tracked in a ledger associated with the group data object. That is, the payment service 104 can log individual transactions and indications of user(s) who paid for each transaction. When multiple transactions have been completed, the payment service 104 can determine how repayment is to be allocated to reduce the number of repayment transactions that are needed to ensure each group member who purchased an item is made whole. By way of continued example, a first user may pay $99 for a ride share, a second user may pay $60 for movie tickets, a third user may pay $120 for food, and the users may desire to pay for everything equally (e.g., $93 each). If each expense had been split, six peer-to-peer payments would have been utilized (two peer-to-peer payments to the first user, two peer-to-peer payments to the second user, two peer-to-peer payments to the third user, and so on). However, by utilizing techniques described here, the payment service 104 can determine that the second user owes the first user $6 and the third user $27. In this way, the system can reduce the number of peer-to-peer payments exchanged via the service provider, thereby conserving computing resources and reducing network congestion.

In addition to the above, group data object financial activities may be characterized and those characterizations may be utilized to determine how to proceed when a group activity occurs. For example, understanding the fundamental attributes of group-related activities may help in building flexible functionalities that can easily accommodate different applications and/or purposes. Explicitly expressing features in these terms allows for the payment service 104 to determine how the features associated with given group data objects 142 are similar and different in technical implementation, in addition to clarifying implicit assumptions about group data object attributes. Each group activity feature may be expressed as a combination of several example features, including sub-account funding granularity (such as whether funding includes a continuous independent push of funds, a one-time pull of funds, etc.), spending granularity (whether sub-account funds are continuously spent or there are multiple spends or there is a one-time withdrawal), funding windows (whether there is a pre-specified deadline for funding, a later-specified or determined deadline for funding, or no deadline for funding), spending windows (which may include open spending windows that are immediately available or become available simultaneously with funding, windows open after funding closes, windows open after criteria met such as a given number of days or after a certain amount of funding is reached), ownership balances (including whether those balances are shared by all group member accounts, whether those balances are owned by one user account that may be creator of the group data object or another user account), etc.

Additionally, purposes may be applied to these and other possible features. By way of example, a given purpose may be "saving for a goal" and in this example the multiple features may be continuous sub-account funding granularity, one-time or multiple spend spending granularity, a pre-specified deadline funding window, a spending window after funding has closed, and shared ownership across user accounts. A given purposes may be "general savings" and in this example the multiple features may be continuous funding granularity, continuous spending granularity, an open funding window, an open spending window, and shared ownership. A "pooled buy" purpose may be associated with a continuous funding granularity, a one-time spending granularity, a pre-specified deadline funding window, a spending window that closes after funding, and a one-account ownership model. A "split pay" purpose may be associated with a one-time funding granularity from a given user account, a one-time spending granularity, a pre-specified deadline funding window, a spending window that closes during or after funding, and a one-account or shared ownership model. A "splitting expenses" purpose may be associated with a continuous or multiple split-pulls funding granularity, a continuous spending granularity, an open funding window, an open spending window, and shared ownership. A "fundraising" purpose may be associated with a continuous funding granularity, any spending granularity, a pre-specified deadline funding window, a spending window that closes after funding, and a one-account ownership. An "investing together" purpose may be associated with any funding granularity and spending granularity, a pre-defined funding window and spending window, and shared ownership.

While not all group data objects may fall into this framework, it may be utilized as an example framework. For example, a "split pay" example was included above but may be fundamentally unlike the other features in the common "one person fronts payment" embodiment. It may also not be necessarily a group activity as in its common form of "pay back one person" because the relationship as between the parties is 1-to-n rather than n-to-n. With respect to the fundraising purpose, general donations may not have group-like form. In some of these examples, the user accounts involved may not need to be in a group data object. However, in other examples, group functionality as described herein may be beneficial and the framework described above may be utilized. With respect to operations to be performed when funds are taken out of a group sub-account, the framework described above may be utilized to transfer, spend, provide a refund (including after closing a group data object and when participation is canceled for a user account in question).

With respect to the stored balance accounts as described herein, the infrastructure associated with these stored balance accounts at the payment service 104 may transition from each stored balance account being owned by one user account and being associated with one currency to stored balance accounts being owned by multiple user accounts and potentially being associated with multiple currencies. As such, "hidden" balances may be determined and may be a balance that belongs to a user account but is invisible to that account and does not count towards the total owned balance a user of that account sees. To implement these features, the payment service 104 may not need to implement shared balances as a literal stored balance account belonging to multiple accounts, instead, in a first option, a hidden new group type stored balance account may be created for the activity in question and that account may be identified as belonging to the user account that created the group data object. In a second option, a hidden new group type stored balance account may be created for each user account joining the group data object. Group balance may display as a sum of the members' balances. This may allow for contributions per user account being automatically tracked, which makes prorated spending and refunds more achievable. Additionally, folders may be utilized to provide user-visible stored balance accounts (considered a part of the users' total balances), and these folders may be created for a specific purpose like "party fund" or other user accounts receiving permission to interact with the balance.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
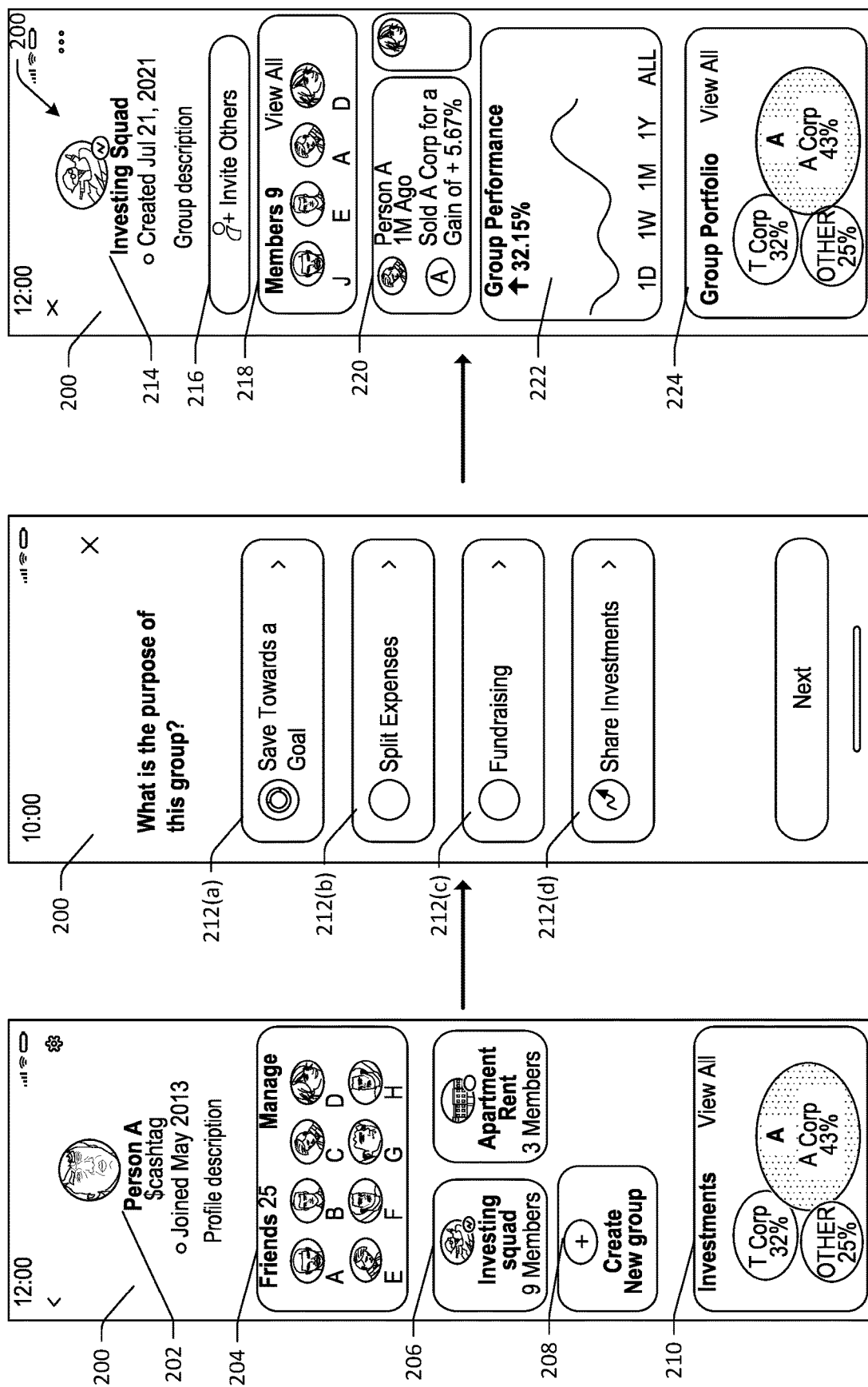
FIG. 2 is an example user interface displayed on an example user device, where the user interface is configured to present information and functionality related to group data objects, according to an embodiment described herein.

FIG. 2 is an example user interface 200 displayed on an example user device, where the user interface 200 is configured to present information and functionality related to group data objects, according to an embodiment described herein. The user interface 200 may be the same or similar to the user interface 120 described with respect to FIG. 1. As shown in FIG. 2, changes to the user interface 200 may occur as user input data associated with group data objects is received. Those changes are depicted with respect to FIG. 2 from left to right.

Initially, the user interface 200 may display information associated with a personal user account or otherwise a "home page" or profile associated with a given user. In the example of FIG. 2, the personal user account may include a user identifier 202, which may include the name of the user or an alias of the user, a hashtag associated with the user, and potentially other identifying information such as an image associated with the user and information indicating when the user registered with the payment service described herein. The user interface 200 may also include representations 204 of other users, which can be friends, contacts, social network connections, users with whom the user has been in group(s) with previously, users with whom the user has previously interacted, users with whom the user has recently interacted, users with whom the user interacts with most frequently, etc.

Additionally, the user interface 200 may include representations 206. Each of the representations 206 may be associated with a group data object generated as described herein. In FIG. 2, the user in question is associated with two group data objects, namely, group data objects with the identifiers of the "investment squad" and "apartment rent." The group representations 206 may also include identifying information associated with the group data objects, such as the name of the group data objects, text or symbols indicating a purpose for the group data objects, an indication of how many members are currently associated with the group, or other identifying information. In addition to the representations 206 of already-established group data objects, the user interface 200 may also include a create group element 208. The create group element may be selected to cause the user interface 200 to transition to displaying information about and enabling receipt of input for creating a new group. The user interface 200 may also include other information 210 associated with the personal user account, such as performance of the user's investments, as shown in FIG. 2. This other information 210 is personal to the user account at issue and even though the user is associated with group data objects, the other information 210 is not viewable or alterable by members of those group data objects absent permission from the user at issue.

Once the create group element 208 is selected on the user interface 200, the payment application may cause the user interface 200 to be updated such that the user can initiate input of information for forming the group data object. In the example of FIG. 2, the user interface 200 may prompt the user to provide input on the purpose of the group to be formed. While any number of purposes may be presented to the user or input by the user, the purpose indicators 212(a)-(d) shown in FIG. 2 include "save towards a goal," "split expenses," "fundraising," and "share investments." The user may provide user input data selecting one of these purposes. In addition to, or instead of, using user input data to select a group purpose, one or more operations may be performed to automatically identify a group purpose. For example, context data associated with the user(s) that are creating a group may be utilized for group purpose determination. Such context data may include, for example, prior group data objects the user(s) have created, prior transactions the user(s) have engaged in, users that have been invited to be associated with the group, current group data objects that the user(s) are involved with, group creation timing, group naming, geolocation of users, interests of users, calendars, upcoming events, text message data, email data, social media interactions, etc. As described in more detail elsewhere herein, selection of a given purpose indicator 212(a)-(d) may cause certain functionality associated with group data objects to be enabled to help fulfill the purpose at issue, while other functionality not associated with the purpose may remain disabled. It should be understood that in some examples the user need not provide any input selecting a purpose for the group. In these examples, default functionality may be associated with the group data object, when generated. Or, certain functionality may be associated with the group data object based on a group purpose that was intelligently determined by the system utilizing context data.

The user interface 200 may then cause display of information associated with the formed group data object. Such information may include, for example, a group identifier 214 that may include a name of the group, a date the group was created, an image associated with the group, an image or other identifier of the group purpose, and a description of the group, if any. The user interface 200 may also include an invite element 216, which may be selected by members of the group to invite other user accounts to join the group and be associated with the group data object. It should be understood that in some examples every member of the group may be able to invite user accounts, while in other examples access controls may prohibit at least one user account from selecting the invite element 216. In these examples, the invite element 216 may not be displayed on the user interface 200 as viewed by the user account with access controls in place.

The user interface 200 may also include member indicators 218. The member indicators 218 may include identifying information of the user accounts that are associated with the group data object. In examples, a given group data object may be private (e.g., not-searchable or otherwise accessible to users who are not members of the group), public (e.g., searchable or otherwise accessible to users who are not members of the group), internal to the payment application (e.g., users with user accounts can access), shared between the payment application and other applications (e.g., users with user accounts associated with the payment application and/or other applications can access), etc. When a given group data object is private, members of the group data object may be able to access functionality associated with the group data object and user interfaces may include identifiers of these group data objects in a similar manner as group data objects that are public. However, for non-members, identifiers of the group data objects may not be included in user interfaces utilized for searching for groups or using group functionalities. To the contrary, public group data objects may be reflected in user interfaces for any user accounts associated with the payment service. In some examples, identifiers of such group data objects may also be made available on user interfaces outside of the payment application described herein, such as in a social media application that indicates details of the group data object in question. Furthermore, individual transactions and activity associated with a group may be accessible or restricted based on individual users at issue, permissions and access controls, data indicating when users joined and/or were dissociated with a group, etc. For example, a first user in a group may be able to see some transactions but not other transactions based on permissions or access controls. As another example, new users to a group may be restricted from accessing previous group activity and users that leave a group may not be able to access group activity that occurs after the user has left.

In some examples, the group membership (e.g., the members represented by member indicators 218) may be intelligently suggested or recommended by the payment service, for example, based on contextual data as described above. In other examples, individuals comprising the group membership can be added by user invite as described above.

The user interface 200 may also include an activity feed 220. The activity feed 220 may show recent activity associated with the group data object, which may be viewed by some or all of the members of the group. In the example of FIG. 2, the activity feed 220 includes an indication that a member of the group sold stock one minute ago and the activity feed 220 shows that the stock was sold for a given amount of gain. The activity feed 220 may be scrollable such that other activities not currently displayed may be viewed by the user. The user interface 200 may also include a group metric 222, which may be associated with the group purpose. In the example of FIG. 2, the group metric 222 is associated with investments as that was the selected group purpose. The group metric 222 may show performance of the investments of the group of users with respect to the purpose at issue. Additionally, the user interface 200 may include other group information 224, which may include any other information associated with the group that is not displayed in the other elements described herein. This other group information 224 may be viewable by members of the group of users, but may not be viewable or otherwise usable by user accounts that are not associated with the group data object in question. In some examples, the other group information 224 can include a progress tracker to track progress in reaching a goal, a health metric indicating the financial health of the group, and so on.

Figure 3:
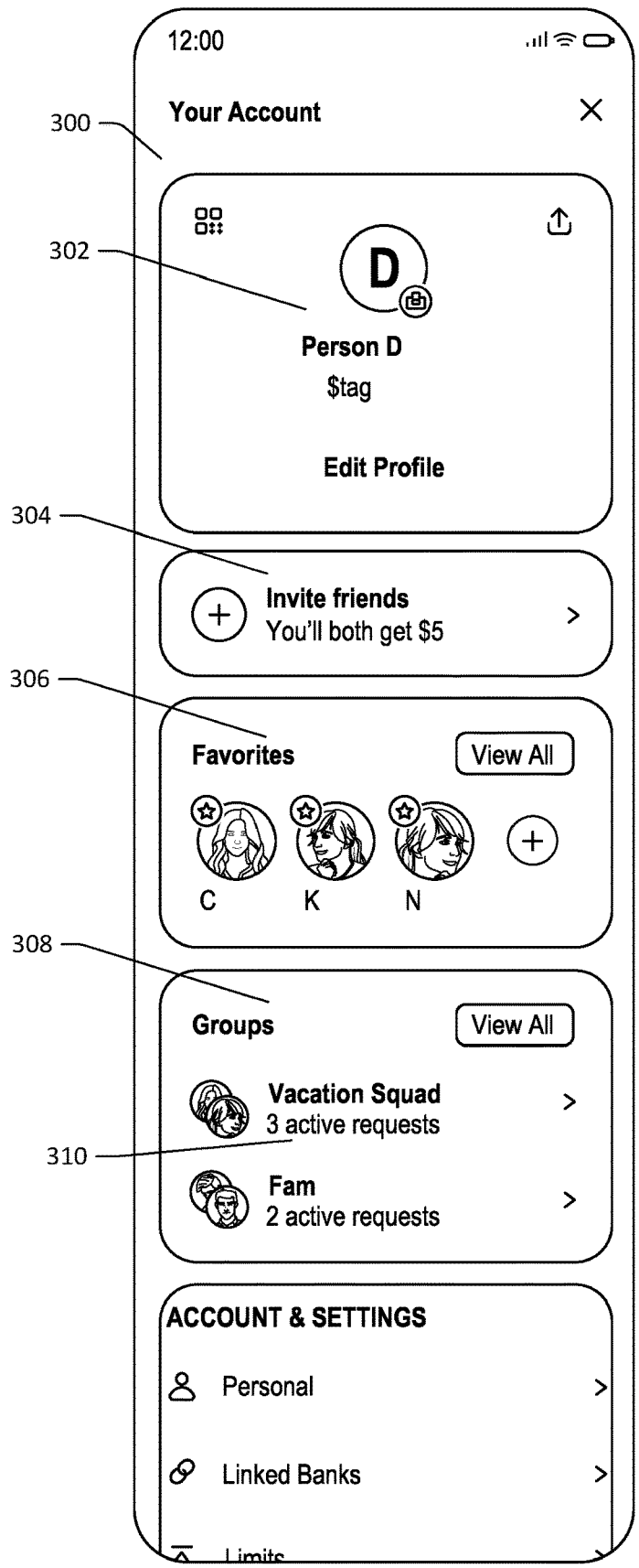
FIG. 3 is an example user interface displayed on an example user device, where the user interface is configured to present a real-time activity feed associated with group data objects.

FIG. 3 is an example user interface 300 displayed on an example user device, where the user interface 300 is configured to present a real-time activity feed associated with group data objects. The user interface 300 may be the same or similar to the user interface 120 described with respect to FIG. 1.

As shown in FIG. 3, information associated with a personal user account may be displayed on a user device. The user interface 300 may include some of the same information as the user interface 200 described above. For example, the user interface 300 may include a user identifier 302, which may include the name of the user or an alias of the user, a hashtag or other tag associated with the user (e.g., that can be used for identifying the user and, in some examples, in lieu of payment data), and potentially other identifying information such as a picture associated with the user and information indicating when the user registered with the payment service described herein. The user interface 300 may also include a referral element 304 that can be used to invite other users to join the payment service.

Additionally, the user interface 300 may include favorites representations 306. The favorites representations 306 may include identifiers of user accounts that the user at issue interacts with most frequently, most recently, above a threshold number of times, above a threshold amount, or has been designated by the user as a "favorite." Such interactions may be any interactions, but by way of example may be peer-to-peer transactions, messaging, social media interactions, investment-related interactions, etc. The user interface 300 may also include group representations 308, which may be the same or similar to the group representations 206 described with respect to FIG. 2. Each of the group representations 308 may be associated with a group data object generated as described herein. In FIG. 3, the user in question is associated with two group data objects, namely, group data objects with the identifiers of the "vacation squad" and "fam." The group representations 308 may also include identifying information associated with the group data objects, such as the name of the group data objects, text or symbols indicating a purpose for the group data objects, an indication of how many members are currently associated with the group, or other identifying information.

As shown in FIG. 3, each group may also be associated with an active request indicator 310. The active request indicator 310 may indicate a number of requests associated with a given group data object that are unresolved. The request may be requests for other user accounts to join the group of users. The requests may also include requests made by members of the group for contributions by other group members. For example, in the "vacation squad" group data object, a user may have requested a certain amount of funds for an item to be purchased for a vacation. If the request has not yet been fulfilled, or in other words the requested amount of funds has not yet been deposited into a sub-account of the group data object, the active request indicator 310 may show that the request is still active.

Figure 4A:
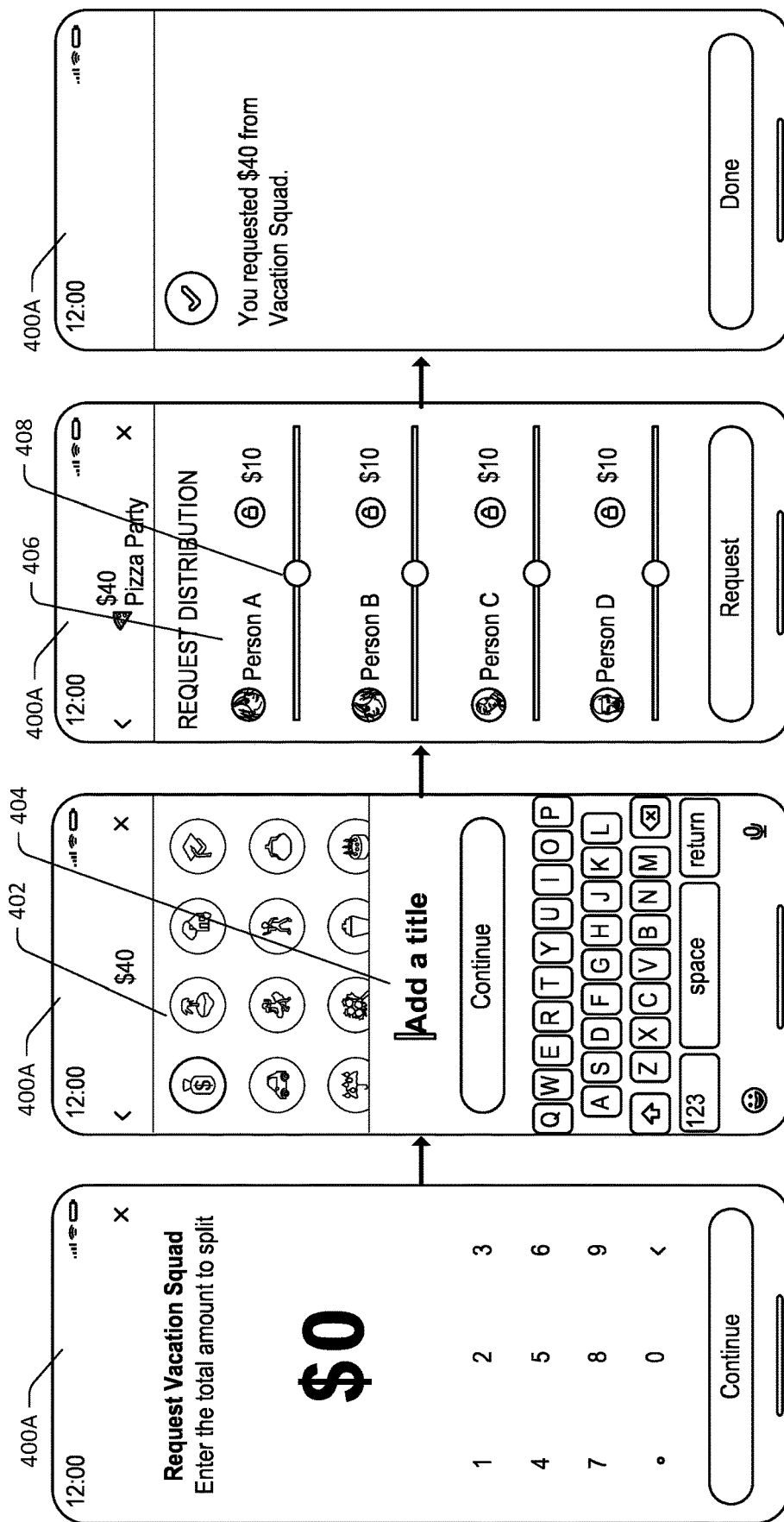
FIG. 4A is an example user interface displayed on an example user device, where the user interface is configured to present functionality associated with contribution distributions for group data objects.

FIG. 4A is an example user interface 400A displayed on an example user device, where the user interface 400A is configured to present functionality associated with contribution distributions for group data objects. The user interface 400A may be the same or similar to the user interface 120 described with respect to FIG. 1. As shown in FIG. 4A, changes to the user interface 400A may occur as user input data associated with group data objects is received. Those changes are depicted with respect to FIG. 4A from left to right.

To start, the user interface 400A may be displayed when a user selects functionality for making a request in association with a group data object. In the example of FIG. 4A, the group data object for "vacation squad" may be associated with the user account at issue, and the user for the user account may have selected an element associated with requesting funds to be deposited into a sub-account of the group data object by members of the group. Once selected, the user interface 400A may be displayed on the user device. The user interface 400A may include an input field for entering an amount of funds to be requested.

The user interface 400A may then be caused to display functionality for identifying the request and a purpose for the request. For example, an image identifier 402 may be selected by the user to provide a pictorial representation of the purpose for the request. Additionally, a text field 404 may be displayed on the user interface 400A. The text field 404 may be configured to receive text input from the user indicating a narrative for the request, such as, in the example of FIG. 4A, "pizza party."

The user interface 400A may then be updated to allow for selection of user accounts that the request is to be associated with and an amount of the funds to be requested from each user account of the group data object. As shown in FIG. 4A, the user interface 400A may include user indicators 406 of the user accounts associated with the group data object as well as an apportionment element 408 that may be utilized to apportion the requested amount of funds as between user accounts. In the example of FIG. 4A, the apportionment element 408 may be a slider bar that may be manipulated by the user to cause the amount of funds to apportion to a given user to be increased or decreased. In a situation where the total requested amount of funds is a set amount of funds, for example $40, sliding of the slider bar for one user account may cause a proportionate change in the slider bars and apportioned amounts associated with the other user accounts. For example, each of four user accounts may be initially indicated as evenly splitting the requested amount ($10 requested from each user account). However, if the requesting user slides the slider bar such that $7 is requested from a first user account, the amounts requested from the other user accounts may adjust to make up the difference in the decreased amount requested from the first user account (in this example, the other three sliders would move to show an increase in requested funds for the other user accounts from $10 to $11). The user may also "lock" a given requested amount for a user account, and in this example changes made to the requested amount for other user accounts will not cause the locked amount to change. Once the requesting user is satisfied with the distribution of requested amounts across the various user accounts of the group data object, the user interface 400 may be updated to show that the request has been made.

Once the request is made, a notification may be sent to devices associated with the various user accounts. The notification may show information identifying the group data object, identifying the requesting account, and providing an indicator of the amount of funds that was requested. The notification may be selectable to navigate to a user interface where user input data may be received to accept the request and initiate a transfer of funds from the individual user's account to the sub-account of the group data object, or to reject or augment the request.

Figure 4B:
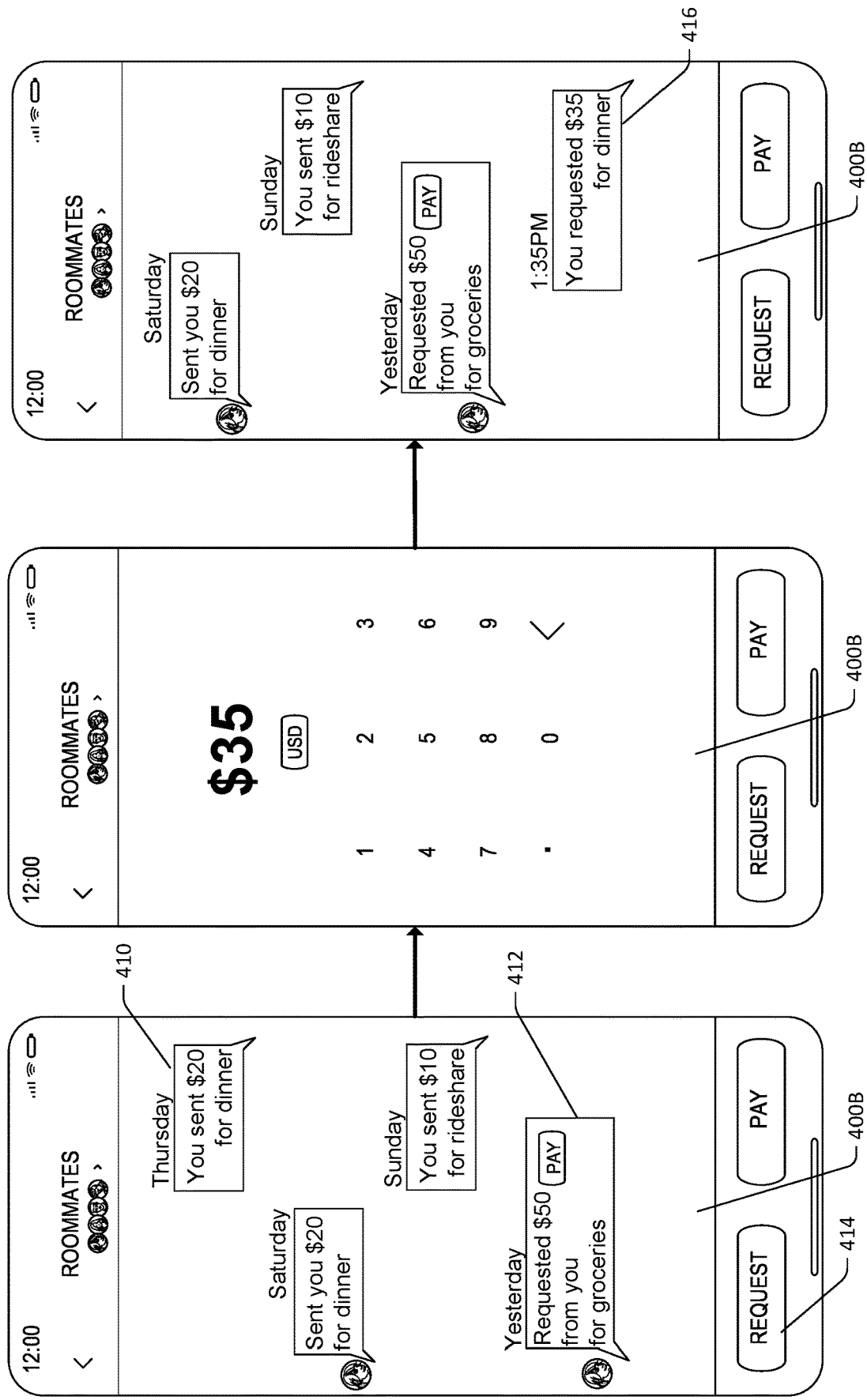
FIG. 4B is an example user interface displayed on an example user device, where the user interface is configured to present functionality associated with incorporating group-related activity in a communication string.

FIG. 4B is an example user interface 400B displayed on an example user device, where the user interface 400B is configured to present functionality associated with incorporating group-related activity in a communication string. The user interface 400B may be the same or similar to the user interface 120 described with respect to FIG. 1. As shown in FIG. 4B, changes to the user interface 400B may occur as user input data associated with group data objects is received. Those changes are depicted with respect to FIG. 4B from left to right.

To start, the user interface 400B may display activity related to a group data object in the form of a communication string. In at least one example, the communication string can be presented in a conversational view, wherein individual transactions are represented by individual messages. In some examples, the communication string can comprise threaded messages, for example, an email thread or messaging platform thread. In an example, a group data object for a group of users may have an identifier, such as "roommates" as shown in FIG. 4B, and photographs and/or other pictorial representations of the users in the group may be displayed. Additionally, when interactions occur with the group data object, those interactions may be displayed using the user interface 400B in the form of events and/or communications. Using FIG. 4B as an example, a first interaction 410 may be displayed that indicates a user profile associated with the user device has interacted with the group data object. In this example, the interaction is that the user profile was utilized to send $20 for dinner to the group data object and/or to another user profile associated with the group data object on Thursday. The user interface 400B may also be utilized to display interactions of other user profiles with the group data object, such as a given user profile sending the user profile in question and/or the group data object "$20 for dinner."

In addition to the above, payment requests 412 may also be made and displayed using the communication string. As shown in FIG. 4B, a given user profile is associated with a request for $50 that was made from the user profile to another user profile associated with the group data object. The payment request 412 may indicate the amount of money requested, which user profiles the request is made to, and/or the purpose of the request (here being "for groceries" by way of example). The payment request 412 may also include an interactive element that may be selected to initiate a process for responding to the payment request 412, such as to initiate a process for making a peer-to-peer payment to the requesting user profile.

In addition to visualizing requests for payment made by other users associated with the group data object, as shown in FIG. 4B, the user interface 400B may be utilized to request payment from the group data object and/or from other user profiles associated with the group data object. To do so, a request element 414 may be selected, which may cause the user interface 400B to display functionality for entering an amount of money to request from the other user profile(s). As shown in FIG. 4B, the requested amount was entered as $35, by way of example.

Once the amount of requested money (or other currency) is selected, the request may be generated and sent to user devices of the other user profile(s) associated with the request. When the request is received, the request may be included in the communication string as shown in FIG. 4B.

Inclusion of the request may result in a request indicator 416 being included in the communication string along with information associated with the request, such as the amount requested, to whom the request was made, and/or the purpose for the request. Inclusion of new interactions in the communication string may result in older interactions being "pushed" out of view on the user interface 400B. However, the user interface 400B may be scrollable such that a user may be enabled to scroll through previous interactions to visualize them as needed.

In addition to the above, request and/or payment progress may be displayed on the user interface 400B. For example, a given group user may request $20 from each of 4 other users associated with the group data object. The initial payment request 412 may indicate this information and allow for the 4 other users to respond with their payments. As users pay on the payment request, a status and/or progress of the payment request 412 may change to show which payments have been made. This may cause the payment request 412 to be moved to a most-recent portion of the communication string, in examples.

Figure 4C:
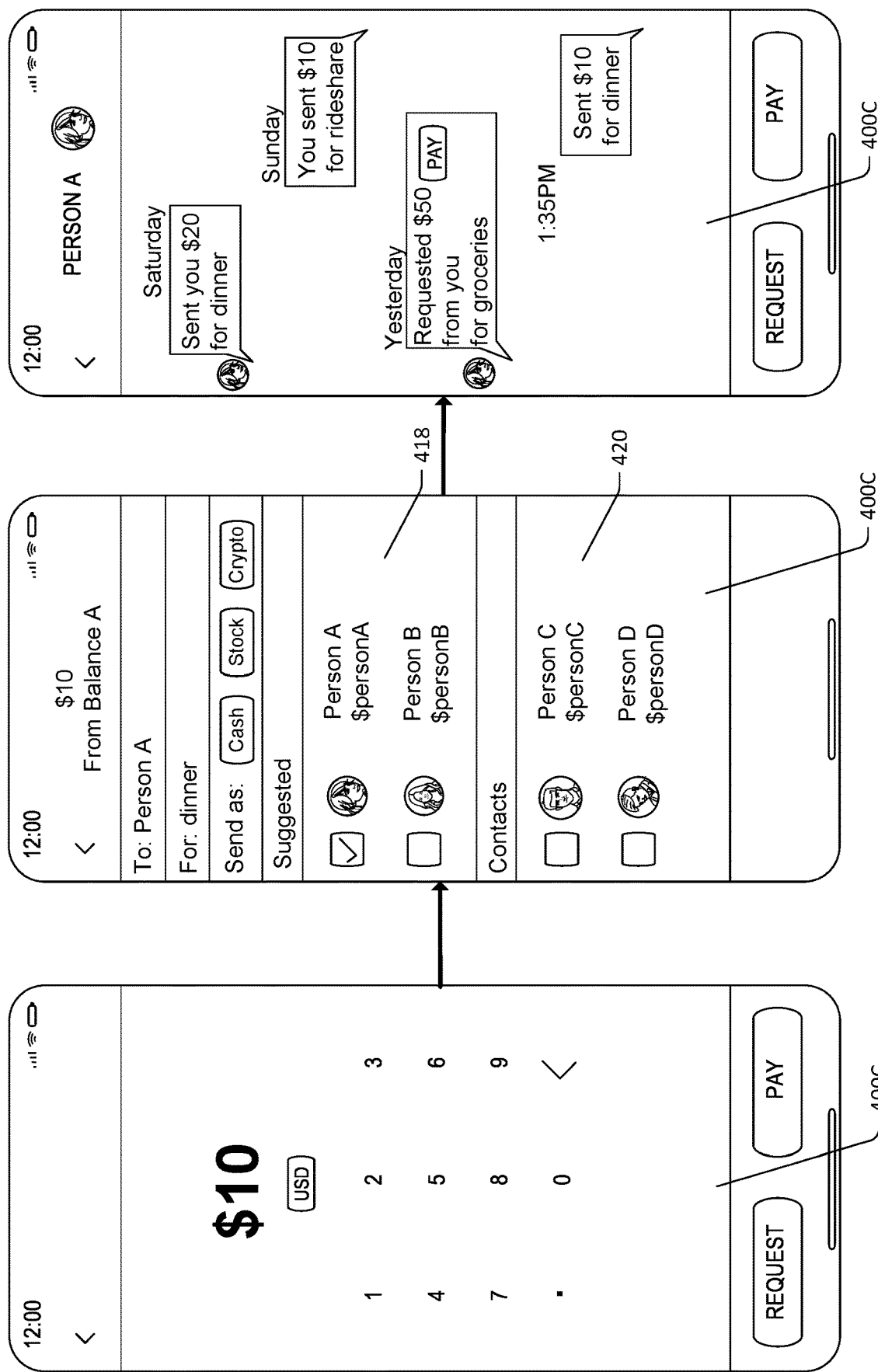
FIG. 4C is an example user interface displayed on an example user device, where the user interface is configured to present functionality associated with formation of a group data object from a peer-to-peer payment.

FIG. 4C is an example user interface 400C displayed on an example user device, where the user interface 400C is configured to present functionality associated with formation of a group data object from a peer-to-peer payment. The user interface 400C may be the same or similar to the user interface 120 described with respect to FIG. 1. As shown in FIG. 4C, changes to the user interface 400C may occur as user input data associated with group data objects is received. Those changes are depicted with respect to FIG. 4C from left to right.

To start, a first user profile may initiate a peer-to-peer payment with a second user profile. In this example, the first user profile and the second user profile may not have a prior group-related affiliation or otherwise be associated with the same group data object. However, the peer-to-peer payment may be utilized to generate a group data object that associates the first user profile and the second user profile as a group. To do so, the first user profile may initiate a peer-to-peer payment by indicating an amount of money or other currency to be sent from the first user profile to the second user profile. In the example of FIG. 4C, the amount is $10 by way of example.

The first user may then press the "pay" element or otherwise an element displayed on the user interface 400C indicating an intent to make the peer-to-peer payment. The user interface 400C may then transition to displaying input fields for entering details about the peer-to-peer payment. Those input fields may include, for example, a field for indicating the user profile to receive the payment, a field for identifying a purpose for the payment, and/or options for the type of currency in which to make the payment. In addition to the above, the user interface 400C may display suggested user profiles 418 for the recipient of the payment. The suggested user profiles 418 may be based at least in part on past payments, social relationships, user preferences, and/or any other data available to the payment service described herein. The user interface 400C may also display other user profiles 420 even if those user profiles are not suggested user profiles 418, such as user profiles that are contacts of the sender user profile. As shown in FIG. 4C, the user of the user device has selected Person A as the recipient of the peer-to-peer payment.

Once the input fields are filled for the peer-to-peer payment, the user may confirm that the payment is to be made. At this point, in addition to facilitating the payment from the stored balance account of the first user profile to the stored balance account of the second user profile, the occurrence of the peer-to-peer payment may initiate creation of a group data object as described herein. In this example, the group data object may be associated with two user profiles. In other examples, however, the peer-to-peer payment and/or a series of such payments may result in the generation of a group data object with multiple user profiles. When this occurs, activity associated with the group data object may be presented using the user interface 400C. This activity may be presented in a communication string, such as that described with respect to FIG. 4B.

In examples, the communication string may start with an indicator of the peer-to-peer payment that initiated generation of the group data object. In other examples, additional and prior communications between the user profiles may be merged with the payment indicator in the communication string. For example, prior to the payment in question, other payments may have been made between the user profiles and/or the user profiles may have exchanged communications such as via text message and/or messages from the payment application described herein. These communications may be merged with the payment indicator to show a more inclusive view of interactions between the user profiles in question while also creating a group data object as described herein. In some examples, additional user profiles can be added or removed from the group data object over time, as described above.

Figure 4D:
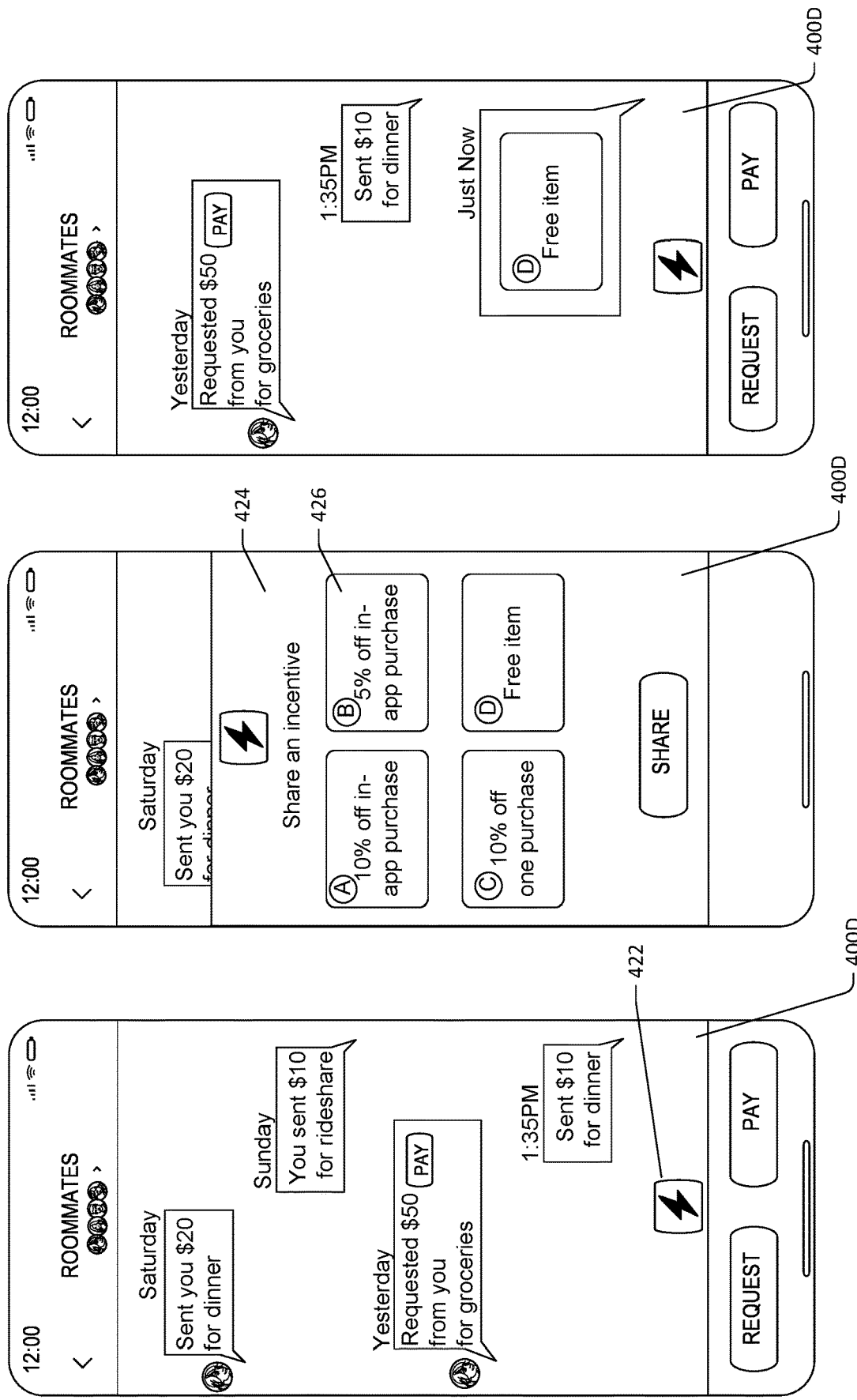
FIG. 4D is an example user interface displayed on an example user device, where the user interface is configured to present functionality associated with sharing an incentive with a group data object.

FIG. 4D is an example user interface 400D displayed on an example user device, where the user interface 400D is configured to present functionality associated with sharing an incentive with a group data object. The user interface 400D may be the same or similar to the user interface 120 described with respect to FIG. 1. As shown in FIG. 4D, changes to the user interface 400D may occur as user input data associated with group data objects is received. Those changes are depicted with respect to FIG. 4D from left to right.

To start, the user interface 400D may display activity related to a group data object in the form of a communication string. For example, a group data object for a group of users may have an identifier, such as "roommates" as shown in FIG. 4D, and photographs and/or other pictorial representations of the users in the group may be displayed. Additionally, when interactions occur with the group data object, those interactions may be displayed using the user interface 400D in the form of events and/or communications. Using FIG. 4D as an example, a given interaction may be displayed that indicates a user profile associated with the user device has interacted with the group data object. In this example, the interaction is that the user profile was utilized to send $20 for dinner to the group data object and/or to another user profile associated with the group data object on Saturday. The user interface 400D may also be utilized to display interactions of other user profiles with the group data object, such as a given user profile sending the user profile in question and/or the data object "$20 for dinner."

In addition to activity indicators, a sharing element 422 may be included. The sharing element 422, when selected, may result in a sharing screen 424 being displayed on the user interface 400D. In some examples, the user interface 400D can have one or more sharing elements, which can represent different actions or functionalities that can be associated with the group data object. In some examples, the sharing elements presented can be tied to a particular group purpose, individual user or group preferences, recent transactions, or the like. By so doing, attributes associated with the group data object can be utilized to determine which sharing elements to display and/or how to rank or otherwise highlight sharing elements to be displayed using the user interface 400D. The sharing screen 424 may include one or more incentive indicators 426 that are available to the user profile associated with the user device displaying the user interface 400D. As shown in FIG. 4D, four incentive indicators 426 are displayed, with Incentive A being for "10% off in-app purchases," Incentive B being for "5% off in-app purchases," Incentive C being for "10% off one purchase," and Incentive D being for a "free item." It should be understood that any incentives may be displayed in the sharing screen 426, and the incentives shown in FIG. 4D are provided by way of example only. User input may be received selecting one or more of the incentive indicators 426. Once selected, the incentive indicator 426 may be displayed in the communication string along with other interaction indicators for the group data object in question. As shown in FIG. 4D, the user input is to select Incentive D to be shared with the group of users and that incentive indicator 426 is then included in the communication string displayed via the user interface 400D.

Figure 5:
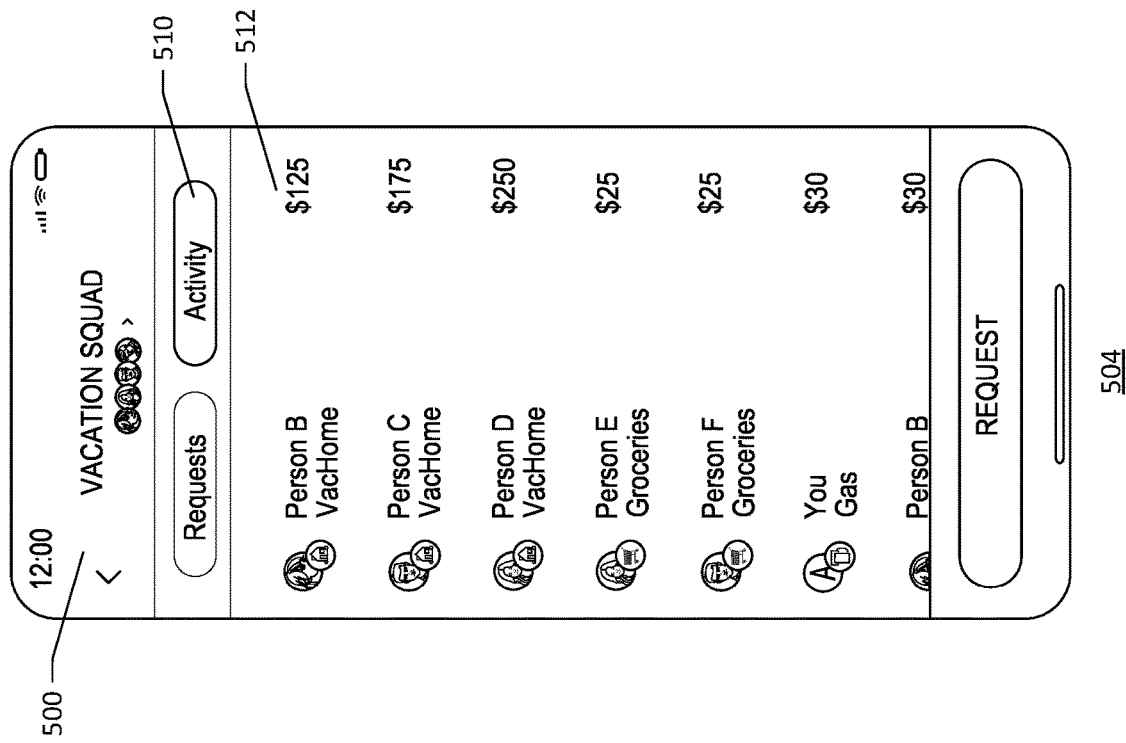
FIG. 5 is an example user interface displayed on an example user device, where the user interface is configured to display representations of funds in a sub-account associated with a group data object and to display representations of fund thresholds for enabling functionality associated with the group data object.
Figure 5:
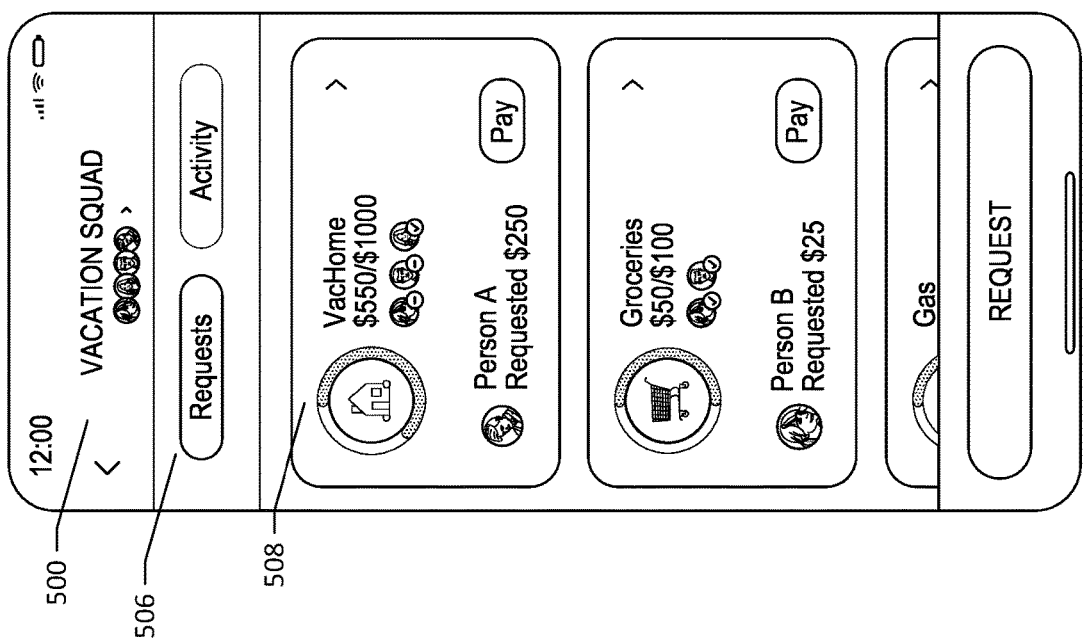

FIG. 5 is an example user interface 500 displayed on an example user device, where the user interface 500 is configured to display representations of funds in a sub-account associated with a group data object and to display representations of fund thresholds for enabling functionality associated with the group data object. The user interface 500 may be the same or similar to the user interface 120 described with respect to FIG. 1. The user interface 500 described with respect to step 502 depicts a request feed associated with requests made by a user account associated with the group data object. The user interface 500 described with respect to step 504 depicts an activity feed associated with activities that have occurred with respect to the group data object. Each will be described below.

At step 502, the user interface 500 may include a selection element where the user has selected the request portion 506 of the selection element. The request portion 506 may be associated with functionality for viewing information associated with requests made for the group of users and for initiating or otherwise interacting with the requests. Using FIG. 5 as an example, the group data object is associated with the group "vacation squad," and three request representations 508 are visible, namely, "vacation home," "groceries," and "gas." Each request representation 508 may include an identifier of the request (e.g., "vacation home"), an indicator of the amount of requested funds, an indicator of the amount of funds raised toward the fund goal (e.g., a metric indicating progress towards the goal), an image identifier of a purpose for the request, an indicator of the user accounts that have contributed toward the fund goal, an indicator of the user account that requested the funds, and amount of funds specifically requested from the user account at issue from the user account that initiated the request, and an interactive element that may be utilized to initiate deposit of funds into a sub-account of the group data object for the request. By so doing, a user may view the requests that user has made, requests other users have made, activity of other users associated with the group data object, and other information that may assist in raising the requested funds for the sub-account of the group data object.

In step 504, the user interface 500 may include the selection element where the user has selected the activity portion 510 of the selection element. The activity portion 510 may be associated with functionality for viewing recent activity associated with the group data object that may not necessarily be associated with requests from user accounts of the group of users. Activity indicators 512 may be displayed on the user interface 500 and these activity indicators 512 may identify the user account that was involved in the activity in question, an amount of funds associated with the activity if the activity was associated with fund transfer, and if the activity was associated with a request then an identifier of the request may also be displayed in the activity indicator 512. The activity indicators 512 may be ordered based at least in part on which activity was performed most recently or based on user input ordering the activities in a non-time-based order, such as based on amount of funds, for example.

In some examples, a group data object can be particular to a single purpose and, upon satisfaction of the purpose can be disabled and deconstructed. In some examples, a group can be associated with multiple purposes at the same time or at different times. For example, a group may initially be associated with a "savings" goal where individual of the users associated with the group will deposit funds over a period of time to reach a goal such as saving for a vacation. Users for this group may deposit funds over the period of time until a threshold amount of funds is deposited and the savings goal is met. At this point, the purpose of the group may have been fulfilled and the group may be disabled and deconstructed. However, in other examples, even when the initial purpose of the group is fulfilled, an additional purpose may be associated with the group, such as a social purpose, a cost splitting purpose, etc. Using the example above, the purpose of the group may be recommended to transition to the cost splitting purpose given data indicating that the initial purpose was to save for a vacation and it may be inferred that the group will engage in spending during the vacation and may thus want to split costs. In the later example, and as described above, group data objects can persist beyond a single transaction or even single purpose.

Figure 6:
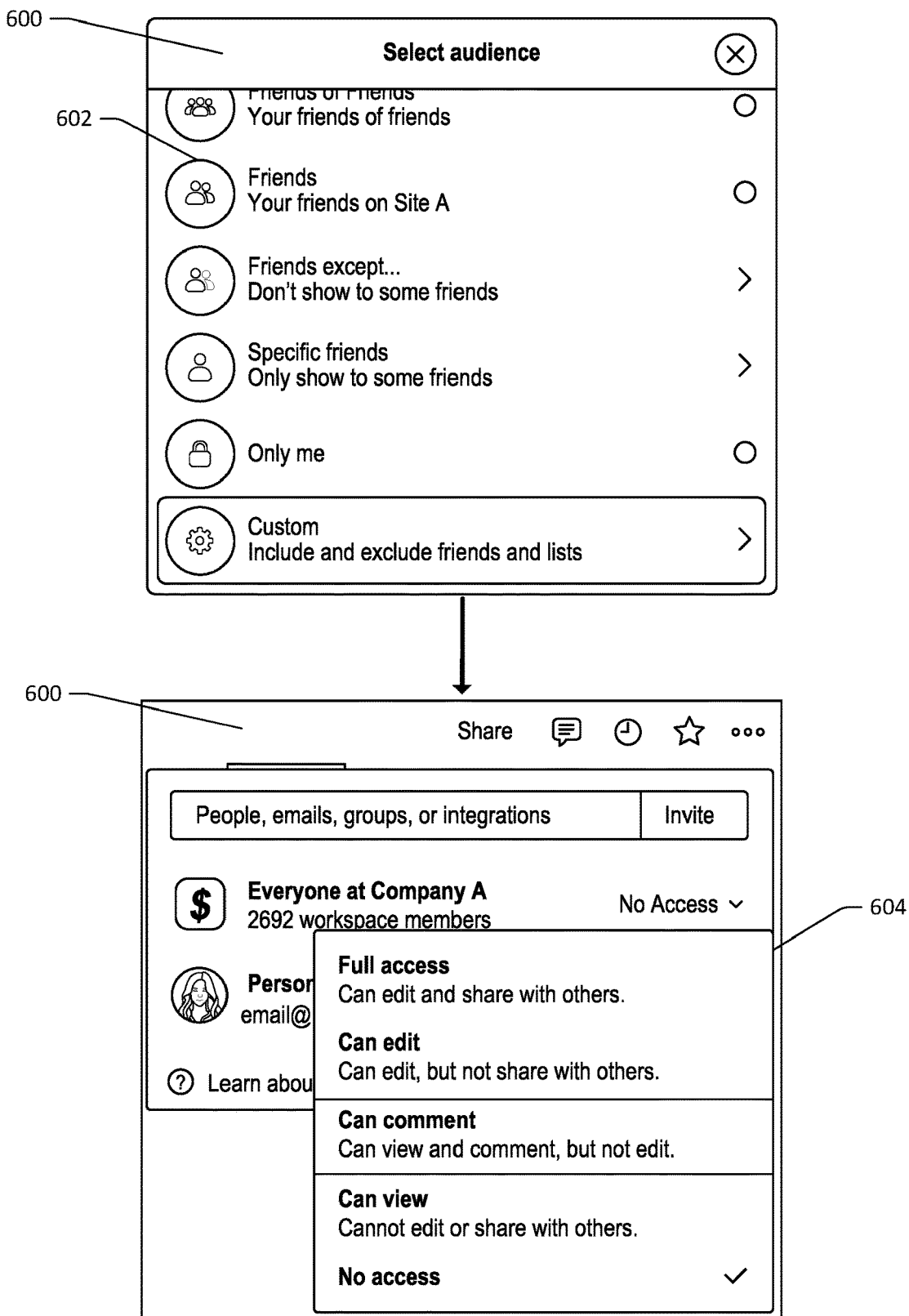
FIG. 6 is an example user interface displayed on an example user device, where the user interface is configured to display access restriction indicators associated with members of a group of users.

FIG. 6 is an example user interface 600 displayed on an example user device, where the user interface 600 is configured to display access restriction indicators associated with members of a group of users. The user interface 600 may be the same or similar to the user interface 120 described with respect to FIG. 1. As shown in FIG. 6, changes to the user interface 600 may occur as user input data associated with group data objects is received. Those changes are depicted with respect to FIG. 6 from top to bottom.

For example, the user interface 600 may be associated with access controls associated with controlling how information is viewed and who can view information associated with a group data object. For example, an audience selector 602 may be displayed on the user interface 600 to provide options for selecting a specific audience to allow to view and utilize information associated with a group data object. In the example of FIG. 6, the audience selector may include a "friends of friends" option that may allow not only those user accounts that are indicated as "friends" to view group data object information but also would allow user accounts that are indicated as friends of the friend user accounts to also view the group data object information. Another option may include a "friends" option, which may limit viewing of group data object information to just those user accounts indicated as friends of the user account at issue. Another option may include a "friends except" option, which may limit viewing of the group data object information to the user accounts indicated as friends of the user account at issue except selected friend user accounts. Another option may include a "specific friends" option, which may limit viewing of the group data object information to just selected friend accounts. Another option may include an "only me" option, which may restrict viewing of group data object information to just the user account in question. Another option may include a "custom" option, where user accounts may be selected by the user at issue whether those accounts are associated with friends, groups, or otherwise.

Once an audience is selected utilizing the audience selector 602, the user interface 600 may be caused to display access controls 604 indicating actions that can and cannot be performed by certain user accounts associated with group data objects. Example access controls 604 may include a "full access" option, which may provide the user account of the group data object with the ability to edit and share information associated with the group data object. The access controls 604 may also include a "can edit" option, which may provide the user account of the group data object with the ability to edit information associated with the group data object but may restrict the ability to share such information. The access controls 604 may also include a "can comment" option, which may provide the user account of the group data object to generate content and post that content in association with the group data object, but may restrict that user account's ability to edit content generated by other user accounts. The access controls 604 may also include a "can view" option, which may provide the user account of the group data object with the ability to view information associated with the group data object, but may restrict that user account's ability to edit or generate content for the group data object. Yet another access control 604 may include a "no access" option, which may restrict essentially allow functionality of the group data object for a given user account without dissociating the user account from the group data object. These access control options may also be described herein as access control tiers. It should be understood that other access controls 604 may be associated with given users to a group. For example, in a payment scenario, the access controls 604 may govern which user accounts can engage in deposits, which user accounts can engage in withdrawal on behalf of the group, which user accounts can make buying and/or selling decisions, which user accounts can utilize group-based incentives, etc.

FIGS. 7-10 are example processes for group data objects and associated functionality enablement. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 11-19, although the processes may be implemented in a wide variety of other environments, architectures and systems.

Figure 7:
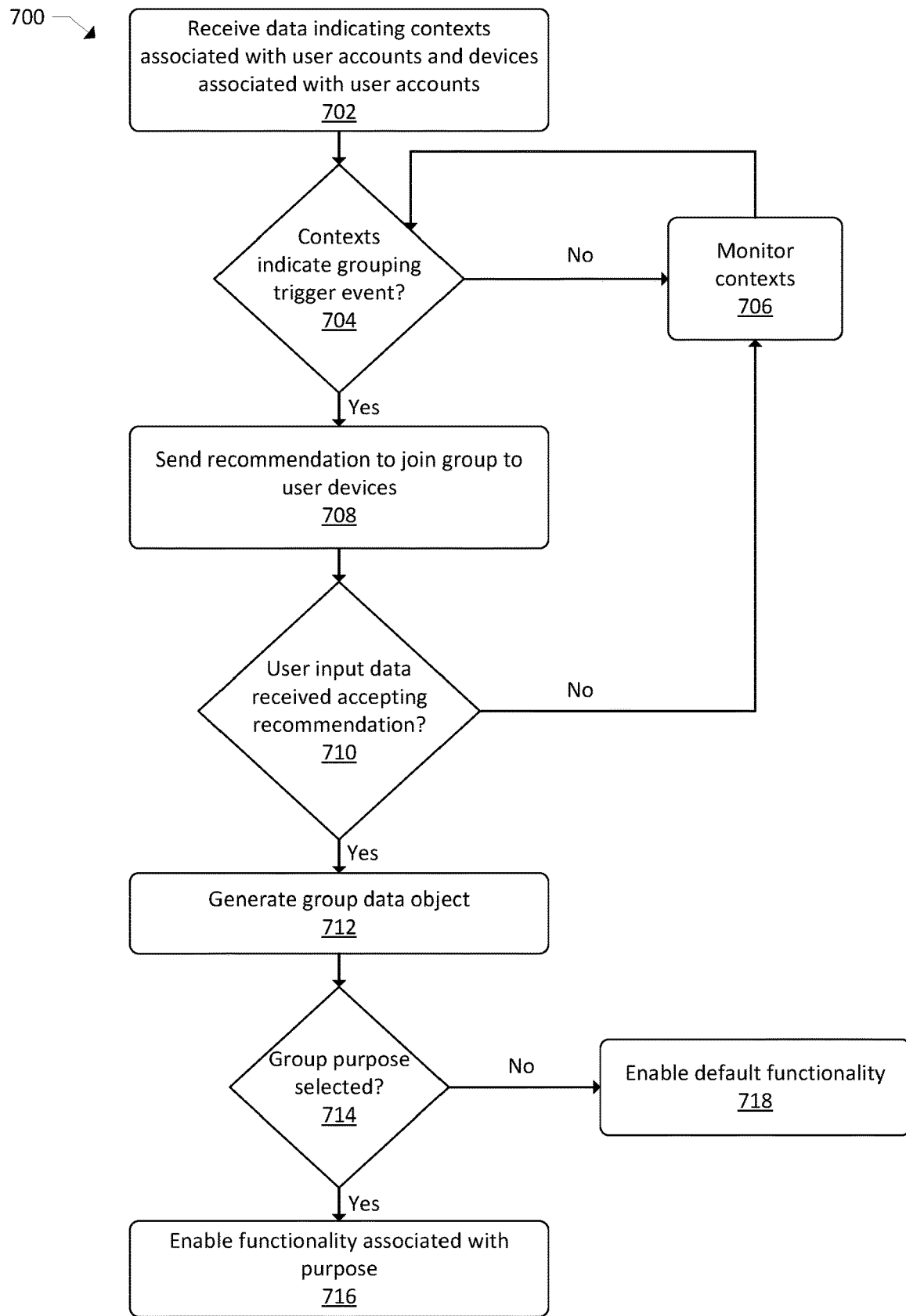
FIG. 7 is a flow diagram of an example process for generating group data objects and associating functionality with those group data objects, according to an embodiment described herein.

FIG. 7 is a flow diagram of an example process 700 for generating group data objects and associating functionality with those group data objects, according to an embodiment described herein. The order in which the operations or steps are described is not intended to be construed as a limitation, and any number of the described operations may be combined in any order and/or in parallel to implement process 700.

At block 702, the process 700 may include receiving data indicating attributes associated with user accounts and devices associated with those user accounts. The data may include any data described herein, and specifically may include any data described with respect to the datastore(s) 130 from FIG. 1. The data may also include location data associated with the devices at issue, prior grouping data, event-related data, data indicating whether a payment application has been installed on the devices at issue, etc. The attributes may include any attributes that may be utilized to determine whether the users in question have similar interests, purchasing patterns, social relationships, etc. It should be understood that the attributes that are analyzed may be dynamic and may be based at least in part on output from a trained machine learning model, as described in more detail with respect to FIG. 14.

At block 704, the process 700 may include determining whether a context indicates a grouping event trigger. The context may be, for example, attributes described at block 702, events and event types, messages, prior group data, prior transaction data, users that have been invited to be associated with the group data object, current group data objects that the user(s) are involved with, group creation timing, group naming, geolocation of users, interests of users, calendars, upcoming events, text message data, email data, social media interactions, etc. The grouping event trigger may include, for example, the devices being located within the same environment as each other, and/or the devices all having an instance of the payment application installed thereon, and/or the user accounts being associated with a given event, and/or the receipt of user input data indicating a request to establish a group of users, for example. In examples, a machine learning model may be generated that is configured to intake the data described herein and to output an indication of whether a group data object should be generated. Feedback data indicating positive and negative feedback on the generated output from the machine learning model may be received and a training dataset may be generated using at least the feedback data. The machine learning model may be trained utilizing the training dataset to generate a trained machine learning model. The trained machine learning model may then be utilized to determine subsequent likelihoods that a group data object should be generated.

In examples where the attributes do not indicate a grouping event trigger, the process 700 may include, at block 706, monitoring the context to determine, at a subsequent time, whether a given user account is associated with a grouping event trigger. In this example, the data associated with the user accounts and the devices at issue may indicate that generating a group data object is not recommended, at least at that time and based on those data.

In examples where the context indicates a grouping event trigger, the process 700 may include, at block 708, sending an actionable recommendation to join a group to the user devices. For example, the actionable recommendation may indicate that the group data object is recommended to be generated and that the user account is recommended to be associated with the group data object. The actionable recommendation may also include details about the recommended group, functionality enabled for the recommended group, and other data that may be useful for the user to determine whether to accept or reject the actionable recommendation. In examples, the actionable recommendation may be in the form of an interactive element that may be selected to enable the payment application to display a user interface associated with the actionable recommendation or the group data object. The interactive element may be sharable with other user accounts and may be embedded with data that may allow the user to accept or reject the actionable recommendation straight from the interactive element and without the need for display of a separate user interface.

At block 710, the process 700 may include determining whether user input data accepting the actionable recommendation has been received. For example, a user may provide user input to accept or reject the actionable recommendation. Corresponding user input data may be generated and sent to the payment service for determining whether a group data object is to be generated or which user accounts are to be associated with the group data object. In other examples, no user input data associated with the actionable recommendation may be received, and in this example the lack of user input data may be interpreted as a rejection of the actionable recommendation. It should be understood that, instead of receiving user input data accepting the actionable recommendation, in instances where the group data object is to be generated automatically as described above, upon determining that the group data object should be generated based on, for example, context data as described above, the system may generate that group data object without requiring additional user input.

In examples where user input data accepting the actionable recommendation has not been received, the process 700 may return back to block 706 where context may continue to be monitored to determine whether additional or different grouping event triggers occur. In examples, one or more guardrails may be provided by the payment service to ensure that certain types of actionable recommendations or a certain number of actionable recommendations are sent to a given device. This may help ensure that a group recommendation is not sent multiple times based on the same data, or that group recommendations are sent too infrequently (at a frequency below a threshold) or on a scheduled basis.

In examples where user input data accepting the actionable recommendation has been received, the process 700 may include, at block 712, generating a group data object. The group data object may include a name, current members (e.g., user accounts associated with the group data object), previous members, member management details (e.g., permissions, controls, etc.), linked sub-account(s), a current purpose, previous purpose(s), historical activity associated with the group data object, and other data associated with group data objects, such as communications sent between group members, etc. Additionally, with respect to the sub-account, it may have funds that may be utilized by the group of users (or a portion of the group of users) and the sub-account may be enabled to receive funds from the individual user accounts.

At block 714, the process 700 may include determining whether a group purpose is associated with the group data object. For example, a user may provide user input data indicating a purpose for the to-be-formed group, and that purpose may inform which user accounts may be candidates for inclusion in the group of users. In other examples, the data utilized to determine to recommend the group may be utilized to determine one or more purposes that the group is intended to be associated with. Example purposes may include savings toward a group goal, splitting expenses, fundraising, sharing investments, association with a given event, etc. When such as purpose is selected, the group data object may be generated and may be associated with the selected purpose. In these examples, additional or alternative functionality may be associated with some or each of the purposes. Also, as described in more detail above, the purpose may be determined by the payment service, particularly using context data as described above. This purpose, when determined by the system, may be determined utilizing machine learning models trained from feedback data indicating attributes of group data objects when associated with various purposes.

In examples where a group purpose is selected, the process 700 may include, at block 716, enabling functionality associated with the group purpose. In this example, a portion of the possible functionality to associate with the group data object may actually be associated with the group data object, while other functionality may be disabled, at least initially. This may promote the savings of computing resources as well as allow for the display of relevant information and functionality on a limited-space screen of the user devices in question.

In examples where a group purpose is not selected, the process 700 may include, at block 718, enabling default functionality for the group data object. For example, a savings purpose may be associated with the ability to facilitate deposits of money into a sub-account of the group data object and to allow one or more of the users to conduct a transaction when a threshold fund amount is received in the sub-account. In the cost splitting example, the functionality may include the ability to allocate costs on a per-member basis, to receive deposits into the sub-account, and to facilitate transfer of funds to other members or to another account not associated with the group data object. Other functionality may be the ability to invest in certain assets, to start or participate in fundraising events, to associate the group data object with an event, etc.

Figure 8:
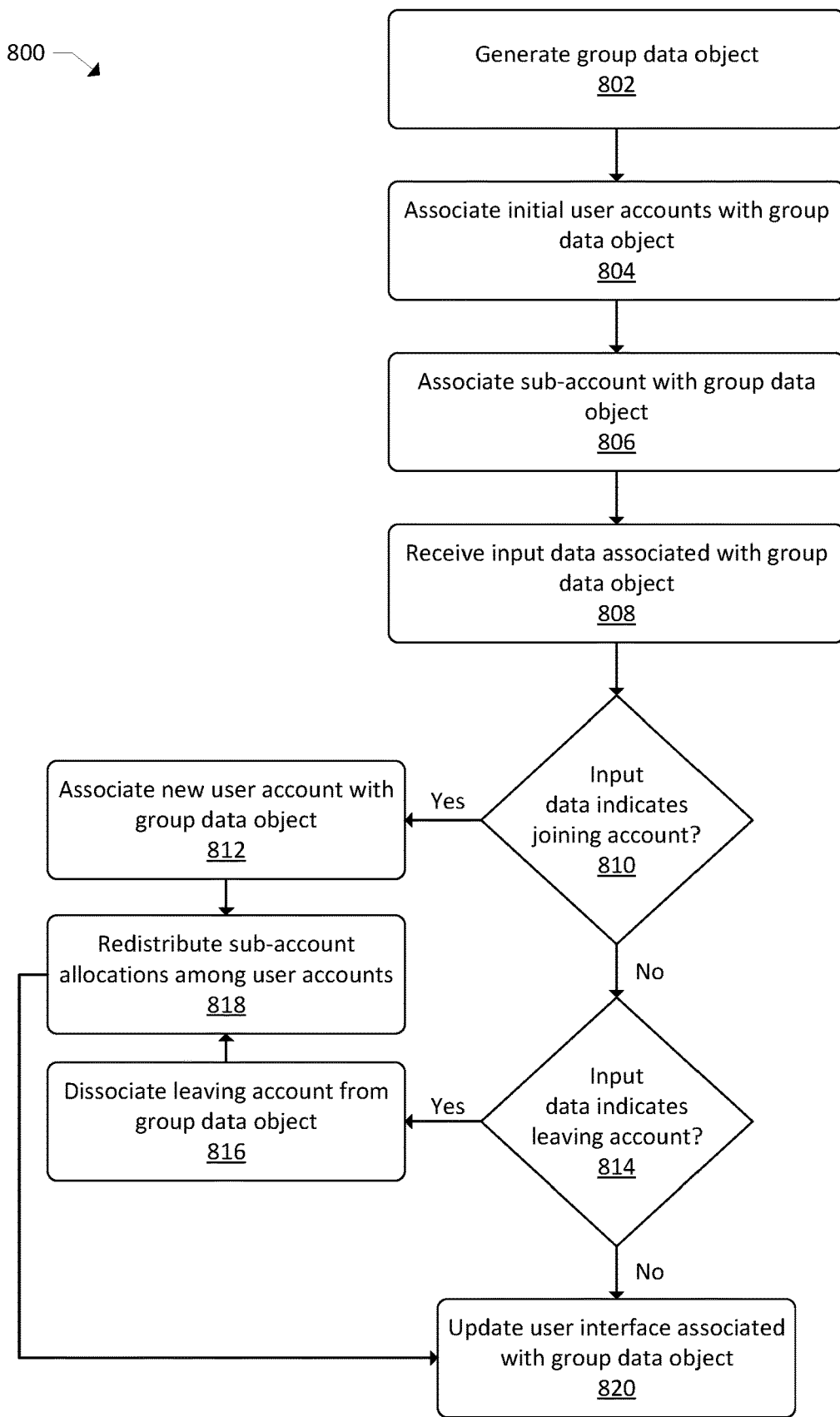
FIG. 8 is a flow diagram of an example process for fluid addition and removal of user accounts to a group data object, according to an embodiment described herein.

FIG. 8 is a flow diagram of an example process 800 for fluid addition and removal of user accounts to a group data object, according to an embodiment described herein. The order in which the operations or steps are described is not intended to be construed as a limitation, and any number of the described operations may be combined in any order and/or in parallel to implement process 800.

At block 802, the process 800 may include generating a group data object. The group data object may include an identifier of the group of users, connections between the group data object and individual user accounts, functionalities enabled for the group of users and individual user accounts, transaction history associated with the group of users, etc. Additionally, a sub-account may be generated and associated with the group data object. The sub-account may have funds that may be utilized by the group of users (or a portion of the group of users) and the sub-account may be enabled to receive funds from the individual user accounts.

At block 804, the process 800 may include associating initial user accounts with the group data object. For example, the group data object may be caused to store an identifier of each user account that is associated with the group of users as well as, in examples, attributes about the association of a given user account with the group data object. Such attributes may include an indication of whether the user account was an initial user account, whether the user account was the account associated with a request to generate a group of users, access controls associated with the user account, etc.

At block 806, the process 800 may include associating a sub-account with the group data object. The sub-account may have funds that may be utilized by the group of users (or a portion of the group of users) and the sub-account may be enabled to receive funds from the individual user accounts. In some examples, given user accounts may be associated with access controls that enables the user accounts to view information associated with the sub-account but not to initiate transactions associated with the sub-account. In other examples, user accounts may be enabled to initiate transactions on behalf of the group of users utilizing the sub-account.

At block 808, the process 800 may include receiving input data associated with the group data object. For example, a user may provide user input to a payment application residing on the user's device. In some examples that user input may be associated with the user's personal account. In other examples, that user input may be associated with the group data object.

At block 810, the process 800 may include determining whether the input data indicates an account will be joined to the group data object. For example, some data objects may be associated with functionality that allows for fluid joining and leaving of user accounts from the group of users. Here, in some examples, the input data may be a request to join the group of users or an acceptance of an invitation to join the group of users. In these and other examples, the payment service may determine when input data indicates that a user account is to be joined to the group of users and thus be associated with the group data object. In other examples, the joining of an account with a group data object may not be based on user input data but instead may be based at least in part on context data indicating that the account should be joined to the group data object. In such examples, the account can be added automatically without user input.

In examples where the input data indicates that the account will be joined to the group data object, the process 800 may include, at block 812, associating the new user account with the group data object. For example, the data associated with the group data object may be updated to include an identifier of the new account as an account that is associated with the group data object. Additionally, functionality of the group data object may be permitted to be utilized by a user associated with the new user account.

In examples where the input data does not indicate that the account will be a joining account, the process 800 may include, at block 814, determining whether the input data indicating that an account is to be removed from the group data object. This process may be the same or similar to the processes described with respect to block 810, except that instead of determining an account is to be joined to the group data object, the process may include determining whether an account is to be removed from the group data object. Again, in some examples an indication that an account is to be removed from the group data object may not be based on user input data but instead may be based at least in part on an automated process where certain context data, as described in more detail above, may be utilized to determine if an event has occurred that triggers the automatic removal of an account from the group data object.

In examples where the input data indicates that an account is to be removed, the process 800 may include, at block 816, dissociating the leaving account from the group data object. Dissociating the leaving account from the group data object may include removing an identifier of the leaving account from the group data object and disabling functionality associated with the group data object from being utilized by the leaving account. Such functionality may include any functionality associated with the sub-account, the ability to view information associated with the group data object, etc.

At block 818, the process 800 may include redistributing sub-account allocations from the sub-account among user accounts. For example, a time stamp may be generated for when the leaving account is dissociated from the group data object and the time stamp may be associated with an amount of funds in the sub-account at that time. Additionally, the payment service may determine how much of the sub-account, if any, that the user is entitled to based at least in part on contributions made by the leaving account while a member of the group, data associated with the dissociation of the account from the group, gains and losses made by the group while the account was associated with the group data object, access controls and rules set up by members of the group, etc. By so doing, a user associated with the leaving account may have that user's funds refunded, may "cash out" of a transaction associated with the group, or otherwise settle transactions with the group data object. This process may be performed automatically based at least in part on the account being dissociated with the group data object in a time-sensitive manner and without user input required, ensuring that the fund redistribution is performed according to preestablished rules and in a secure manner.

At block 820, in instances where the input data does not indicate either a joining or a leaving account, or once the redistribution of the sub-account allocations has been performed, the process 800 may include updating a user interface associated with the group data object to reflect the input data or the redistributed sub-account allocations. For example, when changes to information associated with the group data object occur, user interfaces associated with the group data object may be updated to show such changes. Some or all of the changes may be reflected by the user interface, including for example when a transaction that reduces the sub-account balance occurs, when a deposit that increases the sub-account balance occurs, when user accounts are added or removed, when access controls associated with user accounts are added, removed, or changed, when an incentive is enabled for the group of users, etc. In some examples, the payment application associated with the group data object may be automatically caused to be displayed on user devices where the user interface may be viewed by a user in the group of users. In other examples, a notification may be sent to the user devices and the notification may be selected to cause the user interface, as updated, to be displayed.

Figure 9:
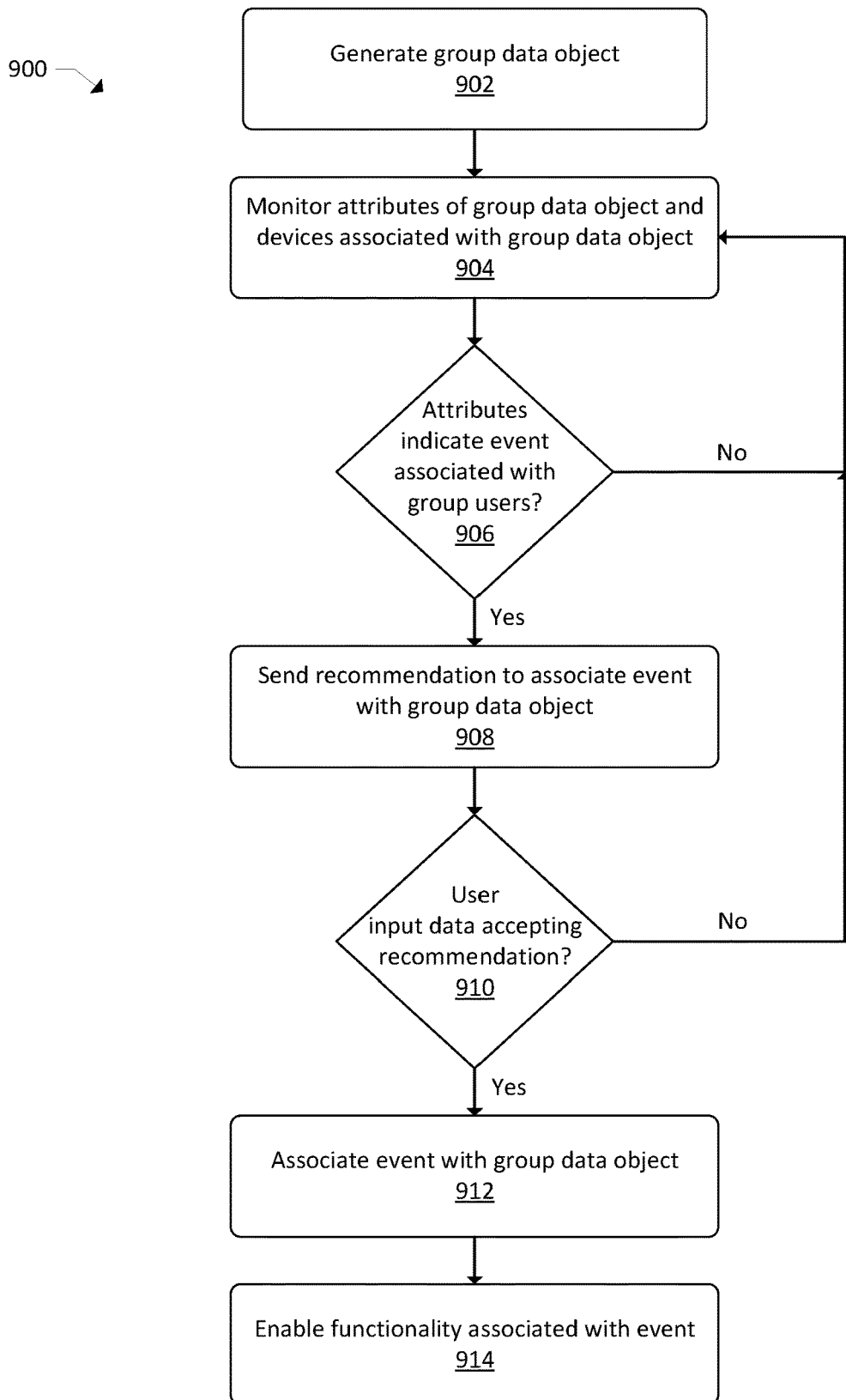
FIG. 9 is a flow diagram of an example process for dynamically associating events with group data objects, according to an embodiment described herein.

FIG. 9 is a flow diagram of an example process 900 for dynamically associating events with group data objects, according to an embodiment described herein. The order in which the operations or steps are described is not intended to be construed as a limitation, and any number of the described operations may be combined in any order and/or in parallel to implement process 900.

At block 902, the process 900 may include generating a group data object. The group data object may include an identifier of the group of users, connections between the group data object and individual user accounts, functionalities enabled for the group of users and individual user accounts, transaction history associated with the group of users, etc. Additionally, a sub-account may be generated and associated with the group data object. The sub-account may have funds that may be utilized by the group of users (or a portion of the group of users) and the sub-account may be enabled to receive funds from the individual user accounts.

At block 904, the process 900 may include monitoring attributes of the group data object and devices associated with the group data object. For example, the attributes of the group data object may include transactions that user accounts have been associated with or that are indicated as likely to be associated with the user accounts. The attributes may also include social graphs indicating relationships with other user accounts, scheduling data, comments data, request data, sub-account data, merchant-related data, etc. The attributes of the devices may include an indication of whether the devices have an instance of the payment application described herein installed thereon and a location indicator of a location of individual ones of the devices. The attributes may also include any data related to the user accounts, the group data object, or the devices described herein.

At block 906, the process 900 may include determining whether the attributes indicate an event associated with the group of users. For example, the attributes may indicate that the users in the group of users are all located in the same environment at the same time, and the attributes may indicate that the users were scheduled to be at the same location for a given event. Other indications of event association may be based at least in part on the users being associated with the same transaction or being associated with the same request for raising funds for an event, etc.

In examples where the attributes do not indicate an event associated with the group of users, the process 900 may return to block 904 where the attributes of the group data object may continue to be monitored. In this example, the payment service may not be able to determine with enough confidence that a given event is associated with the group of users and thus it would not be beneficial to recommend association of the event with the group data object.

In examples where at least one of the attributes indicates an event associated with the group of users, the process 900 may include, at block 908, sending an actionable recommendation to associate the event with the group data object. In these examples, the payment service may determine that it may be beneficial to associate the event in question with the group data object for the purpose of allowing the group of users to interact with functionality associated with the event utilizing their payment applications on their user devices. The actionable recommendation may be sent in the form of an interactive element that may be selected to provide user input accepting or rejecting the actionable recommendation. In other examples, the actionable recommendation, when received at the user devices, may cause the payment application installed on the user devices to be enabled and to move to a foreground of the user devices. The payment application may then display the actionable recommendation and functionality for accepting or rejecting the actionable recommendation.

At block 910, the process 900 may include determining whether user input data accepting the actionable recommendation has been received. For example, the use may provide user input accepting or rejecting the actionable recommendation, and corresponding user input data may be generated and sent to the payment service.

In examples where input data accepting the actionable recommendation has not been received, the process 900 may return back to block 904 where attributes of the group data object may continue to be monitored to determine whether another event should be associated with the group data object. In this example, the payment service may not be able to determine with enough confidence that a given event should be associated with the group of users and thus it would not be beneficial to associate the event with the group data object.

In examples where the input data accepting the actionable recommendation has been received, the process 900 may include, at block 912, associating the event with the group data object. Associating the event with the group data object may include first generating event data indicating details of the event and associating those details with the group data object such that the event details can be displayed on user interfaces associated with the group data object and such that the details may be interacted with by the user accounts.

At block 914, the process 900 may include enabling functionality associated with the event for use by user accounts of the group data object. For example, certain events may be associated with various functionalities. By way of example, a television-related event may be associated with payment functionality for ordering the television-related event, an investing event may be associated with trading functionality, a vacation functionality may be associated with requesting funds for the vacation and enabling payment for vacation-related goods and services, etc. The user interface associated with the group data object may be updated to enable receipt of user input data to utilize the enabled functionality associated with the event.

Figure 10:
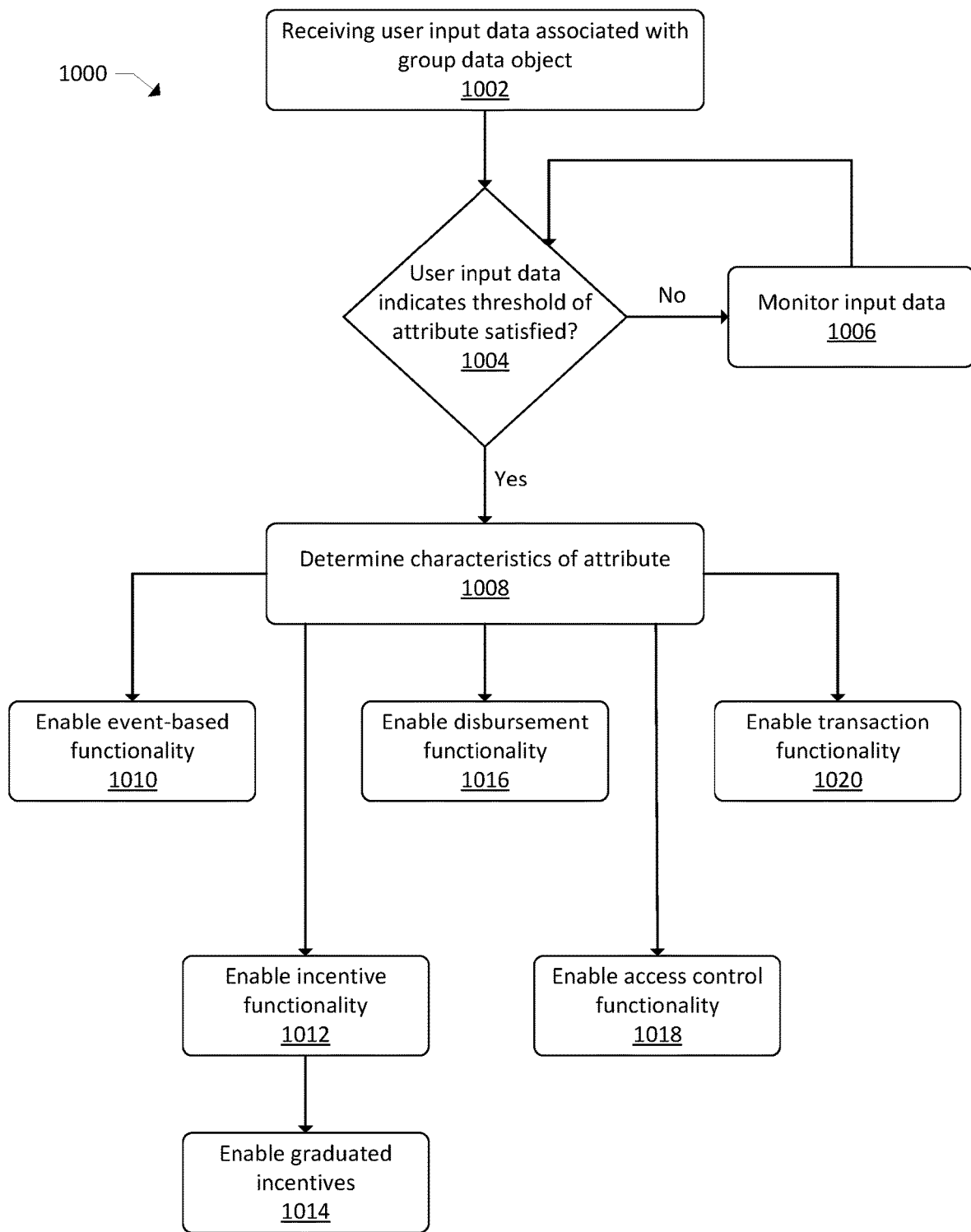
FIG. 10 is a flow diagram of an example process for enabling different types of functionalities associated with group data objects, according to an embodiment described herein.

FIG. 10 is a flow diagram of an example process 1000 for enabling different types of functionalities associated with group data objects, according to an embodiment described herein. The order in which the operations or steps are described is not intended to be construed as a limitation, and any number of the described operations may be combined in any order and/or in parallel to implement process 1000.

At block 1002, the process 1000 may include receiving user input data associated with a group data object. For example, a group data object may be generated as described in detail above. Thereafter, users that are associated with the group data object may provide user input data to a payment application associated with the group data object. In some examples, the user input is associated with the user's personal account and not the group data object. However, in other examples, the user input is associated with the group data object. In this example, the payment service may determine that the user input data will cause a change in data associated with the group data object in some way and that functionality or user interfaces associated with the group data object may be updated based at least in part on the user input data.

At block 1004, the process 1000 may include determining whether the user input data indicates a threshold value of an attribute of the group data object has been satisfied. For example, attributes of the group data object may include a balance of a sub-account of the group data object, an amount of a request that has been satisfied, a number of actions taken by group users, a number of users that have joined the group, a time-based event associated with the group, or any other attribute that may be measured. The threshold value may be set by users of the group or automatically, such as by utilizing the output from a trained machine learning model configured to determine attribute thresholds. Utilizing sub-account balances as an example, a threshold amount of funds may be set for the sub-account, and the user input data may be a deposit of an amount of funds that makes the total amount of funds in the sub-account satisfy the threshold amount. In examples, the threshold value of the attribute being satisfied may be described as a trigger event for other operations to occur as described herein.

In examples where the threshold value of the attribute has not been satisfied, the process 1000 may include, at block 1006, monitoring input data over time to determine whether subsequent input data results in the threshold value of the attribute being satisfied.

In examples where the threshold value of the attribute is satisfied, the process 1000 may include, at block 1008, determining characteristics of the attribute in question. For example, the described attributes may be associated with characteristics such fund savings, investment-related characteristics, splitting expenses, fundraising, etc. In examples, the characteristics may be based at least in part on the attribute that is changed from the user input data or from data known about the group data object, such as a purpose of generation of the group data object as described above.

Based at least in part on the characteristics of the attribute, the process 1000 may proceed to block 1010, where the payment service may enable event-based functionality. In this example, the attribute may be the association of an event with the group data object as described more fully with respect to FIG. 9. The characteristic may be the type of event that was associated with the group data object and details associated with the event. In this example, certain events may be associated with various functionalities. By way of example, a television-related event may be associated with payment functionality for ordering the television-related event, an investing event may be associated with trading functionality, a vacation functionality may be associated with requesting funds for the vacation and enabling payment for vacation-related goods and services, etc. The user interface associated with the group data object may be updated to enable receipt of user input data to utilize the enabled functionality associated with the event.

In other examples, the process 1000 may proceed to block 1012, where the payment service may enable incentive functionality. In this example, the attribute may be an interest determined to be associated with the group data object or a threshold amount of funds being deposited into the sub-account, for example. The characteristic may be the specific interest that was identified and a merchant or set of merchants that may be associated with that interest. In this example, certain merchants or other user account may have established an incentive program with the payment service. The incentive program may be to provide incentives for users to purchase items from the merchant in question. Enabling the incentive functionality as described here may include enabling an incentive to be utilized by group members individually or as a group.

At block 1014, the process 1000 may include enabling graduated incentives. In this example, the payment service may determine that multiple types of incentives are to be enabled. A first incentive may be enabled for use by the individual group members for transactions that those users enter into individually and not as part of the group. Also, a second incentive may be enabled for use by either the individual group members or for the group that those users enter into on behalf of the group and not as individuals. In these examples, the incentives may differ to promote either individual use of the incentive over group user, or vice versa.

At block 1016, the process 1000 may include enabling disbursement functionality. In this example, the attribute may be funds associated with the group sub-account. The characteristic may be that the funds have reached a threshold amount of funds such that disbursement of the funds is available. Other attributes may be associated with investment-related events, user accounts leaving the group of users, or other events that may be associated with the withdrawal of funds from the sub-account. In this example, functionality for making a disbursement may not be enabled for the group data object until the attribute threshold at issue satisfies the threshold value as described above.

At block 1018, the process 1000 may include enabling access control functionality. In this example, the attribute may be user accounts that are associated with the group data object. The characteristic may be that a new user account has been associated with the group data object or that user input data has been received changing access controls for a user account associated with the group data object. In this example, access control functionality as described more fully with respect to FIG. 6 may be enabled such that the ability to edit, share, and generate content to associate with the group data object may be provided to various user accounts associated with the group data object.

At block 1020, the process 1000 may include enabling transaction functionality. In this example, the attribute may be funds associated with a sub-account of the group data object. The characteristic may be that the funds have satisfied a threshold amount of funds for a transaction to be performed on behalf of the group of users. For example, a group data object may be associated with saving for purchase of a given item such as booking airfare for a flight to a vacation destination. User accounts associated with the group data object may contribute funds to the sub-account until a threshold amount of funds equaling the cost of the airfare is satisfied. When such an event occurs, functionality to allow for the funds to be utilized to purchase the airfare may be enabled such that one or more user accounts, such as a designated user account, may proceed to utilize the funds to purchase the airfare.

Figure 11:
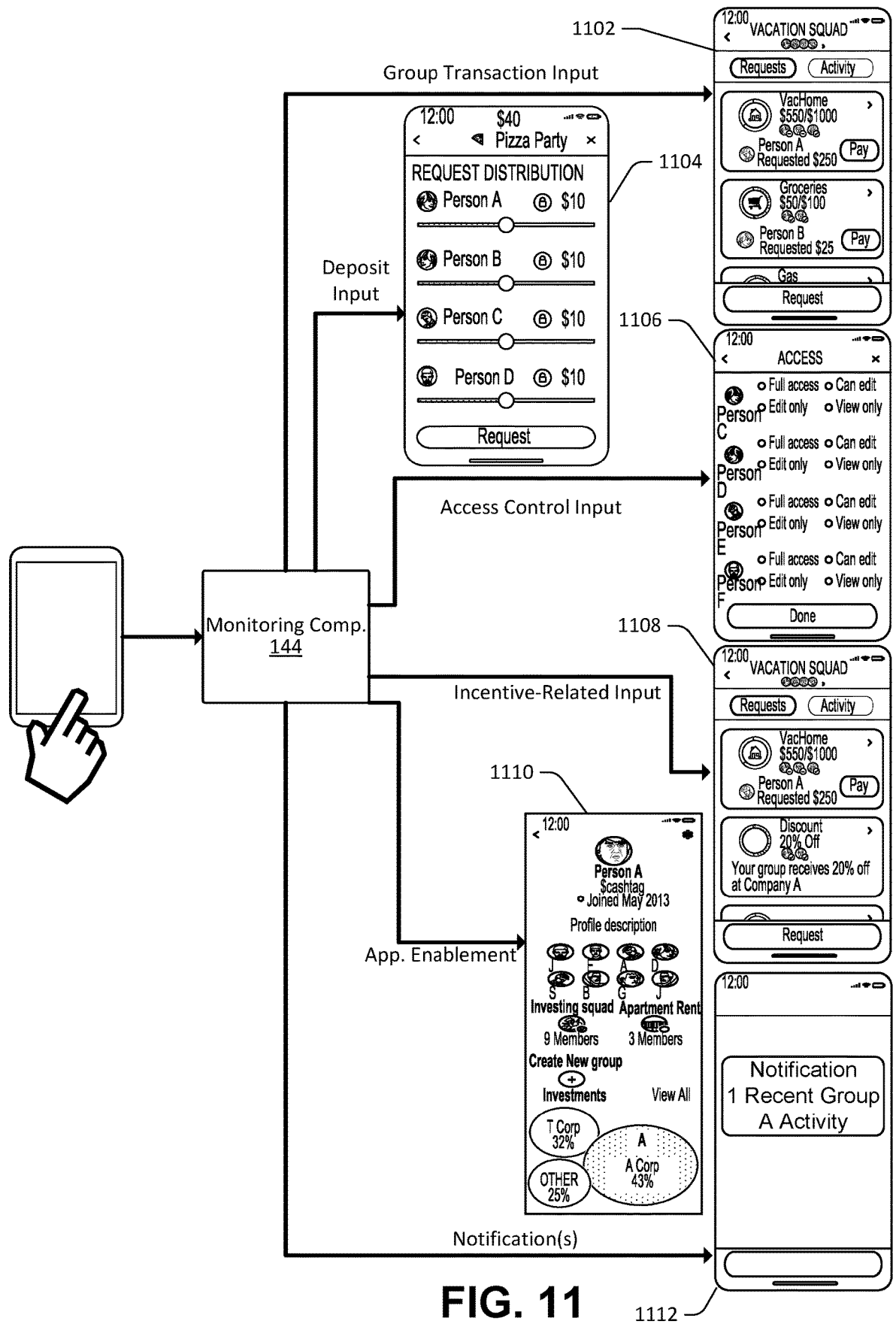
FIG. 11 is a conceptual diagram of example data and components utilized to monitor data input associated with a group data object and to update user interfaces associated with the group data object, according to an embodiment described herein.

FIG. 11 is a conceptual diagram of example data and components utilized to monitor data input associated with a group data object and to update user interfaces associated with the group data object, according to an embodiment described herein.

As shown in FIG. 11, user input data is received on a user device. In examples, the user input may be associated with a payment application installed on the user device and the user input may be determined to be associated with a group data object to which the user is associated. When such user input data is received, the user input data may be sent to a monitoring component, which may be similar to and perform functionality similar to the monitoring component 144 described with respect to FIG. 1.

Depending on the user input data or what changes occurred with respect to the group data object based on the user input data, the payment serviced may determine updated to make to a user interface associated with the group data object. The user interface may be the same or similar to the user interface 120 described with respect to FIG. 1.

By way of example, the user input data may be associated with group transaction input, such as a user account initiating or completing a transaction on behalf of the group of users utilizing a sub-account of the group data object. In this example, in user interface 1102, a balance of the sub-account may be decreased based on the transaction occurring, and one or more items may have been purchased on behalf of the group of users. In this example, the user interface may be updated in real time and based at least in part on the user input data to show the decreased balance of the sub-account and to provide an indication of the transaction and what the group of users received in exchange for the funds from the sub-account. By updating the user interface in real time, the users associated with the group data object may have a time-sensitive and accurate understanding of information associated with the group data object.

In another example, the user input data may be associated with deposit input, such as a user account depositing funds from that user account to the sub-account of the group data object. In this example, the user interface 1104 may be updated to reflect in the increase in funds in the sub-account of the group data object. Additionally, where the increase in funds satisfies a threshold amount of funds as described more fully elsewhere herein, the user interface may be updated to reflect the enablement of functionality associated with the amount of funds satisfying the threshold amount of funds. This user interface 1106 may also show changes in access controls for user of the group based at least in part on the addition, removal, and changing of user accounts associated with the group data object.

In still another example, the user input data may be associated with incentive-related input, such as a user account taking an action that enables incentive-related functionality, a user account redeeming an incentive, etc. In this example, the user interface 1108 may be updated to reflect the incentive-related actions in real time. When the update to the user interface is enablement of an incentive, the real-time update may allow for users of the group to take advantage of the incentive quickly and on behalf of the group data object. When the update to the user interface is use of the incentive, the real-time update may prevent a user being presented with an incentive that has already been utilized or otherwise duplicating use of the incentive unnecessarily, for example.

In these and other examples, changes to the user interface 1110 may occur and may be surfaced to group users. To do so, the payment service may send data to user devices associated with the user accounts that causes the payment applications residing on the user devices to enable (if not already enabled) and to be displayed in a foreground of the user device, sometimes without user input to do so. This may allow for the users to see the updated user interfaces quickly and potentially without waiting until user input is received (which may be when connectivity to a network may be absent and thus the updated user interface may not be available). The users may then interact with the user interface as displayed via the payment application.

In other examples, instead of automatically enabling and causing display of the updated user interface via the payment application, a notification may be sent to the user devices. The notification may include an interactive element that, when selected, may cause the payment application to be enabled and to be displayed in the foreground of the user device. In some examples, the notification may provide an indication of the type of change that occurred with respect to the user interface 1112 and may include functionality for receiving user input that may cause further changes to the user interface 1112. An example of this may be that the change to the user interface is enablement of purchasing functionality based on an amount of funds satisfying a threshold amount in the sub-account for the group data object. In this example, the notification may indicate that the purchasing functionality has been enabled and may provide a selectable element to initiate purchase of an item. Upon selection of the selectable element, the payment service may facilitate purchase of the item on behalf of the group data object utilizing the funds in the sub-account.

It should be understood that the user interfaces described with respect to FIG. 11 are example user interfaces, and the user interfaces can have different data and arrangements than those specifically shown by way of example in FIG. 11.

Figure 12:
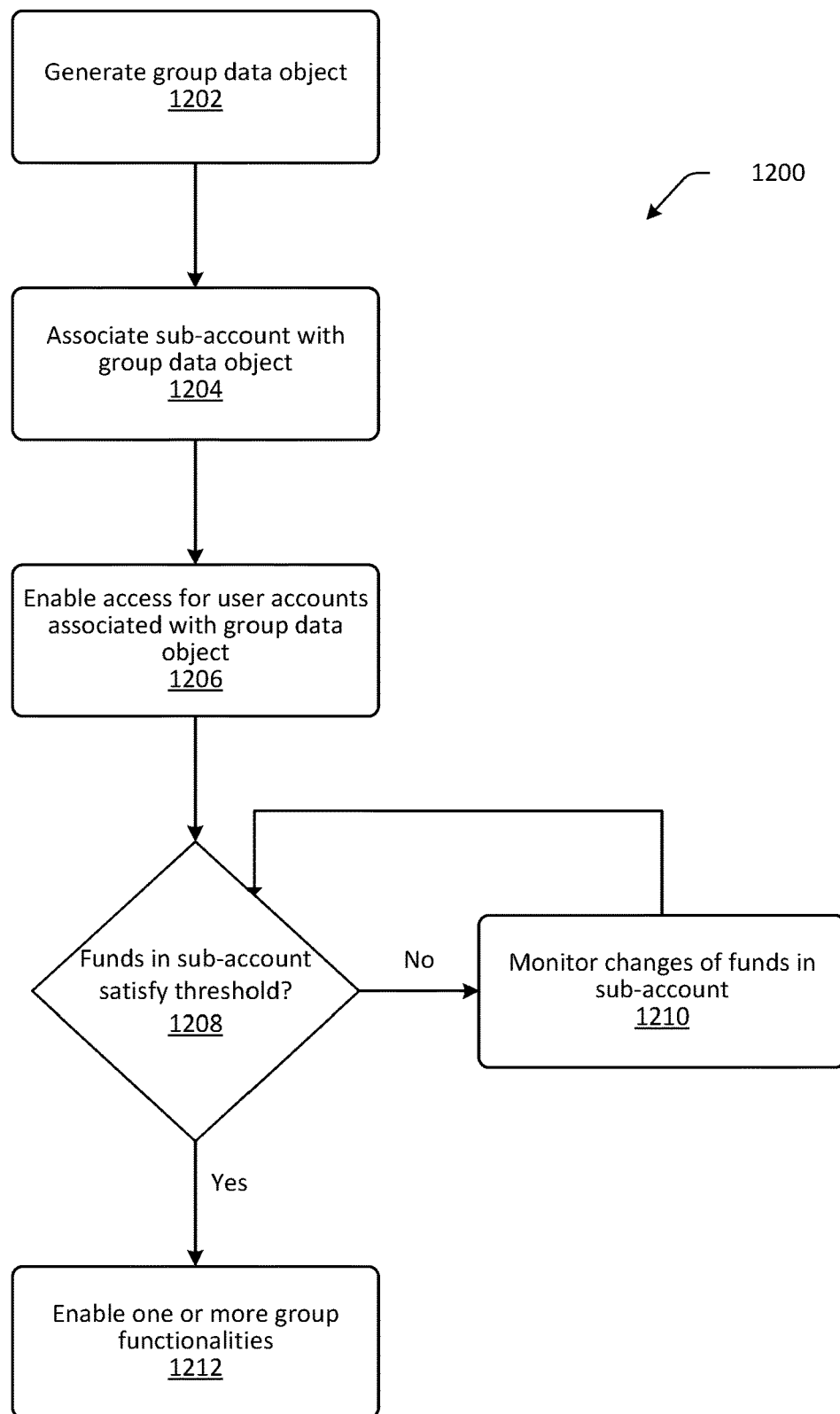
FIG. 12 is a flow diagram of an example process for group data objects and associated functionality enablement, according to an embodiment described herein.
Figure 13:
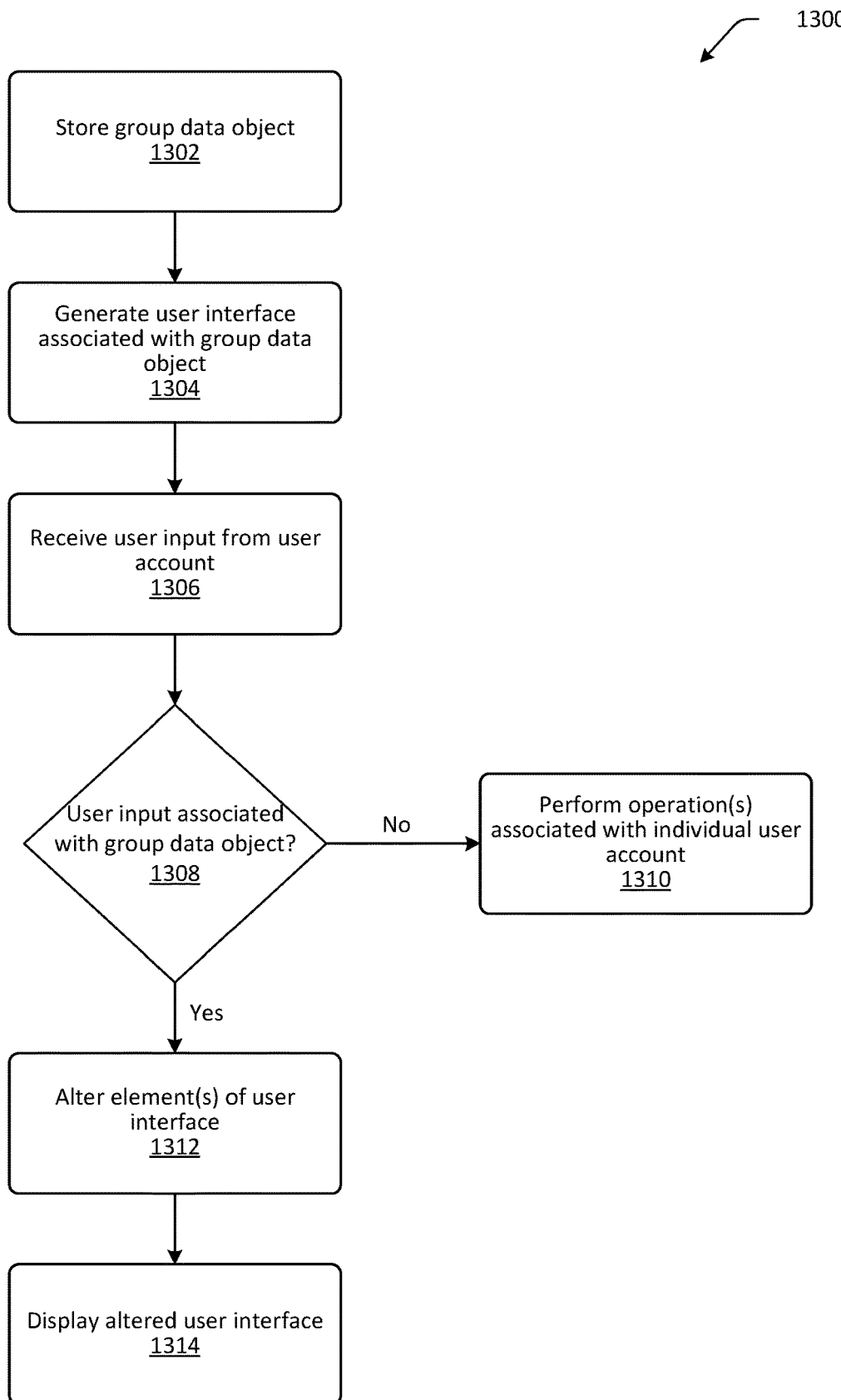
FIG. 13 is a flow diagram of an example process for updating user interfaces associated with a group data object in real time, according to an embodiment described herein.

FIGS. 12 and 13 are example processes for group data objects and associated functionality enablement. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-11 and 14-19, although the processes may be implemented in a wide variety of other environments, architectures and systems.

FIG. 12 is a flow diagram of an example process 1200 for group data objects and associated functionality enablement, according to an embodiment described herein. The order in which the operations or steps are described is not intended to be construed as a limitation, and any number of the described operations may be combined in any order and/or in parallel to implement process 1200.

At block 1202, the process 1200 may include generating a group data object. The group data object may include an identifier of the group of users, connections between the group data object and individual user accounts, functionalities enabled for the group of users and individual user accounts, transaction history associated with the group of users, etc. Additionally, a sub-account may be generated and associated with the group data object. The sub-account may have funds that may be utilized by the group of users (or a portion of the group of users) and the sub-account may be enabled to receive funds from the individual user accounts. Here, the generation of new data represent a group data object is associated with the computer-centric problem of how to accurately and securely index data and data linkages across thousands of user accounts to ensure that user accounts that are authorized to be associated with group data objects are in fact authorized. The present disclosure solves this computer-centric problem by identifying user accounts that were recommended to be associated with the group data object, determining when those actionable recommendations were accepted, and generating linkages between those user accounts and the newly-generated group data object.

At block 1204, the process 1200 may include associating a sub-account with the group data object. The sub-account may have funds that may be utilized by the group of users (or a portion of the group of users) and the sub-account may be enabled to receive funds from the individual user accounts. In some examples, given user accounts may be associated with access controls that enables the user accounts to view information associated with the sub-account but not to initiate transactions associated with the sub-account. In other examples, user accounts may be enabled to initiate transactions on behalf of the group of users utilizing the sub-account. The generation of a new sub-account with its own funds but where multiple user accounts can access and manipulate funds in the sub-account on-the-fly is a computer-centric problem. The present disclosure solves this problem by establishing access control and dynamically toggling enablement of functionality such that authorized user accounts are able to enter into transactions on behalf of the group of users through secure means established by the described payment applications and payment service.

At block 1206, the process 1200 may include enabling access for user accounts associated with the group data object. Enabling access for the user accounts associated with the group data object may include establishing access controls in association with the user accounts. For example, at least default access controls may be established that allow the user accounts at issue to view information associated with the group data object while restricting this ability for user accounts not associated with the group data object. Additional access controls may allow or prohibit the editing of information associated with the group data object, sharing such information, generating new content to be associated with the group data object, inviting other user accounts to join the group data object, etc.

At block 1208, the process 1200 may include determining whether funds in the sub-account satisfy a threshold. For example, attributes of the group data object may include a balance of a sub-account of the group data object, an amount of a request that has been satisfied, a number of actions taken by group users, a number of users that have joined the group, a time-based event associated with the group, or any other attribute that may be measured. The threshold value may be set by users of the group or automatically, such as by utilizing the output from a trained machine learning model configured to determine attribute thresholds. Utilizing sub-account balances as an example, a threshold amount of funds may be set for the sub-account, and the user input data may be a deposit of an amount of funds that makes the total amount of funds in the sub-account satisfy the threshold amount.

In examples where the funds in the sub-account do not satisfy the threshold, the process 1200 may include, at block 1210, monitoring changes of funds in the sub-account. In this example, while funds may have been added to the sub-account, the total amount of funds may not satisfy the threshold amount of funds and thus no action may be taken by the payment service that is associated with the threshold amount of funds being satisfied.

In examples where the funds in the sub-account satisfy the threshold, the process 1200 may include, at block 1212, enabling one or more group functionalities. For example, characteristics of the group data object may be determined along with threshold set for the amount of funds, and this information may be utilized to determine what functionalities to enable when the amount of funds satisfies the threshold amount of funds. Examples of such functionality are provided in association with FIG. 10 and FIG. 11, above. Enablement of functionalities when certain thresholds are met may assist in parsing the multitude of functionalities to just those that are germane to the group data object at issue, a predefined purpose of the group, the thresholds that have been met, etc. This solves the computer-centric problem of displaying functionalities on a limited screen space of a user device, limiting such functionalities as described herein.

In examples, enabling the group functionalities may be based at least in part on attributes of the group data object. Example attributes may include an amount of funds associated with the group of users, a number of users associated with the group of users, a length of time the group of users has been active, when new members are added to the group of users, a retention rate associated with membership to the group of users, spending amounts or spending rates associated with the group of users, diversification of items utilized by the group of users, accomplishment of learning modules, or referrals associated with the group of users.

Additionally, or alternatively, the process 1200 may include determining that a first device associated with the first user account is physically located proximate to one or more second devices associated with the one or more second user accounts. The process 1200 may also include determining that the first device and the one or more second devices have installed thereon a payment application associated with the payment service. In these examples, generating the group data object may be based at least in part on the first device and the one or more second devices being physically located proximate to each other and having the payment application installed thereon.

Additionally, or alternatively, the process 1200 may include, based at least in part on associating the sub-account with the group data object enabling the first user account and the one or more second user accounts to view transaction information for transactions occurring in association with the group data object. In some examples, enabling the first user account and the one or more second user accounts to deposit funds into the sub-account may also be based at least in part on the sub-account being associated with the group data object. In yet other examples, enabling at least one of the first user account or the one or more second user accounts to engage in transactions on behalf of the group of users based on access controls associated with the group data object may also be based at least in part on associating the sub-account with the group data object.

Additionally, or alternatively, the process 1200 may include determining that attributes of a third user account correspond to reference attributes of the group of users. Reference attributes may be any attributes that are known, or can be determined, about the group of users, including group members, member attributes, group purposes, etc. The process 1200 may also include generating an actionable recommendation for the third user account to be added to the group of users. The process 1200 may also include, based at least in part on receiving user input data accepting the actionable recommendation: associating the third user account with the group data object; and enabling the sub-account to be usable by the third user account.

Additionally, or alternatively, the process 1200 may include receiving user input data indicating a user account of the at least one second user accounts is to be removed from association with the group data object. The process 1200 may also include determining an amount of funds in the sub-account to attribute to the user account when the user input data is received. The process 1200 may also include facilitating withdrawal of the amount of funds from the sub-account and into the user account based at least in part on the user account being removed from association with the group data object.

Additionally, or alternatively, the process 1200 may include determining that a first device associated with the first user account and at least one second device associated with the at least one second user account are at a first location. The process 1200 may also include determining an attribute of the first location at a time when the first device and the at least one second device are at the first location. The process 1200 may also include determining an event occurring at the first location at the time based at least in part on the attribute and associating the event with the group data object.

Additionally, or alternatively, the process 1200 may include determining that the functionality is associated with the event. In these examples, enabling the functionality may include enabling the functionality for a period of time associated with the event based at least in part on the event being associated with the group data object.

Additionally, or alternatively, the process 1200 may include determining an incentive associated with a payment service based at least in part on attributes of the group data object. In these examples, enabling the functionality may include enabling the incentive to be utilized in association with the sub-account.

Additionally, or alternatively, the process 1200 may include the threshold amount of funds being determined based at least in part on occurrence of a trigger event associated with the group of users. The process 1200 may also include the functionality including enabling withdrawal of an apportioned amount of funds in the sub-account by the first account and the at least one second account.

Additionally, or alternatively, the process 1200 may include generating a machine learning model configured to determine when user accounts are to be associated with user groups. The process 1200 may also include generating a training dataset from feedback data associated with user account groupings determined from the machine learning model. The process 1200 may also include training the machine learning model utilizing the training dataset such that a trained machine learning model is generated. In these examples, generating the group data objects may be performed utilizing the trained machine learning model.

Additionally, or alternatively, the process 1200 may include generating a machine learning model configured to determine functionalities to enable in association with user groups. The process 1200 may also include generating a training dataset from feedback data associated with enabled functionalities determined utilizing the machine learning model. The process 1200 may also include training the machine learning model utilizing the training dataset such that a trained machine learning model is generated. The process 1200 may also include selecting the functionality to be enabled utilizing the trained machine learning model.

Additionally, or alternatively, the process 1200 may include generating a machine learning model configured to determine threshold fund amounts to associate with user groups. The process 1200 may also include generating a training dataset from feedback data associated with the threshold fund amounts determined utilizing the machine learning model. The process 1200 may also include training the machine learning model utilizing the training dataset such that a trained machine learning model is generated. The process 1200 may also include determining the threshold amount of funds to associate with the group data object utilizing the trained machine learning model.

Additionally, or alternatively, the process 1200 may include generating a machine learning model configured to determine access controls to associate with user groups. The process 1200 may also include generating a training dataset from feedback data associated with the access controls determined utilizing the machine learning model. The process 1200 may also include training the machine learning model utilizing the training dataset such that a trained machine learning model is generated. The process 1200 may also include restricting access to functionalities associated with the group data object based at least in part on output from the trained machine learning model.

Additionally, or alternatively, the process 1200 may include determining an incentive associated with a payment service based at least in part on attributes of the group data object. The process 1200 may also include associating a first instance of the incentive with individual ones of the first account and the second accounts such that individual users associated with the first account and the second accounts are enabled to utilize the first instance of the incentive for transactions unassociated with the group data object. The process 1200 may also include associating a second instance of the incentive with the group data object such that individual users of the group of users are enabled to utilize the second instance of the incentive for transactions associated with the group data object, the second instance of the incentive being more valuable than the first instance of the incentive.

Additionally, or alternatively, the process 1200 may include determining, from data associated with the first account and the second accounts, that users of the first account and the second accounts are likely to be associated with a future event. The process 1200 may also include sending a actionable recommendation to form the group data object to devices associated with the first account and the second accounts. In these examples, generating the group data object may be based at least in part on receiving user input data accepting the actionable recommendation.

FIG. 13 is a flow diagram of an example process 1300 for updating user interfaces associated with a group data object in real time, according to an embodiment described herein. The order in which the operations or steps are described is not intended to be construed as a limitation, and any number of the described operations may be combined in any order and/or in parallel to implement process 1300.

At block 1302, the process 1300 may include storing a group data object. The group data object may include an identifier of the group of users, connections between the group data object and individual user accounts, functionalities enabled for the group of users and individual user accounts, transaction history associated with the group of users, etc. Additionally, a sub-account may be generated and associated with the group data object. The sub-account may have funds that may be utilized by the group of users (or a portion of the group of users) and the sub-account may be enabled to receive funds from the individual user accounts.

At block 1304, the process 1300 may include generating a user interface associated with the group data object. For example, the user interface may include some or all of the elements described with respect to FIGS. 2-6 related to group data objects. Such elements may include an identifier of the group data object, a purpose for the group of users, information about the user accounts associated with the group data object, request-related information, group-related activities, etc.

At block 1306, the process 1300 may include receiving user input from a user account associated with the group data object. For example, a user may provide user input to the user's device and that user input may be associated with the user account based at least in part on the user device being registered to or otherwise logged in to the user account. The group data object may include an indication that the user account at issue is associated with the group data object.

At block 1308, the process 1300 may include determining whether the user input is associated with the group data object. In some examples, the user input is associated with the user's personal account and not the group data object. However, in other examples, the user input is associated with the group data object. In this example, the payment service may determine that the user input data will cause a change in data associated with the group data object in some way and that functionality or user interfaces associated with the group data object may be updated based at least in part on the user input data. When determining whether user input data is associated with the group data object, context data, including any of the context data described above, may be utilized to make this determination.

In examples where the user input is not associated with the group data object, the process 1300 may include, at block 1310, performing operations associated with the individual user account. In this example, while the user account is associated with the group data object, the input data in question is not associated with the group data object but instead is associated with the user's personal user account. As such, instead of performing an operation on behalf of the group of users based on the input data, operations may be performed on behalf of the user's personal account based on the input data.

In examples where the user input is associated with the group data object, the process 1300 may include, at block 1312, altering one or more elements of the user interface associated with the group data object. Altering the one or more elements of the user interface is described in detail with respect to FIGS. 10 and 11, but may generally include determining what user interface elements are associated with the input data that was received, determining how those interface elements should be changed based on attributes and attributes of the interface elements and the user input, and then causing the user interface elements to be changed. The alteration of user interface elements in real time helps to ensure that the multiple users associated with the group data object are presented with up-to-date information and that transactions entered into by members of the group are based on relevant information.

At block 1314, the process 1300 may include displaying the altered user interface. For example, the altered user interface may be displayed on user devices such that the user interface elements that were updated are displayed to the user. In examples, the payment service may send data to user devices associated with the user accounts that causes the payment applications residing on the user devices to enable (if not already enabled) and to be displayed in a foreground of the user device, sometimes without user input to do so. This may allow for the users to see the updated user interfaces quickly and potentially without waiting until user input is received (which may be when connectivity to a network may be absent and thus the updated user interface may not be available). The users may then interact with the user interface as displayed via the payment application.

In other examples, instead of automatically enabling and causing display of the updated user interface via the payment application, a notification may be sent to the user devices. The notification may include an interactive element that, when selected, may cause the payment application to be enabled and to be displayed in the foreground of the user device. In some examples, the notification may provide an indication of the type of change that occurred with respect to the user interface and may include functionality for receiving user input that may cause further changes to the user interface. An example of this may be that the change to the user interface is enablement of purchasing functionality based on an amount of funds satisfying a threshold amount in the sub-account for the group data object. In this example, the notification may indicate that the purchasing functionality has been enabled and may provide a selectable element to initiate purchase of an item. Upon selection of the selectable element, the payment service may facilitate purchase of the item on behalf of the group data object utilizing the funds in the sub-account.

Additionally, or alternatively, the process 1300 may include determining that the user input data is associated with a transaction that utilized a sub-account associated with the group data object. The process 1300 may also include determining that an element of the one or more elements of the user interface is associated with displaying a balance of the sub-account. In these examples, updating the one or more elements may include causing the element to indicate the balance of the sub-account after the balance is updated based on the transaction.

Additionally, or alternatively, the process 1300 may include determining that the user input data is associated with a deposit, by the first user account, of an amount of funds into a sub-account associated with the group data object. The process 1300 may also include determining a first element of the one or more elements that is associated with displaying a balance of the sub-account. The process 1300 may also include determining a second element of the one or more elements that is associated with displaying a contribution amount for the first user account. In these examples, updating the one or more elements may include causing the first element to indicate the balance of the sub-account after the balance is updated based on the deposit and causing the second element to indicate that the contribution amount has increased for the first user account.

Additionally, or alternatively, the process 1300 may include determining that a third user account has been associated with the group data object. The process 1300 may also include determining an access control tier to associate with the third user account based at least in part on attributes of the third user account. In these examples, updating the one or more elements may include displaying a representation of the third user account and an indication of the access control tier on the user interface.

Additionally, or alternatively, the process 1300 may include determining that a trigger event associated with the group data object has occurred. The process 1300 may also include associating, based at least in part on the trigger event occurring, an incentive with the group data object. In these examples, updating the one or more elements may include displaying a representation of the incentive on the user interface, the representation of the incentive being selectable by users of the group of users to redeem the incentive.

Additionally, or alternatively, the process 1300 may include the trigger event being an amount of funds in a sub-account of the group data object satisfying a threshold amount of funds. In other examples, the trigger event may be occurrence of an event predefined as being associated with the group data object. In other examples, the trigger event may be a number of the users in the group of users satisfying a threshold number of users.

Additionally, or alternatively, the process 1300 may include associating the group data object and the first account with a payment application residing on a device of a user of the first account. The process 1300 may also include determining that the user input data was received utilizing the payment application while the group data object was selected for use instead of the first account. In these examples, determining that user input data is associated with the group data object may be based at least in part on the group data object being selected for use instead of the first account.

Additionally, or alternatively, the process 1300 may include associating transaction data with the group data object and generating data representing the element based at least in part on the transaction data. The process 1300 may also include determining that the user input data is associated with additional transaction data. In these examples, altering the element may be based at least in part on the user input data being associated with the additional transaction data.

Additionally, or alternatively, the process 1300 may include generating a command configured to cause a payment application to be displayed based at least in part on altering the element. The process 1300 may also include determining a device associated with the group data object and sending the command to the device, the command causing the payment application residing on the device to be displayed in a foreground of the device and to display the element as altered.

Additionally, or alternatively, the process 1300 may include generating a command configured to cause a notification to be displayed based at least in part on altering the element. The process 1300 may also include determining a device associated with the group data object and sending the command to the device, the command causing a screen of the device to display the notification, the notification being a selectable element that, when selected, causes a payment application associated with the group data object to be displayed in a foreground of the device.

Additionally, or alternatively, the process 1300 may include generating a machine learning model configured to determine element alterations based on input types associated with group data objects. The process 1300 may also include generating a training dataset from feedback data associated with the element alterations determined utilizing the machine learning model. The process 1300 may also include training the machine learning model utilizing the training dataset such that a trained machine learning model is generated. In these examples, altering the element may be performed utilizing the trained machine learning model.

Additionally, or alternatively, the process 1300 may include altering a slider bar associated with the second accounts such that a contribution attribution associated with the second accounts changes based at least in part on a contribution attribution associated with the first account.

Additionally, or alternatively, the process 1300 may include the element of the user interface being a button that, when selected, causes a functionality associated with the group data object to be performed. In other examples, the element of the user interface may be a dial that, when manipulated, causes the functionality to be performed. In still other examples, the element of the user interface may be a link that, when selected, causes display of information associated with the group data object.

Additionally, or alternatively, the process 1300 may include, prior to generation of the group data object, receiving input data indicating a selection of a purpose of multiple predefined purposes to associate with the group data object. The process 1300 may also include associating the group data object with a predefined set of functionalities based at least in part on the selection of the purpose, the predefined set of functionalities being a subset of functionalities capable of being associated with the group data object.

Additionally, or alternatively, the process 1300 may include determining that an amount of funds in a sub-account of the group data object has satisfied a threshold amount. The process 1300 may also include causing display, via the user interface, of a first indicator that the amount of funds has satisfied the threshold amount. The process 1300 may also include automatically facilitating a transaction on behalf of the group of users based at least in part on the amount of funds satisfying the threshold amount. The process 1300 may also include causing display, via the user interface, of a second indicator indicating that the transaction has been completed.

Figure 14:
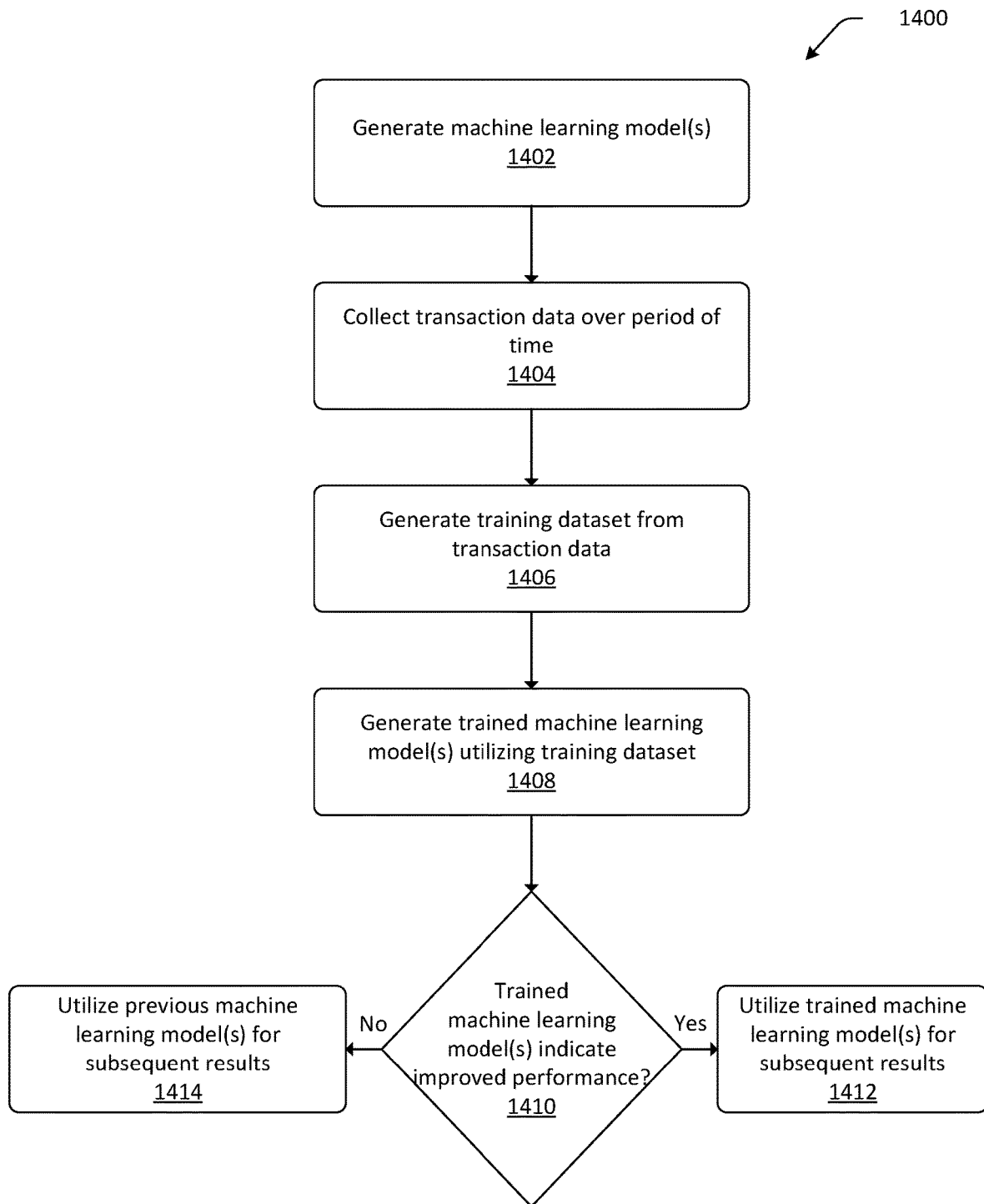
FIG. 14 is a flow diagram of an example process for the generation and training of machine learning models to perform one or more of the processes described herein, according to an embodiment described herein.

FIG. 14 is a flow diagram of an example process 1400 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 1400.

At block 1402, the process 1400 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore (s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1404, the process 1400 may include collecting transaction data over a period of time. The transaction data may include any of the data described with respect to the datastore(s) 130, any data associated with transactions associated with group data objects herein, any data described with respect to FIGS. 1-13, or any other data that may be utilized to perform the operations described herein. This information may include factors associated with device locations, user account history, social information associated with user accounts, user feedback, interactions with the payment application, interactions with interactive elements, etc.

At block 1406, the process 1400 may include generating a training dataset from the transaction data. Generation of the training dataset may include formatting the transaction data into input vectors for the machine learning model to intake, as well as associating the various data with the outcomes of the transactions described herein. The training dataset may include feedback data associated with actionable recommendations to establish group data objects, setting of threshold values associated with group data objects, determining user interface elements to update based on user input, determinations of events to associate with group data objects, determining of functionality to enable or disable for a group data object, etc.

At block 1408, the process 1400 may include generating one or more trained machine learning models utilizing the training dataset. Generation of the trained machine learning models may include updating parameters and/or weightings and/or thresholds utilized by the models to generate group recommendations, set threshold values, determine access controls, associate events with group data objects, determine user interface elements to update, determine functionalities to enable, etc. based at least in part on the data from the training dataset.

At block 1410, the process 1400 may include determining whether the trained machine learning models indicate improved performance metrics. For example, a testing group may be generated where the outcomes of the transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 1400 may include, at block 1412, utilizing the trained machine learning models for generating subsequent results. For example, the trained machine learning models may be utilized to generate group recommendations, set threshold values, determine access controls, associate events with group data objects, determine user interface elements to update, determine functionalities to enable, etc. It should be understood that the trained machine learning models may be utilized in any scenario where models are utilized as described herein.

In examples where the trained machine learning models do not indicate improved performance metrics, the process 1400 may include, at block 1414, utilizing the previous iteration of the machine learning models for generating subsequent results.

Figure 15:
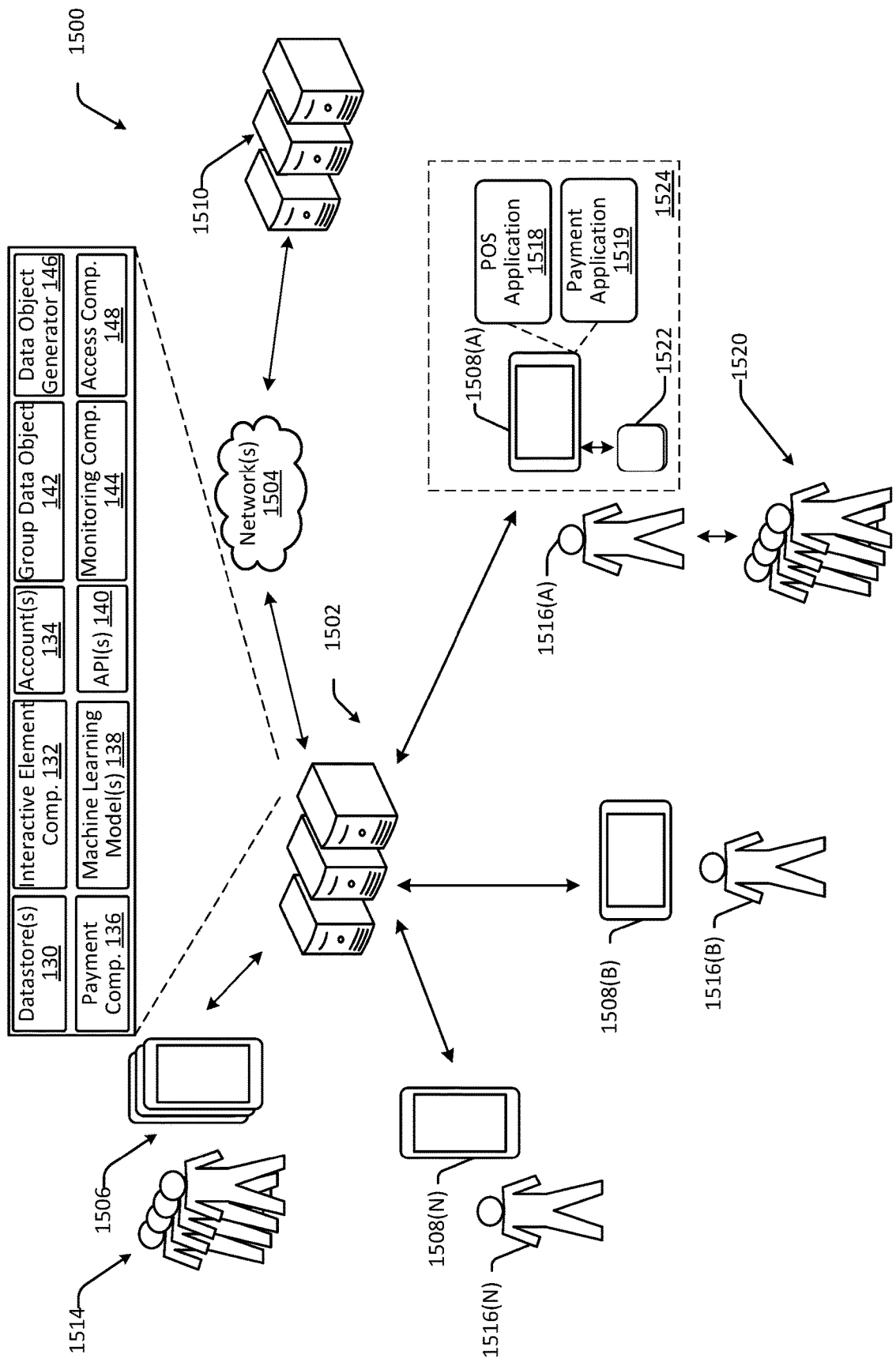
FIG. 15 is an example environment with user devices, merchant devices, a payment service, and/or other systems that may be involved in a transaction, such as by utilizing the payment application as configured herein, according to an embodiment described herein.

FIG. 15 is an example environment with user devices, merchant devices, a payment service, and/or other systems that may be involved in a transaction, such as by utilizing the payment application as configured herein, according to an embodiment described herein. The environment 1500 includes server(s) 1502 that can communicate over a network 1504 with user devices 1506 (which, in some examples can be merchant devices 1508 (individually, 1508(A)-1508(N))) and/or server(s) 1510 associated with third-party service provider(s). The server(s) 1502 can be associated with a service provider that can provide one or more services for the benefit of users 1514, as described below. Actions attributed to the service provider can be performed by the server(s) 1502.

In examples, the server(s) 1502 may be the same as or similar to the payment service 104 from FIG. 1, which may include the same or similar components as described with respect to the payment service 104 of FIG. 1, including the components of the CRM 128 as shown in FIG. 15. In examples, the components of the CRM 128 may include one or more datastores 130, an interactive element component 132, one or more accounts 134, a payment component 136, one or more machine learning models 138, one or more APIs 140, group data objects 142, a monitoring component 144, a data object generator 146, and an access component 148. Further, the user devices 102(a)-(c) from FIG. 1 may have the same or similar components and perform the same or similar functionality as the user devices 1506 from FIG. 15.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1508 can have an instance of a POS application 1518 stored thereon. The POS application 1518 can configure the merchant device 1508 as a POS terminal, which enables the merchant 1516(A) to interact with one or more customers 1520. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server(s) 1502 such that the server(s) 1502 can track transactions of the customers 1520, merchants 1516, and/or any of the users 1514 over time. Furthermore, the POS application 1518 can present a UI to enable the merchant 1516(A) to interact with the POS application 1518 and/or the service provider via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server(s) 1502, which can provide, among other services, a payment processing service. The server(s) 1502 associated with the service provider can communicate with server(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server(s) 1510 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is manually keyed in (e.g., by a merchant, customer, etc.), or payment data is recalled from a card-on-file data store, to complete the transaction.

The POS system 1524, the server(s) 1502, and/or the server(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may send the transaction data to the server(s) 1510. As described above, in at least one example, the server(s) 1510 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1510 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1510 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1510 associated therewith), and a payment authorization message is communicated from the issuer to the POS device via a path opposite of that described above, or via an alternate path.

As described above, the server(s) 1510, which can be associated with payment service provider(s), may determine whether the transaction is authorized based on the transaction data, as well as information relating to parties to the transaction (e.g., the customer 1520 and/or the merchant 1516(A)). The server(s) 1510 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application and/or other functional components for communicating with the POS system 1524 and/or the server(s) 1510 to authorize or decline transactions.

Based on the authentication notification that is received by the POS system 1524 from server(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1514 can access all of the services of the service provider. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider can offer payment processing services for processing payments on behalf of the merchants 1516, as described above. For example, the service provider can provision payment processing software, payment processing hardware and/or payment processing services to merchants 1516, as described above, to enable the merchants 1516 to receive payments from the customers 1520 when conducting POS transactions with the customers 1520. For instance, the service provider can enable the merchants 1516 to receive cash payments, payment card payments, and/or electronic payments from customers 1520 for POS transactions and the service provider can process transactions on behalf of the merchants 1516.

As the service provider processes transactions on behalf of the merchants 1516, the service provider can maintain accounts or balances for the merchants 1516 in one or more ledgers. For example, the service provider can analyze transaction data received for a transaction to determine an amount of funds owed to a merchant 1516(A) for the transaction. In at least one example, such an amount can be a total purchase price less fees charged by the service provider for providing the payment processing services. Based on determining the amount of funds owed to the merchant 1516(A), the service provider can deposit funds into an account of the merchant 1516(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1516(A) to a bank account of the merchant 1516(A) that is held at a bank or other financial institution (e.g., associated with the server(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider to the bank account of the merchant 1516(A).

In at least one example, the service provider may provide inventory management services. That is, the service provider may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1516(A) has available for acquisition. The service provider can offer actionable recommendations related to pricing of the items, placement of items on the catalog, and multi-party fulfilment of the inventory.

In at least one example, the service provider can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1512 associates capital to a merchant or customer's debit card, where the use of the debit card is defined by the terms of the loan. In some examples, the merchant may use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1514 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1516. In at least one example, the service provider can recommend and/or generate content items to supplement omni-channel presences of the merchants 1516. That is, if a merchant of the merchants 1516 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1514 to set schedules for scheduling appointments and/or users 1514 to schedule appointments.

In some examples, the service provider can provide restaurant management services to enable users 1514 to make and/or manage reservations, to monitor front-of-house and/or back-of-house operations, and so on. In such examples, the merchant device(s) 1508 and/or server(s) 1502 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1506.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1514, voice inputs into a virtual assistant or the like, to determine intents of user(s) 1514. In some examples, the service provider can utilize determined intents to automate customer service, offer promotions, provide actionable recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1514 may be new to the service provider such that the user 1514 that has not registered (e.g., subscribed to receive access to one or more services offered by the service provider) with the service provider. The service provider can offer onboarding services for registering a potential user 1514 with the service provider. In some examples, onboarding can involve presenting various questions, prompts, and the like to a potential user 1514 to obtain information that can be used to generate a profile for the potential user 1514. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1514 providing all necessary information, the potential user 1514 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1510). That is, the service provider can offer IDV services to verify the identity of users 1514 seeking to use or using their services. Identity verification enables a customer (or potential customer) to provide information that is used by compliance departments to prove that the information is associated with an identity of a real person or entity. In at least one example, the service provider can perform services for determining whether identifying information provided by a user 1514 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1510 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1502) and/or the server(s) 1510 via the network(s) 1504. In some examples, the merchant device(s) 1508 are not capable of connecting with the service provider (e.g., the server(s) 1502) and/or the server(s) 1510, due to a network connectivity issue, for example. In additional or alternative examples, the server(s) 1502 are not capable of communicating with the server(s) 1510 due to network connectivity issue, for example. In such examples, devices may operate in "offline" mode where at least some payment data is stored (e.g., on the merchant device(s) 1508) and/or the server(s) 1502 until connectivity is restored and the payment data can be transmitted to the server(s) 1502 and/or the server(s) 1510 for processing.

In at least one example, the service provider can be associated with a hub, such as an order hub, an inventory hub, a fulfillment hub and so on, which can enable integration with one or more additional service providers (e.g., associated with the additional server(s) 1510). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1506 that are in communication with one or more server computing devices 1502 of the service provider. That is, techniques described herein are directed to a specific implementation—or, a practical application—of utilizing a distributed system of user devices 1506 that are in communication with one or more server computing devices 1502 of the service provider to perform a variety of services, as described above. The unconventional configuration of the distributed system described herein enables the server(s) 1502 that are remotely-located from end-users (e.g., users 1514) to intelligently offer services based on aggregated data associated with the end-users, such as the users 1514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer actionable recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, actionable recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
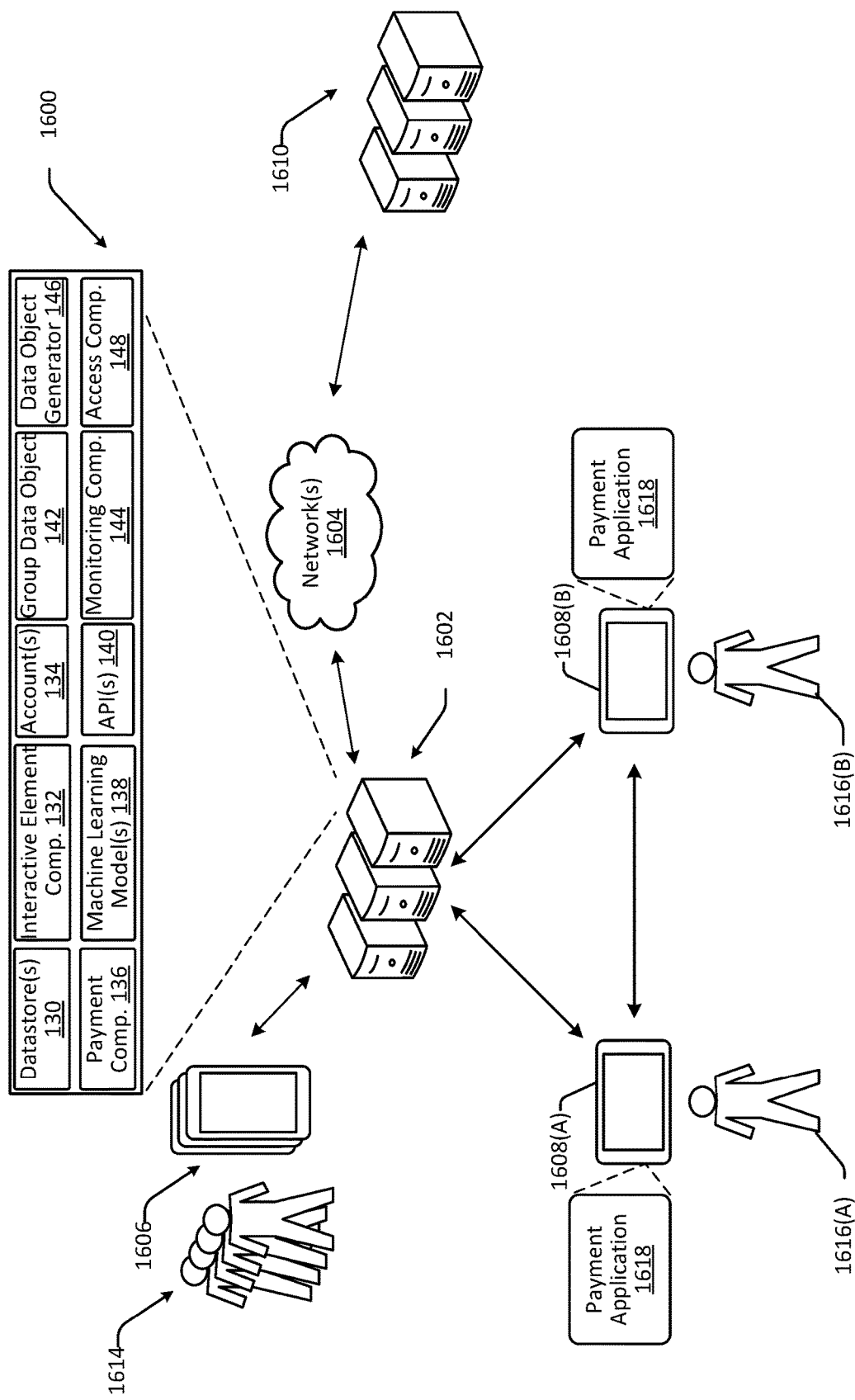
FIG. 16 is an example environment illustrating usage of the payment application, such as described herein, according to an embodiment described herein.

FIG. 16 is an example environment illustrating usage of the payment application, according to an embodiment described herein. The environment 1600 includes server(s) 1602 that can communicate over a network 1604 with user devices 1606 (which, in some examples can be user devices 1608 (individually, 1608(A), 1608(B)) and/or server(s) 1610 associated with third-party service provider(s). The server(s) 1602 can be associated with a service provider that can provide one or more services for the benefit of users 1614, as described below. Actions attributed to the service provider can be performed by the server(s) 1602. In some examples, the service provider referenced in FIG. 15 can be the same or different than the service provider referenced in FIG. 16.

As described herein, the server(s) 1602 may be the same or similar to the payment service 104 described with respect to FIG. 1, which may include the same or similar components as described with respect to the payment service 104 of FIG. 1, including the components of the CRM 128, as shown in FIG. 16. In examples, the components of the CRM 128 may include one or more datastores 130, an interactive element component 132, one or more accounts 134, a payment component 136, one or more machine learning models 138, one or more APIs 140, group data objects 142, a monitoring component 144, a data object generator 146, and an access component 148. The user devices 1606, 1608 may be the same or similar to the user device 102(*a*)-(*c*) described with respect to FIG. 1. The server(s) 1610 associated with third-party service provider(s) may be the same as or similar to the systems associated with payment services or the like, as described herein.

The environment 1600 can include a plurality of user devices 1606, as described above. Each one of the plurality of user devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1614. The users 1614 can be referred to as customers, buyers, merchants, sellers, borrowers, employees, employers, payors, payees, couriers and so on. The users 1614 can interact with the user devices 1606 via user interfaces presented via the user devices 1606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1606 can have an instance or versioned instance of an application, which can be downloaded from an application store, for example, which can present the user interface(s) described herein. In at least one example, a user 1614 can interact with the user interface via touch input, spoken input, or any other type of input.

In at least one example, the service provider can provide a peer-to-peer payment service that enables peer-to-peer payments between two or more users 1614. Two users, user 1616(A) and user 1616(B) are illustrated in FIG. 16 as "peers" in a peer-to-peer payment. In at least one example, the service provider can communicate with instances of a payment application 1618 (or other access point) installed on devices 1606 configured for operation by users 1614. In an example, an instance of the payment application 1618 executing on a first device 1608(A) operated by a payor (e.g., user 1616(A)) can send a request to the service provider to transfer an asset (e.g., fiat currency, non-fiat currency, cryptocurrency, securities, gift cards, and/or related assets) from the payor to a payee (e.g., user 1616(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 17:
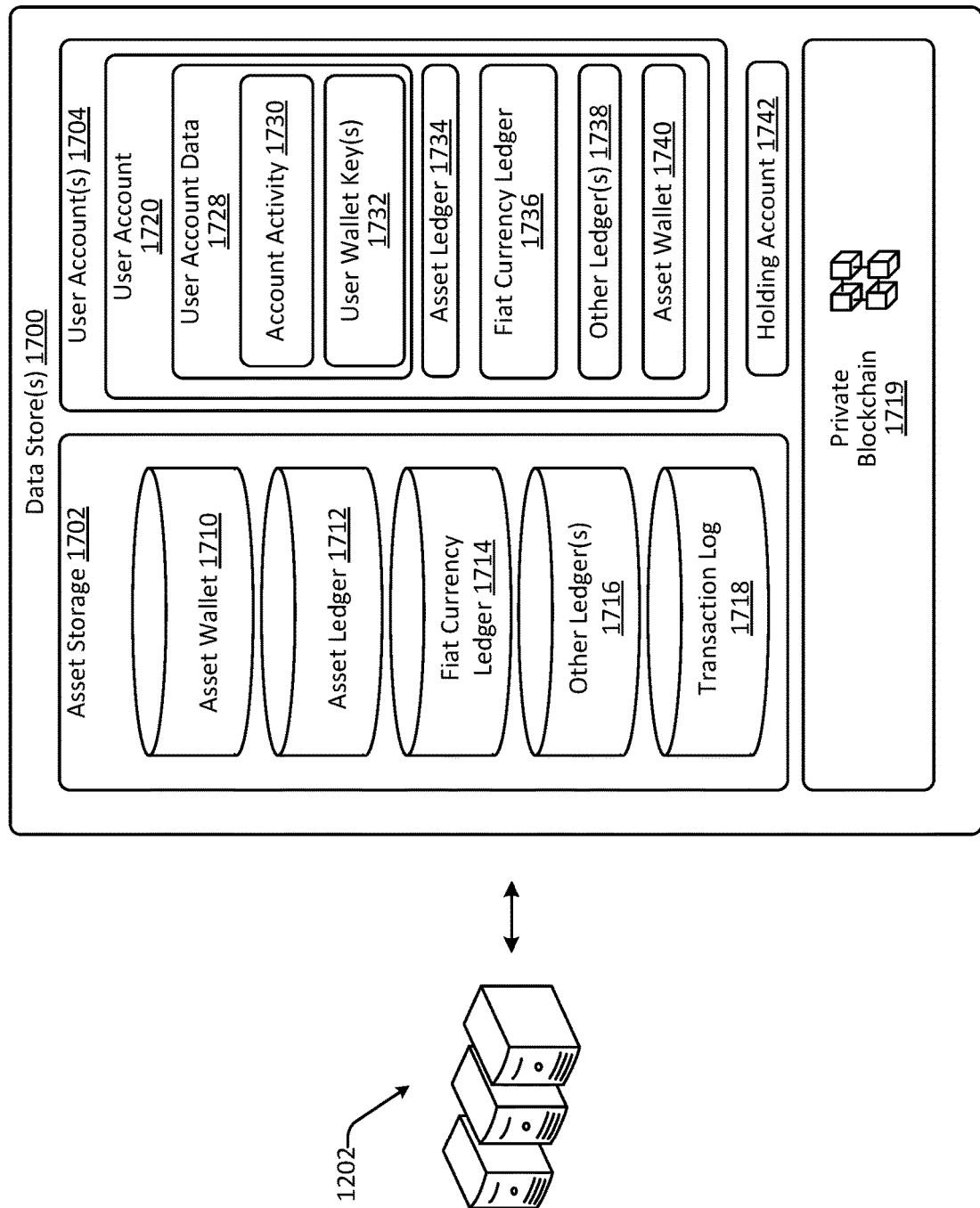
FIG. 17 is an example of datastore(s) that can be associated with servers of the payment service, according to an embodiment described herein.

In some examples, the service provider can utilize a ledger system to track transfers of assets between users 1606. FIG. 17, below, provides additional details associated with such a ledger system. The ledger system can enable users 1606 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1618 executing on user device(s) of payee(s). As an example, the service provider can transfer assets from an account of user 1616(A) to an account of the user 1616(B) and can send a notification to the user device 1608(B) of the user 1616(B) for presentation via a user interface. The notification can indicate that a transfer is in process, a transfer is complete, or the like. In some examples, the service provider can send additional or alternative information to the instances of the payment application 1618 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1618 executing on the user devices 1606. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 16. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1606 (e.g., mobile device or conventional personal computer (PC)) based on instructions transmitted to and from the server(s) 1602 (which, in such an example can be called a "messaging server"). In some instances, the messaging application can include a payment application with messaging capability that enables users of the payment application to communicate with one another. In such instances, the payment application can be executed on a user device 1606 based on instructions transmitted to and from the server(s) 1602 (e.g., the payment service discussed in this description or another payment service that supports payment transactions). In some examples, the messaging application can be provided by a third-party service provider associated with the server(s) 1610. In examples where the messaging application is a third-party service provider, the server(s) 1610 can be accessible via one or more APIs or other integrations.

As described above, the service provider can facilitate peer-to-peer transactions, which can enable users 1606 to transfer fiat currency, non-fiat currency, cryptocurrency, securities, or other assets, or portions thereof, to other users 1606. In at least one example, individual users can be associated with user accounts. Additional details associated with user accounts and the transfer of assets between users 1606 are described below with reference to FIG. 17.

Furthermore, the service provider of FIG. 16 can enable users 1606 to perform banking transactions via instances of the payment application 1618. For example, users can configure direct deposits or other deposits for adding assets to their various ledgers/balances. Further, users 1606 can configure bill pay, recurring payments, and/or the like using assets associated with their accounts. In addition to sending and/or receiving assets via peer-to-peer transactions, users 1606 buy and/or sell assets via asset networks such as cryptocurrency networks, securities networks, and/or the like.

FIG. 17 is an example of data store(s) that can be associated with servers of the payment service, according to an embodiment described herein. In at least one example, the data store(s) 1700 can store assets in an asset storage 1702, as well as data in user account(s) 1704, merchant account(s) 1706, and/or customer account(s) 1708. In at least one example, the asset storage 1702 can be used to store assets managed by the service provider of FIG. 16. In at least one example, the asset storage 1702 can be used to record whether individual of the assets are registered to users. For example, the asset storage 1702 can include an asset wallet 1710 for storing records of assets owned by the service provider of FIG. 16, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1610 can be associated therewith. In some examples, the asset wallet 1710 can communication with the asset network via one or more components associated with the server(s) 1602.

The asset wallet 1710 can be associated with one or more addresses and can vary addresses used to acquire assets (e.g., from the asset network(s)) so that its holdings are represented under a variety of addresses on the asset network. In examples where the service provider of FIG. 16 has its own holdings of cryptocurrency (e.g., in the asset wallet 1710), a user can acquire cryptocurrency directly from the service provider of FIG. 16. In some examples, the service provider of FIG. 16 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1702 may contain ledgers that store records of assignments of assets to users 1606. Specifically, the asset storage 1702 may include asset ledger 1710, fiat currency ledger 1714, and other ledger(s) 1716, which can be used to record transfers of assets between users 1606 of the service provider and/or one or more third-parties (e.g., merchant network(s), payment card network(s), ACH network(s), equities network(s), the asset network, securities networks, etc.). In doing so, the asset storage 1702 can maintain a running balance of assets managed by the service provider of FIG. 16. The ledger(s) of the asset storage 1702 can further indicate some of the running balance for each of the ledger(s) stored in the asset storage 1702 is assigned or registered to one or more user account(s) 1704.

In at least one example, the asset storage 1702 can include transaction logs 1718, which can include records of past transactions involving the service provider of FIG. 16. In at least one example, transaction data, as described herein, can be stored in association with the transaction logs 1718.

In some examples, the data store(s) 1700 can store a private blockchain 1719. A private blockchain 1719 can function to record sender addresses, recipient addresses, public keys, values of cryptocurrency transferred, and/or can be used to verify ownership of cryptocurrency tokens to be transferred. In some examples, the service provider of FIG. 16 can record transactions taking place within the service provider of FIG. 16 involving cryptocurrency until the number of transactions has exceeded a determined limit (e.g., number of transactions, storage space allocation, etc.). Based at least in part on determining that the limit has been reached, the service provider of FIG. 16 can publish the transactions in the private blockchain 1719 to a public blockchain (e.g., associated with the asset network), where miners can verify the transactions and record the transactions to blocks on the public blockchain. In at least one example, the service provider of FIG. 16 can participate as miner(s) at least for its transactions to be posted to the public blockchain.

In at least one example, the data store(s) 1700 can store and/or manage accounts, such as user account(s) 1704, merchant account(s) 1706, and/or customer account(s) 1708. In at least one example, the user account(s) 1704 may store records of user accounts associated with the users 1606. In at least one example, the user account(s) 1704 can include a user account 1720, which can be associated with a user (of the users 1606). Other user accounts of the user account(s) 1704 can be similarly structured to the user account 1720, according to some examples. In other examples, other user accounts may include more or less data and/or account information than that provided by the user account 1720. In at least one example, the user account 1720 can include user account data 1728, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1728 can include account activity 1730 and user wallet key(s) 1732. The account activity 1730 may include a transaction log for recording transactions associated with the user account 1720. In some examples, the user wallet key(s) 1732 can include a public-private key-pair and a respective address associated with the asset network or other asset networks. In some examples, the user wallet key(s) 1732 may include one or more key pairs, which can be uni3ue to the asset network or other asset networks.

In addition to the user account data 1728, the user account 1720 can include ledger(s) for account(s) managed by the service provider of FIG. 16, for the user. For example, the user account 1720 may include an asset ledger 1734, a fiat currency ledger 1736, and/or one or more other ledgers 1738. The ledger(s) can indicate that a corresponding user utilizes the service provider of FIG. 16 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 16.

In some examples, the asset ledger 1734 can store a balance for each of one or more cryptocurrencies (e.g., Bitcoin, Ethereum, Litecoin, etc.) registered to the user account 17200. In at least one example, the asset ledger 1734 can further record transactions of cryptocurrency assets associated with the user account 1720. For example, the user account 1720 can receive cryptocurrency from the asset network using the user wallet key(s) 1732. In some examples, the user wallet key(s) 1732 may be generated for the user upon request. User wallet key(s) 1732 can be requested by the user in order to send, exchange, or otherwise control the balance of cryptocurrency held by the service provider of FIG. 16 (e.g., in the asset wallet 1710) and registered to the user. In some examples, the user wallet key(s) 1732 may not be generated until a user account requests such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 16 and the value is credited as a balance in asset ledger 1734), by purchasing currency in the form associated with the account using currency in a different form (e.g., buying a value of cryptocurrency from the service provider of FIG. 16 using a value of fiat currency reflected in fiat currency ledger 1714, and crediting the value of cryptocurrency in asset ledger 1734), or by conducting a transaction with another user (customer or merchant) of the service provider of FIG. 16 wherein the account receives incoming currency (which can be in the form associated with the account or a different form, in which the incoming currency may be converted to the form associated with the account). In some examples, the user account data 1728 can include preferences for maintaining balances of individual of the ledgers. For example, the service provider of FIG. 16 can automatically debit the fiat currency ledger 1736 to increase the asset ledger 1734, or another account associated with the user whenever the cryptocurrency balance (e.g., of the asset ledger 1734) falls below a stated level (e.g., a threshold). Conversely, in some embodiments, the service provider of FIG. 16 can automatically credit the fiat currency ledger 1736 to decrease the asset ledger 1734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 16 (i.e., an external account). In at least one example, the user can transfer all or a portion of a balance of the cryptocurrency stored in the third-party cryptocurrency wallet to the service provider of FIG. 16. Such a transaction can request the user to transfer an amount of the cryptocurrency in a message signed by user's private key to an address provided by the service provider of FIG. 16. In at least one example, the transaction can be sent to miners to bundle the transaction into a block of transactions and to verify the authenticity of the transactions in the block. Once a miner has verified the block, the block is written to a public, distributed blockchain where the service provider of FIG. 16 can then verify that the transaction has been confirmed and can credit the user's asset ledger 1734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 16. As described above, in some examples, the service provider of FIG. 16 can acquire cryptocurrency from a third-party source (e.g., associated with the third-party server(s)). In such examples, the asset wallet 1710 can be associated with different addresses and can vary addresses used to acquire cryptocurrency so that its holdings are represented under a variety of addresses on a blockchain. When the service provider of FIG. 16 has their own holdings of cryptocurrency, users can acquire cryptocurrency directly from the service provider of FIG. 16. In some examples, the service provider of FIG. 16 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 16 has its own cryptocurrency assets, cryptocurrency transferred in a transaction (e.g., data with address provided for receipt of transaction and a balance of cryptocurrency transferred in the transaction) can be stored in the asset wallet 1710. In at least one example, the service provider of FIG. 16 can credit the asset ledger 1734 of the user. Additionally, while the service provider of FIG. 16 recognizes that the user retains the value of the transferred cryptocurrency through crediting the asset ledger 1734, any person that inspects the blockchain will see the cryptocurrency as having been transferred to the service provider of FIG. 16. In some examples, the asset wallet 1710 can be associated with many different addresses. In such examples, any person that inspects the blockchain may not easily associate all cryptocurrency stored in asset wallet 1710 as belonging to the same entity. It is this presence of a private ledger that is used for real-time transactions and maintained by the service provider of FIG. 16, combined with updates to the public ledger at other times, that allows for extremely fast transactions using cryptocurrency to be achieved. In some examples, the "private ledger" can refer to the asset ledger 1710, which in some examples, can utilize the private blockchain 1719, as described herein. The "public ledger" can correspond to a public blockchain associated with the asset network.

In at least one example, a user's asset ledger 1734, fiat currency ledger 1736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1734. In some examples, a user can receive fiat currency or another currency in the form of payment for a transaction with another user. In at least one example, at least a portion of such funds can be converted into cryptocurrency by the service provider of FIG. 16 and used to fund the asset ledger 1734 of the user.

As addressed above, in some examples, users can also have other accounts maintained by the service provider of FIG. 16. For example, a user can also have an account in U.S. dollars, which can be tracked, for example, via the fiat currency ledger 1736. Such an account can be funded by transferring money from a bank account at a third-party bank to an account maintained by the service provider of FIG. 16 as is conventionally known. In some examples, a user can receive fiat currency in the form of payment for a transaction with another user. In such examples, at least a portion of such funds can be used to fund the fiat currency ledger 1736.

In some examples, a user can have one or more internal payment cards registered with the service provider of FIG. 16. Internal payment cards can be linked to one or more of the accounts associated with the user account 1720. In some embodiments, options with respect to internal payment cards can be adjusted and managed using an application (e.g., the payment application 1618).

In at least one example, as described above, each ledger can correspond to an account of the user that is managed by the service provider of FIG. 16. In at least one example, individual of the accounts can be associated with a wallet or a stored balance for use in payment transactions, peer-to-peer transactions, payroll payments, etc.

In at least one example, the user account 1720 can be associated with an asset wallet 1740. The asset wallet 1740 of the user can be associated with account information that can be stored in the user account data 1728 and, in some examples, can be associated with the user wallet key(s) 1732. In at least one example, the asset wallet 1740 can store data indicating an address provided for receipt of a cryptocurrency transaction. In at least one example, the balance of the asset wallet 1740 can be based at least in part on a balance of the asset ledger 1734. In at least one example, funds availed via the asset wallet 1740 can be stored in the asset wallet 1740 or the asset wallet 1710. Funds availed via the asset wallet 1710 can be tracked via the asset ledger 1734. The asset wallet 1740, however, can be associated with additional cryptocurrency funds.

In at least one example, when the service provider of FIG. 16 includes a private blockchain 1719 for recording and validating cryptocurrency transactions, the asset wallet 1740 can be used instead of, or in addition to, the asset ledger 1734. For example, at least one example, a merchant can provide the address of the asset wallet 1740 for receiving payments. In an example where a customer is paying in cryptocurrency and the customer has their own cryptocurrency wallet account associated with the service provider of FIG. 16, the customer can send a message signed by its private key including its wallet address (i.e., of the customer) and identifying the cryptocurrency and value to be transferred to the merchant's asset wallet 1740. The service provider of FIG. 16 can complete the transaction by reducing the cryptocurrency balance in the customer's cryptocurrency wallet and increasing the cryptocurrency balance in the merchant's asset wallet 1740. In addition to recording the transaction in the respective cryptocurrency wallets, the transaction can be recorded in the private blockchain 1719 and the transaction can be confirmed. A user can perform a similar transaction with cryptocurrency in a peer-to-peer transaction as described above. In at least one example, the cryptocurrency wallet account 1730 can be funded by a balance transfer from a third-party cryptocurrency wallet, as described above. Such a transaction can re3uire a user to transfer an amount of cryptocurrency in a message signed by the user's private key to an address of the cryptocurrency wallet account 1730. The transferred amount of cryptocurrency can then be within the cryptocurrency wallet account 1730 for use in later transactions.

While the asset ledger 1734 and/or asset wallet 1740 are each described above with reference to cryptocurrency, the asset ledger 1734 and/or asset wallet 1740 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1700 may also include a holding account 1742, which may be similar to and perform similar functions as the holding account 146 described with respect to FIG. 1.

It should be noted that user(s) having accounts managed by the service provider of FIG. 16 is an aspect of the technology disclosed that enables technical advantages of increased processing speed and improved security.

Figure 18:
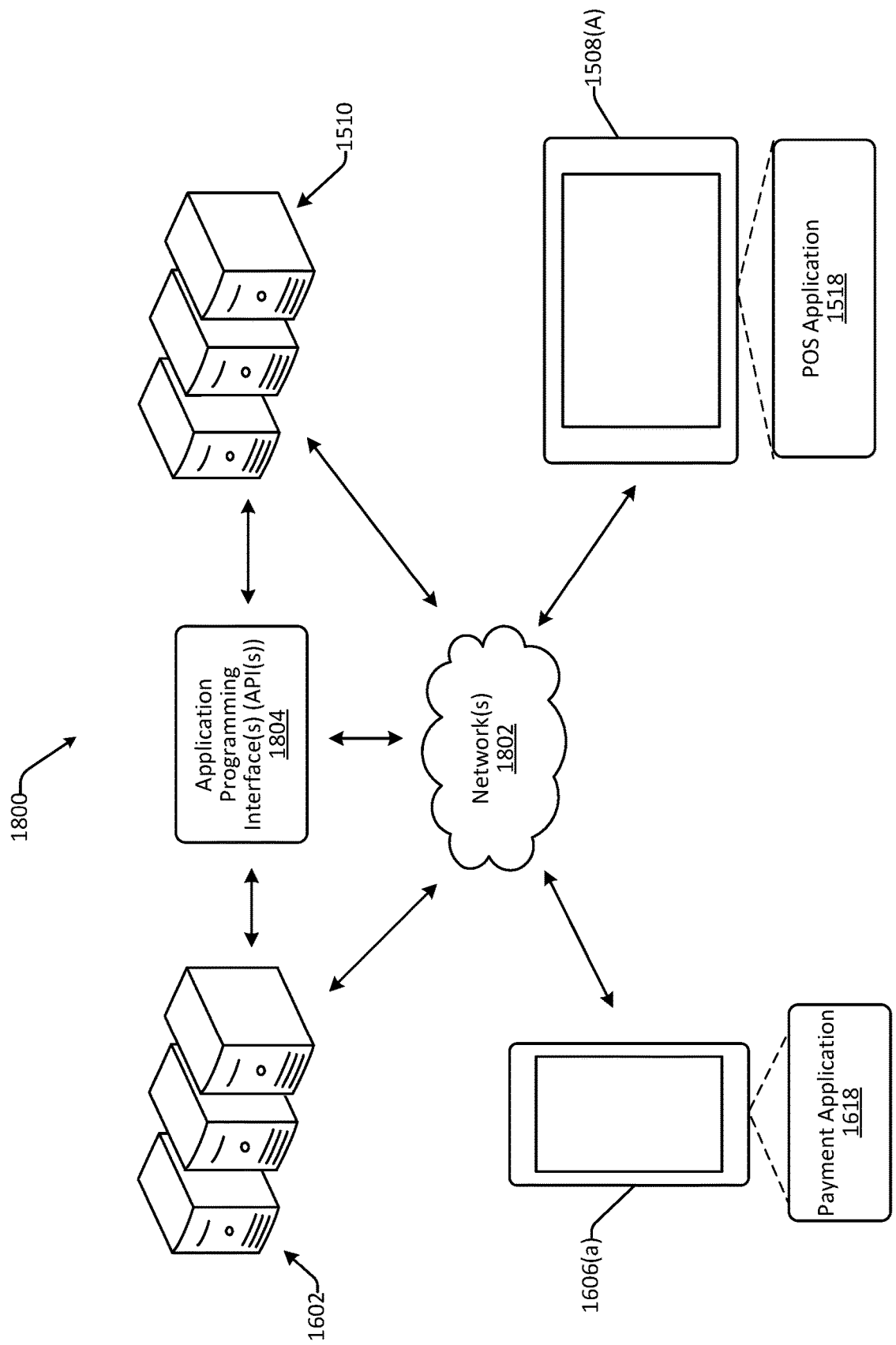
FIG. 18 is an example environment wherein the payment service environment of FIG. 15 and the environment from FIG. 16 can be integrated to enable payments at the point-of-sale using assets associated with user accounts in the peer-to-peer environment of FIG. 16, according to an embodiment described herein.

FIG. 18 is an example environment 1800 wherein the environment 1000 and the environment 1600 can be integrated to enable payments at the point-of-sale using assets associated with user accounts in the peer-to-peer environment of FIG. 16, according to an embodiment described herein. As illustrated, each of the components can communicate with one another via one or more networks 1802. In some examples, one or more APIs 1804 or other functional components can be used to facilitate such communication. For example, the APIs 1804 can be used to facilitate communication with payment service server(s) 1602 and server(s) 1610 associated with third-party service provider(s).

In at least one example, the example environment 1800 can enable contactless payments, via integration of peer-to-peer payment, or other payment making, platform and payment processing platform(s), are described herein. For the purpose of FIG. 18, the environment 1500 can refer to a payment processing platform and the environment 1600 can refer to a peer-to-peer payment, or payment making, platform. In an example, such an integration can enable a customer to participate in a transaction via their own computing device instead of interacting with a merchant device of a merchant, such as the merchant device 1508(A). In such an example, the POS application 1518, associated with a payment processing platform and executable by the merchant device 1508(A) of the merchant, can present a Quick Response (QR) code, or other code that can be used to identify a transaction (e.g., a transaction code), in association with a transaction between the customer and the merchant. The QR code, or other transaction code, can be provided to the POS application 1518 via an API associated with the peer-to-peer payment platform. In an example, the customer can utilize their own computing device, such as the user device 1608(A), to capture the QR code, or the other transaction code, and to provide an indication of the captured QR code, or other transaction code, to server(s) 1502 and/or server(s) 1602.

Based at least in part on the integration of the peer-to-peer payment platform and the payment processing platform (e.g., via the API), the server(s) 1502 and/or 1602 associated with each can exchange communications with each other and with a payment application 1618 associated with the peer-to-peer payment platform and/or the POS application 1518 to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1608(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions, in such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1518 and the payment application 1618, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1508(A) can present a QR code, or other transaction code, that can be associated with a peer-to-peer payment platform. The customer can use a camera associated with the user device 1608(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit finds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1518 can cause a text message with a resource locator (e.g., uniform resource locator (URL)) that can be associated with a peer-to-peer payment platform to be sent to the user device 1608(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction between the customer and the resource locator presented via the customer computing device can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1608(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer" The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1518 of a merchant device 1508(A) at a brick-and-mortar store of a merchant to a payment application 1618 of a user device 1608(A) of a customer to enable the customer to participate in a transaction via their own computing device. For instance, in a. "scan to pay" example as described above, based at least in part on capturing the QR code, or other transaction code, via the user device 1608(A), the payment processing platform can provide transaction data to the peer-to-peer payment platform for presentation via the payment application 1618 on the user device 1608(A). In some examples, the customer can watch items being added to their cart (e.g., via a user interface presented via the payment application). As an item is added to a virtual cart by the merchant via the POS application 1018 on the merchant device 1508(A) of the merchant the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send an actionable recommendation to the payment application 1618 for presentation via, a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1608(A) during or after payment of the transaction.

In some examples, based at least in part on capturing the QR code, or other transaction code, the payment processing platform can provide transaction data to the peer-to-peer payment platform for presentation via the payment application 1618 on the computing device of the customer, such as the user device 1608(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1618 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above and also below techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1518, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip, That is, in such examples, fewer data transmissions are utilized and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1618 (e.g., instead of a native camera, or other sensor), techniques described herein can utilize an indication of the QR code, or other transaction code, received from the payment application for two-factor authentication to enable more secure payments.

Figure 19:
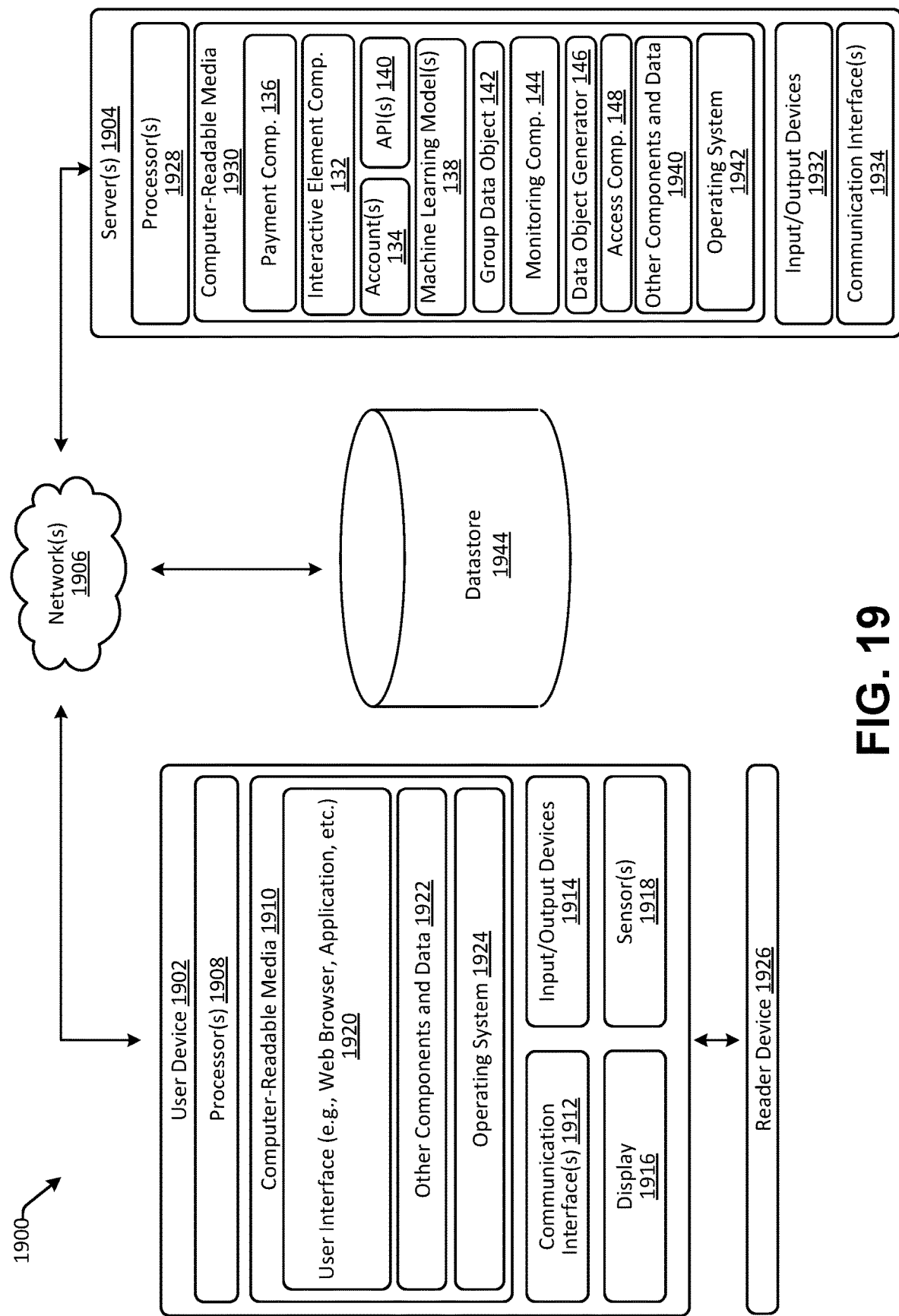
FIG. 19 is an illustrative block diagram illustrating a system for performing techniques described herein, according to an embodiment described herein.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction, FIG. 19 is an illustrative block diagram illustrating a system for performing techniques described herein, according to an embodiment described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 19.

The user device 1902 may be the same or similar to the user device 102 as described with respect to FIG. 1. Additionally, the server(s) 1904 may be the same or similar to the payment service 104 described with respect to FIG. 1.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipulate signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other networked devices. In at least one example, the user interface 1920 can be presented via a web browser, or the like. In other examples, the user interface 1920 can be presented via an application, such as a mobile application or desktop application, which can be provided by a service provider associated with the server(s) 1904, or which can be an otherwise dedicated application. In some examples, the user interface 1920 can be configured to display options for withdrawing funds to make donations. The user interface 1920 may also be configured to surface information about donations. It should be understood that the user interface 1920 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1924, described above, to provide one or more services. That is, in some examples, the service provider 1924 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1914 and/or for sending users 1914 notifications regarding available appointments with merchant(s) located proximate to the users 1914. In at least one example, location can be used for taking payments from nearby customers when they leave a geofence, or location can be used to initiate an action responsive to users 1914 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments and/or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment service 104 and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more components and/or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one component for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1912, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the service provider and/or payment processing service. Functional components stored in the computer-readable media 1930 can optionally include the components described with respect to the CRM 128 from FIG. 1, as shown in FIG. 19. In examples, the components of the CRM 128 may include an interactive element component 132, one or more accounts 134, a payment component 136, one or more machine learning models 138, one or more APIs 140, group data objects 142, a monitoring component 144, a data object generator 146, and an access component 148.

The other components may include a training component that can be configured to train models using machine-learning mechanisms. For example, a machine-learning mechanism can analyze training data to train a data model that generates an output, which can be an actionable recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1902 and/or the server(s) 1904 for use at a time after the data models have been trained (e.g., at runtime).

The one or more other components and data 1940 can include programs, drivers, etc., and the data used or generated by the functional components. Further, the server(s) 1904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1930 can additionally include an operating system 1942 for controlling and managing various functions of the server(s) 1904.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1902 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1944 that can be configured to store data that is accessible, manageable, and updatable. In some examples, the datastore 1944 can be integrated with the user device 1902 and/or the server(s) 1904. In other examples, as shown in FIG. 19, the datastore 1944 can be located remotely from the server(s) 1904 and can be accessible to the server(s) 1904. The datastore 1944 can comprise multiple databases and/or servers connected locally and/or remotely via the network(s) 1906.

In at least one example, the datastore 1944 can store user profiles, which can include merchant profiles, customer profiles, and so on. In some examples, the datastore(s) 1944 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1944 can store additional or alternative types of data as described herein.

Example Clauses

1. A method, comprising: generating a group data object that associates a first user account with one or more second user accounts, the first user account and the one or more second user accounts associated with a payment service, the group data object representing a group of users associated with the payment service; associating a sub-account with the group data object such that the sub-account is usable by the first user account and the one or more second user accounts, the sub-account is unusable to user accounts that are not associated with the group data object; monitoring, in real time, funds held in the sub-account; and enabling a functionality for the group of users based at least in part on the funds satisfying a threshold amount of funds in the sub-account, the functionality not being available to other users who are not part of the group of users.

2. The method as clause 1 recites, further comprising: determining that a first device associated with the first user account is physically located proximate to one or more second devices associated with the one or more second user accounts; determining that the first device and the one or more second devices have installed thereon a payment application associated with the payment service; and wherein generating the group data object is based at least in part on the first device and the one or more second devices being physically located proximate to each other and having the payment application installed thereon.

3. The method as clauses 1 and/2 recite, further comprising: based at least in part on associating the sub-account with the group data object: enabling the first user account and the one or more second user accounts to view transaction information for transactions occurring in association with the group data object; enabling the first user account and the one or more second user accounts to deposit funds into the sub-account; and enabling at least one of the first user account or the one or more second user accounts to engage in transactions on behalf of the group of users based on access controls associated with the group data object.

4. The method as any of clauses 1, 2, and/or 3 recite, further comprising: determining that characteristics of a third user account correspond to reference characteristics of the group of users; generating an actionable recommendation for the third user account to be added to the group of users; and based at least in part on receiving user input data accepting the actionable recommendation: associating the third user account with the group data object; and enabling the sub-account to be usable by the third user account.

5. A system comprising: one or more processors; and non-transitory computer-readable media storing instructions that, when executed by the one or more processors, cause the system to perform operations comprising: generating a group data object that associates a first account with at least a second account, the group data object representing a group of users; associating a sub-account with the group data object, the sub-account configured to be unusable to user accounts that are not associated with the group data object; monitoring, in real time, funds held in the sub-account; and enabling a functionality for the group of users based at least in part on a characteristic of the group of users satisfying a threshold, wherein the functionality is enabled for the group of users and disabled for at least one user who is not included in the group of users.

6. The system as clause 5 recites, the operations further comprising: receiving user input data indicating a user account of the at least one second user accounts is to be removed from association with the group data object; determining an amount of funds in the sub-account to attribute to the user account when the user input data is received; and facilitating withdrawal of the amount of funds from the sub-account and into the user account based at least in part on the user account being removed from association with the group data object.

7. The system as clauses 5 and/or 6 recite, the operations further comprising: determining that a first device associated with the first user account and at least one second device associated with the at least one second user account are at a first location; determining an attribute of the first location at a time when the first device and the at least one second device are at the first location; determining an event occurring at the first location at the time based at least in part on the attribute, wherein the group data object persists longer than the event and the group data object is one of multiple group data objects configured to be associated with the event; and associating the event with the group data object.

8. The system as any of clauses 5, 6, and/or 7 recite, the operation further comprising: determining that the functionality is associated with the event; and wherein enabling the functionality comprises enabling the functionality for a period of time associated with the event based at least in part on the event being associated with the group data object.

9. The system as any of clauses 5, 6, 7, and/or 8 recite, the operations further comprising: determining an incentive associated with a payment service based at least in part on attributes of the group data object; and wherein enabling the functionality comprises: enabling the incentive to be utilized in association with the sub-account.

10. The system as any of clauses 5, 6, 7, 8, and/or 9 recite, wherein: the threshold amount of funds is determined based at least in part on occurrence of a target action associated with the group of users; and the functionality includes enabling withdrawal of an apportioned amount of funds in the sub-account by the first account and the at least one second account.

11. The system as any of clauses 5, 6, 7, 8, 9, and/or 10 recite, the operations further comprising: associating the group data object with a first purpose; enabling a first set of functionality for the group data object based at least in part on the first purpose; determining that an event has occurred indicating the purpose has been fulfilled; dissociating the first set of functionality from the group data object; and initiating a process for automated deconstruction of the group data object.

12. The system as any of clauses 5, 6, 7, 8, 9, 10, and/or 11 recite, wherein the characteristic of the group of users includes at least one of: an amount of funds associated with the group of users; a number of users associated with the group of users; a length of time the group of users has been active; when new members are added to the group of users; a retention rate associated with membership to the group of users; spending amounts or spending rates associated with the group of users; diversification of items utilized by the group of users; accomplishment of learning modules; or referrals associated with the group of users.

13. A computer-implemented method comprising: generating a group data object that associates a first account with at least a second account, the group data object representing a group of users; associating a group account with the group data object, the group account configured to be unusable to user accounts that are not associated with the group data object; monitoring, in real time, funds held in the sub-account; and enabling a functionality for the group of users based at least in part on a characteristic of the group of users satisfying a threshold, wherein the functionality is enabled for the group of users and disabled for at least one user who is not included in the group of users.

14. The computer-implemented method as clause 13 recites, further comprising: associating the group data object with a first purpose; enabling a first set of functionality for the group data object based at least in part on the first purpose; determining that an event has occurred indicating that the first purpose has been fulfilled; associating, based at least in part on the first purpose and the event, the group data object with a second purpose instead of the first purpose; and enabling a second set of functionality for the group data object based at least in part on the second purpose.

15. The computer-implemented method as clauses 13 and/or 14 recite, further comprising: generating data representing a receipt that indicates a previous transaction to which the first account was associated; receiving an indication that a user has selected the previous transaction from the receipt in association with a request to generate a group data object; and wherein generating the group data object is based at least in part on receiving the indication.

16. The computer-implemented method as any of clauses 13, 14, and/or 15 recite, further comprising: determining an incentive associated with a payment service based at least in part on attributes of the group data object; associating a first instance of the incentive with individual ones of the first account and the second accounts such that individual users associated with the first account and the second accounts are enabled to utilize the first instance of the incentive for transactions unassociated with the group data object; and associating a second instance of the incentive with the group data object such that individual users of the group of users are enabled to utilize the second instance of the incentive for transactions associated with the group data object, the second instance of the incentive being more valuable than the first instance of the incentive.

17. The computer-implemented method as any of clauses 13, 14, 15, and/or 16 recite, further comprising: determining, from data associated with the first account and the second accounts, that users of the first account and the second accounts are likely to be associated with a future event; sending an actionable recommendation to form the group data object to devices associated with the first account and the second accounts; and wherein generating the group data object is based at least in part on receiving user input data accepting the actionable recommendation.

18. The computer-implemented method as any of clauses 13, 14, 15, 16, and/or 17 recite, further comprising: receiving user input data indicating an account of at least one of the second accounts is to be removed from association with the group data object; determining an amount of funds in the group account to attribute to the account when the user input data is received; and facilitating withdrawal of the amount of funds from the group account and into the account based at least in part on the account being removed from association with the group data object.

19. The computer-implemented method as any of clauses 13, 14, 15, 16, 17, and/or 18 recite, further comprising: determining that a first device associated with the first account and at least one second device associated with at least one of the second accounts are at a first location; determining an attribute of the first location at a time when the first device and the at least one second device are at the first location; determining an event occurring at the first location at the time based at least in part on the attribute; and associating the event with the group data object.

20. The computer-implemented method as any of clauses 13, 14, 15, 16, 17, 18, and/or 19 recite, further comprising: determining that the functionality is associated with the event; and wherein enabling the functionality comprises enabling the functionality for a period of time associated with the event based at least in part on the event being associated with the group data object.

21. A method, comprising: storing a group data object that associates a first user account with one or more second user accounts, the first user account and the one or more second user accounts associated with a payment service, the group data object representing a group of users associated with the payment service; generating a user interface associated with the group data object, the user interface configured to display information associated with the group of users; determining that user input data has been received in association with at least one of the first user account or the one or more second user accounts; determining that the user input data is associated with the group data object; updating one or more elements of the user interface, in real time, based at least in part on the user input data, wherein the one or more elements of the user interface represent the one or more second user accounts; generating a command configured to cause a payment application to be displayed based at least in part on updating the one or more elements; determining a device associated with the group data object; and sending the command to the device, the command causing the payment application residing on the device to be displayed in a foreground of the device and to display the one or more elements as updated.

22. The method as clause 21 recites, further comprising: determining that the user input data is associated with a transaction that utilized a sub-account associated with the group data object; determining that an element of the one or more elements of the user interface is associated with displaying a balance of the sub-account; and wherein updating the one or more elements comprises causing the element to indicate the balance of the sub-account after the balance is updated based on the transaction.

23. The method as clauses 21 and/or 22 recite, further comprising: determining that the user input data is associated with a deposit, by the first user account, of an amount of funds into a sub-account associated with the group data object; determining a first element of the one or more elements that is associated with displaying a balance of the sub-account; determining a second element of the one or more elements that is associated with displaying a contribution amount for the first user account; and wherein updating the one or more elements comprises: causing the first element to indicate the balance of the sub-account after the balance is updated based on the deposit; and causing the second element to indicate that the contribution amount has increased for the first user account.

24. The method as any of clauses 21, 22, and/or 23 recite, further comprising: determining that a third user account has been associated with the group data object; determining an access control tier to associate with the third user account based at least in part on characteristics of the third user account; and wherein updating the one or more elements comprises displaying a representation of the third user account and an indication of the access control tier on the user interface.

25. A system comprising: one or more processors; and non-transitory computer-readable media storing instructions that, when executed by the one or more processors, cause the system to perform operations comprising: storing a group data object that associates a first account with one or more second accounts, the group data object representing a group of users; generating a user interface associated with the group data object, the user interface configured to display information associated with the group of users; determining that user input data associated with at least one of the first account or the one or more second accounts is associated with the group data object; altering an element of the user interface, in real time, based at least in part on the user input data; generating a command configured to cause a payment application to be displayed based at least in part on altering the element; determining a device associated with the group data object; and sending the command to the device, the command causing the payment application residing on the device to be displayed in a foreground of the device and to display the element as altered.

26. The system as clause 25 recites, the operations further comprising: determining that a trigger event associated with the group data object has occurred; associating, based at least in part on the trigger event occurring, an incentive with the group data object; and wherein updating the one or more elements comprises displaying a representation of the incentive on the user interface, the representation of the incentive being selectable by users of the group of users to redeem the incentive.

27. The system as clauses 25 and/or 26 recite, wherein the trigger event includes at least one of: an amount of funds in a sub-account of the group data object satisfying a threshold amount of funds; occurrence of an event predefined as being associated with the group data object; or a number of the users in the group of users satisfying a threshold number of users.

28. The system as any of clauses 25, 26, and/or 27 recite, the operation further comprising: associating the group data object and the first account with a payment application residing on a device of a user of the first account; determining that the user input data was received utilizing the payment application while the group data object was selected for use instead of the first account; and wherein determining that user input data is associated with the group data object is based at least in part on the group data object being selected for use instead of the first account.

29. The system as any of clauses 25, 26, 27, and/or 28 recite, the operations further comprising: associating transaction data with the group data object; generating data representing the element based at least in part on the transaction data; determining that the user input data is associated with additional transaction data; and wherein altering the element is based at least in part on the user input data being associated with the additional transaction data.

30. The system as any of clauses 25, 26, 27, 28, and/or 29 recite, wherein the altering affects the element and at least one other element via an inverse relationship.

31. The system as any of clauses 25, 26, 27, 28, 29, and/or 30 recites, the operations further comprising: generating a command configured to cause a notification to be displayed based at least in part on altering the element; determining a device associated with the group data object; and sending the command to the device, the command causing a screen of the device to display the notification, the notification being a selectable element that, when selected, causes a payment application associated with the group data object to be displayed in a foreground of the device.

32. The system as any of clauses 25, 26, 27, 28, 29, 30, and/or 31 recite, the operations further comprising: generating a machine learning model configured to determine element alterations based on input types associated with group data objects; generating a training dataset from feedback data associated with the element alterations determined utilizing the machine learning model; training the machine learning model utilizing the training dataset such that a trained machine learning model is generated; and wherein altering the element is performed utilizing the trained machine learning model.

33. A computer-implemented method comprising: storing a group data object that associates a first account with second accounts, the group data object representing a group of users; generating a user interface associated with the group data object, the user interface configured to display information associated with the group of users; determining that input data associated with at least one of the first account or the second accounts is associated with the group data object; altering an element of the user interface, in real time, based at least in part on the input data; generating a command configured to cause a payment application to be displayed based at least in part on altering the element; determining a device associated with the group data object; and sending the command to the device, the command causing the payment application residing on the device to be displayed in a foreground of the device and to display the element as altered.

34. The computer-implemented method as clause 33 recites, wherein the element is a slider bar indicating a contribution attribution associated with the first account, and the method further comprises altering at least one additional slider bar associated with the second accounts such that a contribution attribution associated with the second accounts changes based at least in part on the contribution attribution associated with the first account.

35. The computer-implemented method as clauses 33 and/or 34 recite, wherein the element of the user interface includes at least one of: a button that, when selected, causes a functionality associated with the group data object to be performed; a dial that, when manipulated, causes the functionality to be performed; or a link that, when selected, causes display of information associated with the group data object.

36. The computer-implemented method as any of clauses 33, 34, and/or 35 recite, further comprising: prior to generation of the group data object, receiving input data indicating a selection of a purpose of multiple predefined purposes to associate with the group data object; and associating the group data object with a predefined set of functionalities based at least in part on the selection of the purpose, the predefined set of functionalities being a subset of functionalities capable of being associated with the group data object.

37. The computer-implemented method as any of clauses 33, 34, 35, and/or 36 recite, further comprising: determining that an amount of funds in a sub-account of the group data object has satisfied a threshold amount; causing display, via the user interface, of a first indicator that the amount of funds has satisfied the threshold amount; automatically facilitating a transaction on behalf of the group of users based at least in part on the amount of funds satisfying the threshold amount; and causing display, via the user interface, of a second indicator indicating that the transaction has been completed.

38. The computer-implemented method as any of clauses 33, 34, 35, 36, and/or 37 recite, further comprising: determining that a trigger event associated with the group data object has occurred; associating, based at least in part on the trigger event occurring, an incentive with the group data object; and wherein updating the one or more elements comprises displaying a representation of the incentive on the user interface, the representation of the incentive being selectable by users of the group of users to redeem the incentive.

39. The computer-implemented method as any of clauses 33, 34, 35, 36, 37, and/or 38 recite, further comprising: determining an access control tier to associate with the first account based at least in part on characteristics of the first account; and wherein altering the element comprises displaying a representation of the first account and an indication of the access control tier on the user interface.

40. The computer-implemented method as any of clauses 33, 34, 35, 36, 37, 38, and/or 39 recite, wherein the altering affects the element and at least one other element via an inverse relationship.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to various figures for convenience and ease of understanding. However, the methods illustrated are not limited to being performed using components described in any of the devices and systems described herein, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors; and
non-transitory computer-readable media storing instructions that, when executed by the one or more processors, cause the system to perform operations comprising:
storing a group data object that associates a first account with one or more second accounts, the group data object representing a group of users;
generating a user interface associated with the group data object, the user interface configured to display information associated with the group of users;
determining that user input data associated with at least one of the first account or the one or more second accounts is associated with the group data object instead of being associated with individual users in the group of users;
determining that an element of the user interface is to be altered based at least in part on the user input data being associated with the group data object instead of being associated with the individual users in the group of users;
altering the element of the user interface, in real time, based at least in part on the user input data;
generating, based at least in part on altering the element and a type of the user input data, a command configured to cause a payment application residing on a computing device to be displayed;
determining a device associated with the group data object; and
sending the command to the device, the command causing the payment application residing on the device to transition from a background of the device where the user interface is absent from a display of the device to a foreground of the device such that the element as altered is displayed on the device.

2. The system as claim 1 recites, the operations further comprising:
determining that a trigger event associated with the group data object has occurred;
associating, based at least in part on the trigger event occurring, an incentive with the group data object; and
wherein altering the element comprises displaying a representation of the incentive on the user interface, the representation of the incentive being selectable by users of the group of users to redeem the incentive.

3. The system as claim 1 recites, wherein the user input data indicates at least one of:
an amount of funds in a sub-account of the group data object satisfying a threshold amount of funds;
occurrence of an event predefined as being associated with the group data object; or
a number of users in the group of users satisfying a threshold number of users.

4. The system as claim 1 recites, the operations further comprising:
associating the group data object and the first account with a payment application residing on a device of a user of the first account;
determining that the user input data was received utilizing the payment application residing on the device of the user of the first account while the group data object was selected for use instead of the first account; and
wherein determining that user input data is associated with the group data object is based at least in part on the group data object being selected for use instead of the first account.

5. The system as claim 1 recites, the operations further comprising:
associating transaction data with the group data object;
generating data representing the element based at least in part on the transaction data;
determining that the user input data is associated with additional transaction data; and
wherein altering the element is based at least in part on the user input data being associated with the additional transaction data.

6. The system as claim 1 recites, wherein altering the element is configured to cause at least one other element to be altered via an inverse relationship.

7. The system as claim 1 recites, the operations further comprising:
generating a command configured to cause a notification to be displayed based at least in part on altering the element;
determining a device associated with the group data object; and
sending the command to the device, the command causing a screen of the device to display the notification, the notification being a selectable element that, when selected, causes a payment application associated with the group data object to be displayed in a foreground of the device.

8. The system as claim 1 recites, the operations further comprising:
generating a machine learning model configured to determine element alterations based on input types associated with group data objects;
generating a training dataset from feedback data associated with the element alterations determined utilizing the machine learning model;
training the machine learning model utilizing the training dataset such that a trained machine learning model is generated; and
wherein altering the element is performed utilizing the trained machine learning model.

9. The system as claim 1 recites, the operations further comprising:
determining an access control tier to associate with the first account based at least in part on characteristics of the first account; and
wherein altering the element comprises displaying a representation of the first account and an indication of the access control tier on the user interface.

10. The system as claim 1 recites, the operations further comprising generating the group data object that associates the first account with the one or more second accounts, the first account and the one or more second accounts associated with a payment service.

11. A method comprising:
storing, by a server computing device, a group data object that associates a first account with second accounts, the group data object representing a group of users;
generating, by the server computing device, a user interface associated with the group data object, the user interface configured to display information associated with the group of users;
determining, by the server computing device, that input data associated with at least one of the first account or the second accounts is associated with the group data object instead of being associated with individual users in the group of users;
determining, by the server computing device, that an element of the user interface is to be altered based at least in part on the input data being associated with the group data object instead of being associated with the individual users in the group of users;
altering, by the server computing device, the element of the user interface, in real time, based at least in part on the input data;
generating, by the server computing device and based at least in part on altering the element and a type of the input data, a command configured to cause a payment application residing on a computing device to be displayed;
determining, by the server computing device, a device associated with the group data object; and
sending, by the server computing device, the command to the device, the command causing the payment application residing on the device to transition from a background of the device where the user interface is absent from a display of the device to a foreground of the device such that the element as altered is displayed on the device.

12. The method as claim 11 recites, wherein the element is a slider bar indicating a contribution attribution associated with the first account, and the method further comprises altering, by the server computing device, at least one additional slider bar associated with the second accounts such that a contribution attribution associated with the second accounts is changed based at least in part on the contribution attribution associated with the first account.

13. The method as claim 11 recites, wherein the element of the user interface includes at least one of:
a button that, when selected, causes a functionality associated with the group data object to be performed;
a dial that, when manipulated, causes the functionality to be performed; or
a link that, when selected, causes display of information associated with the group data object.

14. The method as claim 11 recites, further comprising:
prior to generation of the group data object, receiving, by the server computing device, input data indicating a selection of a purpose of multiple predefined purposes to associate with the group data object; and
associating, by the server computing device, the group data object with a predefined set of functionalities based at least in part on the selection of the purpose, the predefined set of functionalities being a subset of functionalities capable of being associated with the group data object.

15. The method as claim 11 recites, further comprising:
determining, by the server computing device, that an amount of funds in a sub-account of the group data object has satisfied a threshold amount;
causing display, via the user interface and by the server computing device, of a first indicator that the amount of funds has satisfied the threshold amount;
automatically facilitating, by the server computing device, a transaction on behalf of the group of users based at least in part on the amount of funds satisfying the threshold amount; and
causing display, via the user interface and by the server computing device, of a second indicator indicating that the transaction has been completed.

16. The method as claim 11 recites, further comprising:
determining, by the server computing device, that a trigger event associated with the group data object has occurred;
associating, based at least in part on the trigger event occurring and by the server computing device, an incentive with the group data object; and
wherein altering the element comprises displaying a representation of the incentive on the user interface, the representation of the incentive being selectable by users of the group of users to redeem the incentive.

17. The method as claim 11 recites, further comprising:
determining, by the server computing device, an access control tier to associate with the first account based at least in part on characteristics of the first account; and
wherein altering the element comprises displaying a representation of the first account and an indication of the access control tier on the user interface.

18. The method as claim 11 recites, wherein altering the element affects the element and at least one other element via an inverse relationship.

19. The method as claim 11 recites, further comprising generating the group data object that associates the first account with the second accounts, the first account and the second accounts associated with a payment service.

20. The method as claim 11 recites, further comprising enabling a functionality for the group of users based at least in part on funds associated with the group of users satisfying a threshold amount of funds.

* * * * *